United States Patent
Cai et al.

(10) Patent No.: US 12,381,605 B2
(45) Date of Patent: Aug. 5, 2025

(54) INFORMATION TRANSMISSION METHOD AND APPARATUS

(71) Applicant: HUAWEI TECHNOLOGIES CO., LTD., Shenzhen (CN)

(72) Inventors: Shijie Cai, Beijing (CN); Kunpeng Liu, Beijing (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 17/882,068

(22) Filed: Aug. 5, 2022

(65) Prior Publication Data
US 2022/0385343 A1 Dec. 1, 2022

Related U.S. Application Data

(63) Continuation of application No. PCT/CN2020/074564, filed on Feb. 7, 2020.

(51) Int. Cl.
*H04B 7/0456* (2017.01)

(52) U.S. Cl.
CPC ................ *H04B 7/0456* (2013.01)

(58) Field of Classification Search
CPC .. H04B 7/0417; H04B 7/0456; H04B 7/0626; H04B 7/0634; H04B 7/0663
See application file for complete search history.

(56) References Cited

U.S. PATENT DOCUMENTS

| 2008/0019457 A1* | 1/2008 | Waters | H01Q 3/2605 |
| | | | 375/267 |
| 2008/0225960 A1* | 9/2008 | Kotecha | H04B 7/0456 |
| | | | 375/259 |

(Continued)

FOREIGN PATENT DOCUMENTS

| CN | 101425830 A | 5/2009 |
| CN | 101958773 A | 1/2011 |

(Continued)

OTHER PUBLICATIONS

Qualcomm Incorporated, "CSI Enhancement for MU-MIMO Support", 3GPP TSG RAN WG1 Meeting #96, Feb. 25-Mar. 1, 2019, Athens, Greece, R1-1903042, 15 pages.

(Continued)

*Primary Examiner* — David B Lugo
(74) *Attorney, Agent, or Firm* — Maier & Maier, PLLC

(57) ABSTRACT

An information transmission method and apparatus. In the method, a terminal device generates a first codeword, where the first codeword is obtained based on a second codeword, a quantity of elements included in the second codeword is greater than a quantity of elements included in the first codeword, the second codeword is associated with a first coefficient set of a downlink channel, and the first coefficient set includes an element included in at least one row vector or column vector of a first coefficient matrix; and then the terminal device feeds back the first codeword to a network device. The terminal device can indicate a position and a numerical value of an element in the first coefficient set by reporting only the first codeword. This manner is simple. In addition, a codeword length of the first codeword is shorter than a codeword length of the second codeword.

12 Claims, 14 Drawing Sheets

(56) References Cited

U.S. PATENT DOCUMENTS

| | | | |
|---|---|---|---|
| 2012/0140834 A1 | 6/2012 | Choi et al. | |
| 2019/0341979 A1* | 11/2019 | Gao | H04W 88/06 |
| 2020/0119788 A1* | 4/2020 | Huang | H04B 7/0486 |
| 2022/0085855 A1* | 3/2022 | Huang | H04B 7/0658 |

FOREIGN PATENT DOCUMENTS

| | | | |
|---|---|---|---|
| CN | 102468925 A | 5/2012 | |
| CN | 102843176 A | 12/2012 | |
| CN | 104348590 A | 2/2015 | |
| CN | 107888323 A | 4/2018 | |
| CN | 109474315 A | 3/2019 | |
| CN | 110247686 A | 9/2019 | |
| EP | 3522677 A1 | 8/2019 | |
| EP | 3672095 A1 | 6/2020 | |
| WO | 2014169873 A1 | 10/2014 | |
| WO | WO-2018228599 A1 * | 12/2018 | H04B 7/0413 |

OTHER PUBLICATIONS

Huawei et al., "Discussion on UE complexity of DFf-based compression codebook", 3GPP TSG RAN WGl Meeting #97, Reno, USA, May 13-17, 2019, R1-1906032, 6 pages.

Huawei, Hisilicon, "Discussion on CSI enhancement", 3GPP TSG RAN WG1 Meeting #96bis, Xi'an, China, Apr. 8-12, 2019, R1-1903969, 19 pages.

\* cited by examiner $S_{i,l}$      $\varphi$      $h_{i,l}$ $X_1 \times 1$      $X_1 \times N_3$      $N_3 \times 1$ $$\square = \square \times \square$$

FIG. 11

$S_{i,l}$    $\varphi$    $\Psi$    $p_{i,l}$
$M \times 1$    $M \times N_3$    $N_3 \times N_3$    $N_3 \times 1$ $$\square \approx \square \quad \square \quad \square \rightarrow K \text{ non-zero elements}$$

FIG. 12

INFORMATION TRANSMISSION METHOD AND APPARATUS

CROSS-REFERENCE TO RELATED APPLICATIONS

This application is a continuation of International Application No. PCT/CN2020/074564, filed on Feb. 7, 2020, the disclosure of which is hereby incorporated by reference in its entirety.

TECHNICAL FIELD

The embodiments relate to the field of communication technologies, an information transmission method, and an apparatus.

BACKGROUND

In a mobile communication system, for example, a long term evolution (LTE) system or a 5th generation (5G) mobile communication system, signal transmission quality can be improved by using a precoding technology.

A premise of using the precoding technology is that a base station needs to obtain channel state information (CSI) of a downlink channel used to send a signal to a terminal device. The CSI may be determined by the terminal device based on a downlink reference signal sent by the base station and reported to the base station.

Currently, a terminal reports CSI in a dual-domain compression manner. In this manner, when a quantity of antennas used by a base station to send a signal increases, for example, when a signal is sent by using a multiple input multiple output (MIMO) technology, content in the CSI increases, causing high information overheads.

Therefore, how to reduce information overheads during CSI reporting is an urgent problem to be resolved currently.

SUMMARY

The embodiments provide an information transmission method and apparatus, to reduce information overheads during CSI reporting.

According to a first aspect, an information transmission method is provided. In the method, a terminal device generates a first codeword, where the first codeword is obtained based on a second codeword, a quantity of elements included in the second codeword is greater than a quantity of elements included in the first codeword, the second codeword is associated with a first coefficient set of a downlink channel, and the first coefficient set includes an element included in at least one row vector or column vector of a first coefficient matrix, where the first coefficient matrix is determined based on a first matrix, a second matrix, and a third matrix, the third matrix is a channel matrix or a precoding matrix of the downlink channel, and the third matrix satisfies a product of the first matrix, the first coefficient matrix, and the second matrix; the first coefficient matrix is determined based on a first matrix and a third matrix, the third matrix is a channel matrix or a precoding matrix of the downlink channel, and the third matrix satisfies a product of the first matrix and the first coefficient matrix; the first coefficient matrix is determined based on a second matrix and a third matrix, the third matrix is a channel matrix or a precoding matrix of the downlink channel, and the third matrix satisfies a product of the first coefficient matrix and the second matrix; or the first coefficient matrix is determined based on a third matrix, and the third matrix is a channel matrix or a precoding matrix of the downlink channel; and each spatial layer or receive port is in a one-to-one correspondence with one third matrix and one first coefficient matrix; and the terminal device feeds back the first codeword to a network device.

The method may further include:

The terminal device determines a fourth matrix, where the fourth matrix is a dictionary matrix used by the terminal device to compress an element in the first coefficient set; and the terminal device feeds back the fourth matrix to the network device.

The second codeword may satisfy a product of the fourth matrix and a first vector or satisfies a product of the first vector and the fourth matrix, where the first vector includes at least one non-zero element; and a quantity of non-zero elements included in the first vector is less than a first preset value, and a difference between the second codeword and a result of multiplying the fourth matrix by the first vector or multiplying the first vector by the fourth matrix is less than a second preset value; or a quantity of non-zero elements included in the first vector is less than a first preset value, and an energy ratio of first energy corresponding to a result of multiplying the fourth matrix by the first vector or multiplying the first vector by the fourth matrix to second energy corresponding to the second codeword is greater than or equal to a third preset value.

The terminal device feeding back the fourth matrix to the network device may include:

The terminal device periodically feeds back the fourth matrix to the network device;

the terminal device feeds back the fourth matrix to the network device after receiving an indication from the network device; or the terminal device feeds back the fourth matrix to the network device after determining that a preset condition is satisfied.

The terminal device may feed back the fourth matrix to the network device based on a long periodicity, and the terminal device feeds back the first codeword based on a short periodicity, where a value of the long periodicity is greater than a value of the short periodicity;

the terminal device separately feeds back the fourth matrix and the first codeword to the network device, where the terminal device determines to feed back the fourth matrix to the network device in a first case, and determines to feed back the first codeword to the network device in a second case, the first case is that the terminal device satisfies a first preset condition or the terminal device receives a first indication from the network device, and the second case is that the terminal device satisfies a second preset condition or the terminal device receives a second indication from the network device;

the terminal device separately feeds back the fourth matrix and the first codeword to the network device, where the terminal device periodically feeds back the fourth matrix to the network device, and the terminal device feeds back the first codeword to the network device in the second case; or the terminal device separately feeds back the fourth matrix and the first codeword to the network device, where the terminal device feeds back the fourth matrix to the network device in the first case, and the terminal device periodically feeds back the first codeword to the network device.

The terminal device may generate a first codeword including:

The terminal device determines a fifth matrix based on a codeword length of the first codeword and the fourth matrix; and the terminal device obtains the first codeword based on the fifth matrix and the second codeword.

The first codeword and the second codeword may be column vectors and the first codeword may satisfy a product of the fifth matrix and the second codeword; or the first codeword and the second codeword may be row vectors, and the first codeword may satisfy a product of the second codeword and the fifth matrix.

The fourth matrix and the fifth matrix may satisfy a first rule, and the first rule is:

an eighth matrix satisfies a product of the fifth matrix and the fourth matrix, and a maximum value of a correlation coefficient of any two columns of the eighth matrix is less than a first threshold; or an eighth matrix satisfies a product of the fourth matrix and the fifth matrix, and a maximum value of a correlation coefficient of any two rows of the eighth matrix is less than a first threshold.

The method may further include:

The terminal device feeds back the codeword length of the first codeword to the network device.

The codeword length of the first codeword may be indicated by the network device or the codeword length of the first codeword may be agreed on in advance.

The first coefficient set may include at least one of the following cases:

the first coefficient set is an element included in one row vector or column vector of a first coefficient matrix corresponding to one spatial layer or receive port;

the first coefficient set is elements included in at least two row vectors or column vectors located in a same position in at least two first coefficient matrices corresponding to at least two spatial layers or receive ports, and the at least two row vectors or column vectors include at least one row vector or column vector of each first coefficient matrix;

the first coefficient set is elements included in at least two row vectors or column vectors of a first coefficient matrix corresponding to one spatial layer or receive port; or the first coefficient set is elements included in at least two row vectors or column vectors located in different positions in at least two first coefficient matrices corresponding to at least two spatial layers or receive ports, and the at least two row vectors or column vectors include at least one row vector or column vector of each first coefficient matrix.

The quantity of elements included in the second codeword may be equal to a quantity of elements included in the first coefficient set; and elements included in a row vector or column vector of a first coefficient matrix may be located in adjacent positions in the second codeword;

elements included in a row vector or column vector of a first coefficient matrix may be at equal intervals in the second codeword; or elements included in row vectors or column vectors located in a same position in first coefficient matrices may be located in adjacent positions in the second codeword.

Elements with largest amplitude values at different spatial layers or receive ports may be located in same columns of corresponding first coefficient matrices.

The method may further include:

The terminal device determines a first codeword matrix, where the first codeword matrix is obtained based on a plurality of first codewords corresponding to each spatial layer or each receive port, each spatial layer or each receive port corresponds to one first codeword matrix, the first codeword matrix is determined based on the fifth matrix, the first coefficient matrix, and a seventh matrix, and the first codeword matrix satisfies a product of the seventh matrix, the first coefficient matrix, and the fifth matrix; and the terminal device feeds back the first codeword matrix to the network device.

The method may further include:

The terminal device determines the seventh matrix based on a sixth matrix, where the sixth matrix is a dictionary matrix used by the terminal device to compress the first coefficient matrix; and the terminal device feeds back the sixth matrix to the network device.

At least one matrix in the first matrix to the eighth matrix may include at least one of the following features:

amplitude values of a plurality of elements included in each column correspond to a same candidate value set, where the candidate value set includes a plurality of different candidate values;

amplitude values of a plurality of elements included in each row correspond to a same candidate value set, where the candidate value set includes a plurality of different candidate values;

phase differences between every two adjacent elements in a plurality of elements included in each column correspond to a same candidate value set, where the candidate value set includes a plurality of different candidate values;

phase differences between every two adjacent elements in a plurality of elements included in each row correspond to a same candidate value set, where the candidate value set includes a plurality of different candidate values; or the matrix is fed back to the network device by one element, the matrix is fed back to the network device by one vector, or the matrix is fed back to the network device by one matrix of a preset scale.

The second codeword may include each element in the first coefficient set;

the second codeword may include an amplitude value of each element in the first coefficient set;

the second codeword may include a real part of each element in the first coefficient set; or the second codeword may include an imaginary part of each element in the first coefficient set.

According to a second aspect, an information transmission method is provided. In the method, a network device obtains a first codeword fed back by a terminal device, where the first codeword is obtained based on a second codeword, a quantity of elements included in the second codeword is greater than a quantity of elements included in the first codeword, the second codeword is associated with a first coefficient set of a downlink channel, and the first coefficient set includes an element included in at least one row vector or column vector of a first coefficient matrix, where
    a third matrix satisfies a product of a first matrix, the first coefficient matrix, and a second matrix; a third matrix satisfies a product of a first matrix and the first coefficient matrix; a third matrix is/satisfies a product of the first coefficient matrix and a second matrix; or the first coefficient matrix is determined based on a third matrix; the third matrix is a channel matrix or a precoding matrix of the downlink channel; and each spatial layer or receive port is in a one-to-one correspondence with one third matrix and one first coefficient matrix; and
    the network device determines an element in the first coefficient set based on the first codeword.

The network device may obtain a fourth matrix from the terminal device, where the fourth matrix is a dictionary matrix used by the network device to restore the element in the first coefficient set.

The second codeword may satisfy a product of the fourth matrix and a first vector or satisfies a product of the first vector and the fourth matrix, where the first vector includes at least one non-zero element; and a quantity of non-zero elements included in the first vector is less than a first preset value, and a difference between the second codeword and a result of multiplying the fourth matrix by the first vector or multiplying the first vector by the fourth matrix is less than a second preset value; or a quantity of non-zero elements included in the first vector is less than a first preset value, and an energy ratio of first energy corresponding to a result of multiplying the fourth matrix by the first vector or multiplying the first vector by the fourth matrix to second energy corresponding to the second codeword is greater than or equal to a third preset value.

The network device may obtain a fourth matrix from the terminal device including:
    The network device periodically obtains the fourth matrix from the terminal device;
        the network device sends an indication to the terminal device, where the indication is used to indicate the terminal device to indicate the fourth matrix to the network device; and the network device obtains the fourth matrix from a response message corresponding to the indication; or
    the network device obtains the fourth matrix from the terminal device at a first moment, where the first moment is a moment at which the terminal device determines that a preset condition is satisfied.

The network device may obtain a codeword length of the first codeword from the terminal device.

The codeword length of the first codeword may be indicated by the network device, or the codeword length of the first codeword is agreed on in advance.

The method may further include:
    The network device determines a fifth matrix based on the codeword length of the first codeword and the fourth matrix.

The first codeword and the second codeword may be column vectors, the first codeword may satisfy a product of the fifth matrix, the fourth matrix, and a third codeword, and the second codeword may satisfy a product of the fourth matrix and the third codeword; or
    the first codeword and the second codeword may be row vectors, the first codeword may satisfy a product of a third codeword, the fourth matrix, and the fifth matrix, and the second codeword may satisfy a product of the third codeword and the fourth matrix.

The fourth matrix and the fifth matrix may satisfy a first rule, and the first rule is:
    a ninth matrix satisfies a product of the fifth matrix and the fourth matrix, and a maximum value of a correlation coefficient of any two columns of the ninth matrix is less than a first threshold; or
    a ninth matrix satisfies a product of the fourth matrix and the fifth matrix, and a maximum value of a correlation coefficient of any two rows of the ninth matrix is less than a first threshold.

The first coefficient set may include at least one of the following cases:
    the first coefficient set is an element included in one row vector or column vector of a first coefficient matrix corresponding to one spatial layer or receive port;
    the first coefficient set is elements included in at least two row vectors or column vectors located in a same position in at least two first coefficient matrices corresponding to at least two spatial layers or receive ports, and the at least two row vectors or column vectors include at least one row vector or column vector of each first coefficient matrix;
    the first coefficient set is elements included in at least two row vectors or column vectors of a first coefficient matrix corresponding to one spatial layer or receive port; or
    the first coefficient set is elements included in at least two row vectors or column vectors located in different positions in at least two first coefficient matrices corresponding to at least two spatial layers or receive ports, and the at least two row vectors or column vectors include at least one row vector or column vector of each first coefficient matrix.

The quantity of elements included in the second codeword may be equal to a quantity of elements included in the first coefficient set; and
    elements included in a row vector or column vector of a first coefficient matrix are located in adjacent positions in the second codeword;
    elements included in a row vector or column vector of a first coefficient matrix are at equal intervals in the second codeword; or
    elements included in row vectors or column vectors located in a same position in first coefficient matrices are located in adjacent positions in the second codeword.

Elements with largest amplitude values at different spatial layers or receive ports may be located in same columns of corresponding first coefficient matrices.

The network device may determine an element in the first coefficient matrix based on the first codeword including:
    The network device determines the third codeword based on the first codeword, the fourth matrix, and the fifth matrix; and
    the network device determines the element in the first coefficient matrix based on the third codeword.

The method may further include:
    The network device receives a first codeword matrix fed back by the terminal device, where each spatial layer or each interface port corresponds to one first codeword matrix, and the first codeword matrix satisfies a product of a seventh matrix, a sixth matrix, an eighth matrix, the fourth matrix, and the fifth matrix; and
    the network device determines an element in the first coefficient matrix based on the first codeword matrix.

The network device may receive the sixth matrix fed back by the terminal device, where the sixth matrix is a dictionary matrix used by the network device to restore the first coefficient matrix.

In a possible array, the network device may determine an element in the first coefficient matrix based on the first codeword matrix including:

The network device determines the eighth matrix based on the seventh matrix, the sixth matrix, the first codeword matrix, the fourth matrix, and the fifth matrix; and the network device determines the element in the first coefficient matrix based on the eighth matrix, the fourth matrix, and the sixth matrix, where the first coefficient matrix satisfies a product of the sixth matrix, the eighth matrix, and the fourth matrix.

At least one matrix in the first matrix to the ninth matrix may include at least one of the following features:

amplitude values of a plurality of elements included in each column correspond to a same candidate value set, where the candidate value set includes a plurality of different candidate values;

amplitude values of a plurality of elements included in each row correspond to a same candidate value set, where the candidate value set includes a plurality of different candidate values;

phase differences between every two adjacent elements in a plurality of elements included in each column correspond to a same candidate value set, where the candidate value set includes a plurality of different candidate values;

phase differences between every two adjacent elements in a plurality of elements included in each row correspond to a same candidate value set, where the candidate value set includes a plurality of different candidate values; or the matrix is received from the terminal device by one element, the matrix is received from the terminal device by one vector, or the matrix is received from the terminal device by one matrix of a preset scale.

The third codeword may include each element in the first coefficient set;

the third codeword includes an amplitude value of each element in the first coefficient set;

the third codeword includes a real part of each element in the first coefficient set; or the third codeword includes an imaginary part of each element in the first coefficient set.

According to a third aspect, an information transmission method is provided. In the method, a terminal device determines a first coefficient matrix, where the first coefficient matrix is determined based on a first matrix, a second matrix, and a third matrix, the third matrix is a channel matrix or a precoding matrix of a downlink channel, and the third matrix satisfies a product of the first matrix, the first coefficient matrix, and the second matrix; the first coefficient matrix is determined based on a first matrix and a third matrix, the third matrix is a channel matrix or a precoding matrix of a downlink channel, and the third matrix satisfies a product of the first matrix and the first coefficient matrix; or the first coefficient matrix is determined based on a second matrix and a third matrix, the third matrix is a channel matrix or a precoding matrix of a downlink channel, and the third matrix satisfies a product of the first coefficient matrix and the second matrix; and the terminal device feeds back first information to a network device, where the first information is used to indicate the first coefficient matrix.

The terminal device may feed back the first matrix to the network device; and/or the terminal device feeds back the second matrix to the network device.

The terminal device may periodically feed back the first matrix and/or the second matrix, where a first periodicity in which the terminal device feeds back the first matrix and a second periodicity in which the terminal device feeds back the second matrix are greater than a third periodicity in which the terminal device sends the first information;

the terminal device separately feeds back the first information and the first matrix and/or the second matrix to the network device, where the terminal device determines to feed back the first matrix and/or the second matrix to the network device in a first case, and determines to feed back the first information to the network device in a second case, the first case is that the terminal device satisfies a first preset condition or the terminal device receives a first indication from the network device, and the second case is that the terminal device satisfies a second preset condition or the terminal device receives a second indication from the network device;

the terminal device separately feeds back the first information and the first matrix and/or the second matrix to the network device, where the terminal device periodically feeds back the first matrix and/or the second matrix to the network device, and the terminal device determines to feed back the first information to the network device in the second case; or the terminal device separately feeds back the first information and the first matrix and/or the second matrix to the network device, where the terminal device determines to feed back the first matrix and/or the second matrix to the network device in the first case, and the terminal device periodically feeds back the first information to the network device.

A terminal device may determine a first coefficient matrix including:

The terminal device determines a fourth matrix and a fifth matrix, where the first coefficient matrix satisfies a product of the fourth matrix and the fifth matrix; and the first information includes second information and third information, the second information is used to indicate the fourth matrix, and the third information is used to indicate the fifth matrix.

The terminal device may send the second information based on a long periodicity and send the third information based on a short periodicity, or the terminal device may send the second information based on a short periodicity and send the third information based on a long periodicity, where a value of the long periodicity is greater than a value of the short periodicity.

If the terminal device sends the second information based on the short periodicity, the first periodicity in which the terminal device feeds back the first matrix and the second periodicity in which the terminal device feeds back the second matrix are both greater than a fourth periodicity in which the terminal device sends the second information; or if the terminal device sends the third information based on the short periodicity, the first periodicity in which the terminal device feeds back the first matrix and the second periodicity in which the terminal device feeds back the second matrix are both greater than a fifth periodicity in which the terminal device sends the third information.

If the terminal device sends the second information based on the long periodicity, the first periodicity in which the terminal device feeds back the first matrix and the second periodicity in which the terminal device feeds back the second matrix are both greater than the fourth periodicity in which the terminal device sends the second information; or if the terminal device sends the third information based on the long periodicity, the first periodicity in which the terminal device feeds back the first matrix and the second periodicity in which the terminal device feeds back the second matrix are both greater than the fifth periodicity in which the terminal device sends the third information.

A terminal device may determine a first coefficient matrix including:

The terminal device determines a fourth matrix, a fifth matrix, and a sixth matrix, where the first coefficient matrix satisfies a product of the fourth matrix, the fifth matrix, and the sixth matrix; and the first information includes second information, third information, and fourth information, the second information is used to indicate the fourth matrix, the third information is used to indicate the fifth matrix, and the fourth information is used to indicate the sixth matrix.

The terminal device may feed back the second information and the fourth information based on a long periodicity, and feeds back the third information based on a short periodicity, where a fourth periodicity in which the terminal device feeds back the second information and a sixth periodicity in which the terminal device feeds back the fourth information are both greater than a fifth periodicity in which the terminal device feeds back the third information.

The first periodicity in which the terminal device feeds back the first matrix and the second periodicity in which the terminal device feeds back the second matrix may be both greater than the fifth periodicity.

The first periodicity in which the terminal device feeds back the first matrix and the second periodicity in which the terminal device feeds back the second matrix may be both greater than the fourth periodicity and the sixth periodicity.

The first matrix may be used to indicate at least one spatial domain basis vector corresponding to the downlink channel, and a dimension of each spatial domain basis vector is associated with a quantity of channel state information reference signal ports; or the second matrix is used to indicate at least one frequency domain basis vector corresponding to the downlink channel, and a dimension of each frequency domain basis vector is associated with a frequency domain feature parameter.

The frequency domain feature parameter may include a quantity of frequency domain feedback elements and/or a quantity of frequency domain subbands.

At least one matrix in the first matrix to the sixth matrix may satisfy at least one of the following features:

amplitude values of a plurality of elements included in each column correspond to a same candidate value set, where the candidate value set includes a plurality of different candidate values;

amplitude values of a plurality of elements included in each row correspond to a same candidate value set, where the candidate value set includes a plurality of different candidate values;

phase differences between every two adjacent elements in a plurality of elements included in each column correspond to a same candidate value set, where the candidate value set includes a plurality of different candidate values;

phase differences between every two adjacent elements in a plurality of elements included in each row correspond to a same candidate value set, where the candidate value set includes a plurality of different candidate values; or the matrix is fed back to the network device by one element, the matrix is fed back to the network device by one vector, or the matrix is fed back to the network device by one matrix of a preset scale.

A dimension of each matrix in the first matrix to the sixth matrix, a quantity of non-zero coefficients included in the fourth matrix, and a quantity of non-zero coefficients included in the fifth matrix may be indicated by the network device to the terminal device, agreed on by the network device and the terminal device in advance, or fed back by the terminal device to the network device.

According to a fourth aspect, an information transmission method is provided. In the method, a network device receives first information fed back by a terminal device, where the first information is used to indicate a first coefficient matrix; a third matrix satisfies a product of a first matrix, the first coefficient matrix, and a second matrix; a third matrix satisfies a product of a first matrix and the first coefficient matrix; a third matrix is/satisfies a product of the first coefficient matrix and a second matrix; or the first coefficient matrix is determined based on a third matrix; and the third matrix is a channel matrix or a precoding matrix of a downlink channel; and the network device determines, based on the first information, an element included in the first coefficient matrix.

The network device may receive the first matrix fed back by the terminal device; and/or the network device receives the second matrix fed back by the terminal device.

The first information may include second information and third information, the second information is used to indicate a fourth matrix, the third information is used to indicate a fifth matrix, and the first coefficient matrix satisfies a product of the fourth matrix and the fifth matrix.

The first information may include second information, third information, and fourth information, the second information is used to indicate a fourth matrix, the third information is used to indicate a fifth matrix, the fourth information is used to indicate a sixth matrix, and the first coefficient matrix satisfies a product of the fourth matrix, the fifth matrix, and the sixth matrix.

The first matrix may be used to indicate at least one spatial domain basis vector corresponding to the downlink channel, and a dimension of each spatial domain basis vector is associated with a quantity of channel state information reference signal ports; or the second matrix is used to indicate at least one frequency domain basis vector corresponding to the downlink channel, and a dimension of each frequency domain basis vector is associated with a frequency domain feature parameter.

The frequency domain feature parameter may include a quantity of frequency domain feedback elements and/or a quantity of frequency domain subbands.

At least one matrix in the first matrix to the sixth matrix may satisfy at least one of the following features:

amplitude values of a plurality of elements included in each column correspond to a same candidate value set, where the candidate value set includes a plurality of different candidate values;

amplitude values of a plurality of elements included in each row correspond to a same candidate value set, where the candidate value set includes a plurality of different candidate values;

phase differences between every two adjacent elements in a plurality of elements included in each column correspond to a same candidate value set, where the candidate value set includes a plurality of different candidate values;

phase differences between every two adjacent elements in a plurality of elements included in each row correspond to a same candidate value set, where the candidate value set includes a plurality of different candidate values; or the matrix is received from the terminal device by one element, the matrix is received from the terminal device by one vector, or the matrix is received from the terminal device by one matrix of a preset scale.

A dimension of each matrix in the first matrix to the sixth matrix, a quantity of non-zero coefficients included in the fourth matrix, and a quantity of non-zero coefficients included in the fifth matrix may be indicated by the network device to the terminal device, agreed on by the network device and the terminal device in advance, or fed back by the terminal device to the network device.

According to a fifth aspect, the embodiments may provide an information transmission apparatus. The apparatus may be a terminal device, or a chip used for the terminal device. The apparatus has a function of implementing the embodiment of the first aspect or the third aspect. The function may be implemented by hardware or may be implemented by hardware executing corresponding software. The hardware or the software includes one or more modules corresponding to the function.

According to a sixth aspect, the embodiments may provide an information transmission apparatus. The apparatus may be a network device, or a chip used for the network device. The apparatus has a function of implementing the embodiment of the second aspect or the fourth aspect. The function may be implemented by hardware or may be implemented by hardware executing corresponding software. The hardware or the software includes one or more modules corresponding to the function.

According to a seventh aspect, the embodiments may provide an information transmission apparatus, including a processor and a memory. The memory is configured to store computer-executable instructions. When the apparatus runs, the processor executes the computer-executable instructions stored in the memory, so that the apparatus performs the methods according to the foregoing aspects.

According to an eighth aspect, the embodiments may provide an information transmission apparatus, including a unit or an element configured to perform the steps according to the foregoing aspects.

According to a ninth aspect, the embodiments may provide an information transmission apparatus, including a processor and an interface circuit. The processor is configured to: communicate with another apparatus through the interface circuit and perform the methods according to the foregoing aspects. There are one or more processors.

According to a tenth aspect, the embodiments may provide an information transmission apparatus, including a processor, configured to connect to a memory and invoke a program stored in the memory, to perform the methods according to the foregoing aspects. The memory may be located inside or outside the apparatus. In addition, there are one or more processors.

According to an eleventh aspect, the embodiments may further provide a non-transitory computer-readable storage medium. The non-transitory computer-readable storage medium stores instructions. When the instructions are run on a computer, a processor is enabled to perform the methods according to the foregoing aspects.

According to a twelfth aspect, the embodiments may further provide a computer program product including instructions. When the computer program product runs on a computer, the computer is enabled to perform the methods according to the foregoing aspects.

According to a thirteenth aspect, the embodiments may further provide a chip system. The chip system includes a processor, configured to perform the methods according to the foregoing aspects.

According to a fourteenth aspect, the embodiments may further provide a communication system, including an information transmission apparatus configured to perform any method according to the first aspect and an information transmission apparatus configured to perform any method according to the second aspect.

According to a fifteenth aspect, the embodiments may further provide a communication system, including an information transmission apparatus configured to perform any method according to the third aspect and an information transmission apparatus configured to perform any method according to the fourth aspect.

BRIEF DESCRIPTION OF THE DRAWINGS

FIG. 11 is a schematic diagram of obtaining a first codeword based on a fifth matrix and a second codeword according to an embodiment;

FIG. 12 is a schematic diagram of determining at least one space-frequency combination coefficient based on a second codeword according to an embodiment;

DETAILED DESCRIPTION OF THE EMBODIMENTS

Figure 1:
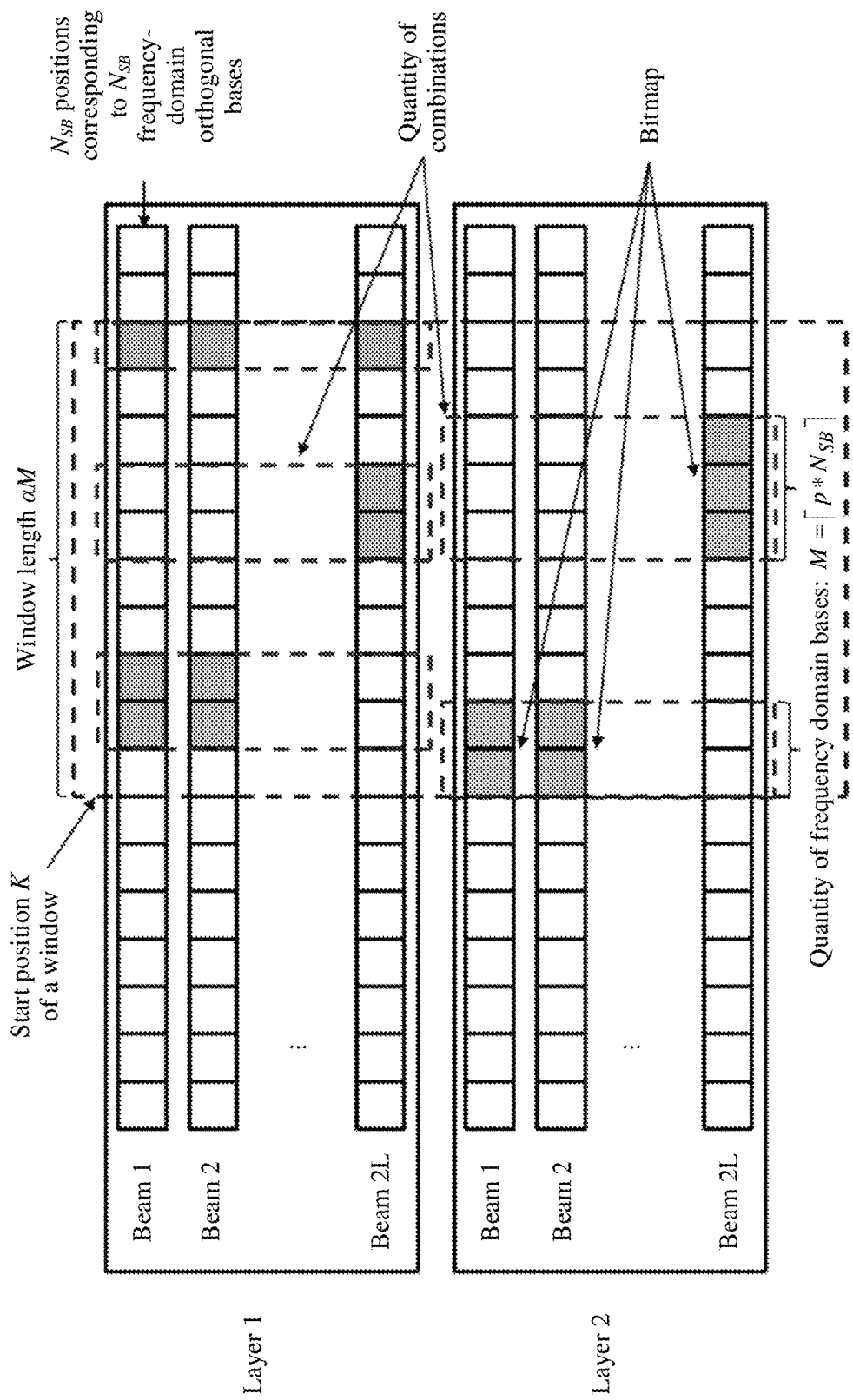
FIG. 1 is a schematic diagram of a CSI reporting manner in a conventional technology.

To make objectives and advantages of the embodiments clearer, the following further describes the embodiments in detail with reference to the accompanying drawings.

In the embodiments, "a plurality of" means two or more. In view of this, in the embodiments, "a plurality of" may alternatively be understood as "at least two". "At least one" may be understood as one or more, for example, one, two, or more. For example, "include at least one" means "include one, two, or more", and there is no limitation on which is included. For example, "include at least one of A, B, and C" may mean "include A, B, or C", "include A and B, A and C, or B and C", or "include A, B, and C". "And/or" describes an association relationship between associated objects and indicates that three relationships may exist. For example, A and/or B may indicate the following three cases: only A exists, both A and B exist, and only B exists. In addition, the character "/" generally indicates an "or" relationship between the associated objects, unless otherwise specified.

Unless otherwise specified, ordinal numbers such as "first" and "second" in the embodiments are used to distinguish between a plurality of objects, and are not intended to limit a sequence, a time sequence, priorities, or importance of the plurality of objects.

The embodiments are described below, to help a person skilled in the art understand the solutions.

(1) Precoding Technology

When a channel status is known, a sending device (for example, a network device) may process a to-be-sent signal based on a precoding matrix that matches the channel status, so that a precoded to-be-sent signal adapts to a channel, and a receiving device (for example, a terminal device) eliminates inter-channel impact with less complexity. Therefore, after the to-be-sent signal is precoded, received signal quality (for example, a signal to interference plus noise ratio (SINR)) is improved. The sending device and a plurality of receiving devices can implement transmission on a same time-frequency resource by using the precoding technology. That is, multi-user multiple input multiple output (MU-MIMO) is implemented.

It should be understood that the related description of the precoding technology is merely an example for ease of understanding and is not intended to limit the scope of the embodiments. In an implementation process, the sending device may perform precoding in another manner. For example, when channel information (for example, but not limited to, a channel matrix) cannot be learned of, precoding is performed by using a preset precoding matrix or in a weighting processing manner. For brevity, content thereof is not described.

(2) Channel State Information (CSI) Report

The CSI report may also be referred to as CSI. In a wireless communication system, a receive end (for example, a terminal device) reports, to a transmit end (for example, a network device), information that is used to describe a channel attribute of a communication link. The CSI report may include, for example, but is not limited to, a precoding matrix indicator (PMI), a rank indicator (RI), a channel quality indicator (CQI), a channel state information reference signal (CSI-RS) resource indicator (CRI), and a layer indicator (LI). It should be understood that the foregoing enumerated content of the CSI is merely examples for description and shall not constitute any limitation. The CSI may include one or more of the foregoing enumerated content or may include other information that is different from the foregoing enumerated content and that is used to represent the CSI. This is not limited.

(3) Precoding Matrix Indicator (PMI)

The PMI is used to indicate a precoding matrix. The precoding matrix may be, for example, a precoding matrix determined by a terminal device based on a channel matrix of each frequency domain unit (where for example, a frequency domain length of a frequency domain unit may be a subband, a times of a frequency domain subband (where $a \leq 1$ and a value of a may be 1 or ½), a resource block (RB), a resource element (RE), or a multiple of the RE). The channel matrix may be determined by the terminal device through channel estimation or the like or based on channel reciprocity. However, it should be understood that a method for determining the precoding matrix by the terminal device is not limited to the foregoing description. For an implementation, refer to the current technology. For brevity, details are not described herein.

For example, the precoding matrix may be obtained by performing singular value decomposition (SVD) on a channel matrix or a covariance matrix of the channel matrix, or may be obtained by performing eigenvalue decomposition (EVD) on the covariance matrix of the channel matrix. It should be understood that the foregoing enumerated manner of determining the precoding matrix is merely an example and shall not constitute any limitation. For a manner of determining the precoding matrix, refer to the current technology. For brevity, details are not described herein.

The precoding matrix determined by the terminal device may be referred to as a to-be-fed-back precoding matrix or a to-be-reported precoding matrix. The terminal device may indicate the to-be-fed-back precoding matrix by using the PMI, so that a network device restores the precoding matrix based on the PMI. The precoding matrix restored by the network device based on the PMI may be the same as or similar to the to-be-fed-back precoding matrix.

In downlink channel measurement, higher approximation between the precoding matrix determined by the network device based on the PMI and the precoding matrix determined by the terminal device indicates that the precoding matrix determined by the network device for data transmission is more adaptable to a downlink channel. In this way, signal transmission quality can be improved.

It should be understood that the PMI is merely a name and shall not constitute any limitation. The embodiments do not exclude a possibility of defining other signaling in a future protocol to implement a same or similar function.

It should be noted that, according to a method provided in the embodiments, the network device may determine, based on feedback of the terminal device, a precoding matrix corresponding to one or more frequency domain units. The precoding matrix determined by the network device may be directly used for downlink data transmission. Alternatively, the precoding matrix finally used for downlink data transmission may be obtained by using some beamforming methods, including, for example, zero forcing (ZF), regularized zero-forcing (RZF), minimum mean-squared error (MMSE), and maximizing a signal-to-leakage-and-noise ratio (SLNR). This is not limited in the embodiments. Unless otherwise specified, all precoding matrices mentioned below may be determined according to the method.

(4) Spatial Layer (Layer)

In MIMO, a spatial layer may be considered as a data stream that can be independently transmitted. To improve spectrum resource utilization and improve a data transmission capability of a communication system, a network device may transmit data to a terminal device by using a plurality of spatial layers.

A quantity of spatial layers is a rank of a channel matrix. The terminal device may determine a quantity R of spatial layers based on a channel matrix obtained through channel estimation, to further determine a precoding matrix. For example, the precoding matrix may be determined by performing SVD on a channel matrix or a covariance matrix of the channel matrix. In the SVD process, different spatial layers may be distinguished based on eigenvalues. For example, a precoding vector determined by using an eigenvector vector corresponding to a maximum eigenvalue may correspond to the $1^{st}$ spatial layer, and a precoding vector determined by using an eigenvector vector corresponding to a minimum eigenvalue may correspond to the $R^{th}$ spatial layer. That is, eigenvalues corresponding to the $1^{st}$ spatial layer to the $R^{th}$ spatial layer decrease in sequence. Simply, intensities of the R spatial layers progressively decrease from the $1^{st}$ spatial layer to the $R^{th}$ spatial layer.

It should be understood that distinguishing different spatial layers based on eigenvalues is merely a possible implementation and shall not constitute any limitation. For example, another criterion for distinguishing spatial layers may also be predefined in a protocol. This is not limited in the embodiments.

(5) Precoding Vector

One precoding matrix may include one or more vectors, for example, one or more column vectors. One precoding matrix may be used to determine one or more precoding vectors.

When there is one spatial layer and there is also one polarization direction of a transmit antenna, a precoding matrix is a precoding vector. When there are a plurality of spatial layers and there is one polarization direction of a transmit antenna, a precoding vector may be a component of a precoding matrix at one spatial layer. When there is one spatial layer and there is a plurality of polarization directions of a transmit antenna, a precoding vector may be a component of a precoding matrix in one polarization direction. When there are a plurality of spatial layers and there is a plurality of polarization directions of a transmit antenna, a precoding vector may be a component of a precoding matrix at one spatial layer and in one polarization direction.

It should be understood that the precoding vector may alternatively be determined by a vector of a precoding matrix, for example, obtained after mathematical transformation is performed on the vector of the precoding matrix. A mathematical transformation relationship between the precoding matrix and the precoding vector is not limited in the embodiments.

(6) Antenna Port

The antenna port may be briefly referred to as a port. The antenna port may be understood as a transmit antenna identified by a receive device, or a transmit antenna that can be distinguished in space. One antenna port may be preconfigured for each virtual antenna, each virtual antenna may be a weighted combination of a plurality of physical antennas, and each antenna port may correspond to one reference signal. Therefore, each antenna port may be referred to as a reference signal port, for example, a CSI-RS port or a sounding reference signal (SRS) port. In the embodiments, the reference signal may be a reference signal that is not precoded or may be a precoded reference signal. This is not limited in the embodiments. When the reference signal is a precoded reference signal, a port of the reference signal may be a transmit antenna port. The transmit antenna port may be an independent transceiver unit (TxRU).

(7) Spatial Domain Vector

The spatial domain vector may also be referred to as a spatial domain component vector, a beam vector, a spatial domain beam basis vector, a spatial domain basis vector, a spatial domain base, or the like. Each element in the spatial domain vector may represent a weight of each antenna port. Based on the weight of each antenna port that is represented by each element in the spatial domain vector, signals of the antenna ports are linearly superposed, to form an area with a strong signal in a direction in space.

For ease of description, it is assumed that the spatial domain vector is denoted as u in the following description. A length of the spatial domain vector u may be equal to a quantity Ns of transmit antenna ports in one polarization direction, where Ns is greater than or equal to 1 and is an integer. The spatial domain vector may be, for example, a column vector or a row vector whose length is Ns. This is not limited in the embodiments, Optionally, the spatial domain vector is a discrete Fourier transform (DFT) vector. The DFT vector may be a vector of a DFT matrix.

Optionally, the spatial domain vector is a conjugate transpose vector of the DFT vector. The conjugate transpose vector of the DFT vector may be a column vector of a conjugate transpose matrix of the DFT matrix.

Optionally, the spatial domain vector is an oversampling DFT vector. The oversampling DFT vector may be a vector of an oversampling DFT matrix.

The spatial domain vector may be, for example, a two-dimensional (2D)-DFT vector defined in a type II (type II) codebook in the NR protocol TS 38.214 release 15 (release 15, R15). In other words, the spatial domain vector may be a 2D-DFT vector or an oversampling 2D-DFT vector. For brevity, a detailed description of the 2D-DFT vector is omitted herein.

In the embodiments, the spatial domain vector is one of vectors used to construct a precoding matrix.

(8) Candidate Spatial Domain Vector Set

The candidate spatial domain vector set may also be referred to as a candidate spatial domain component vector set, a spatial domain component vector set, a candidate spatial domain basis vector set, a spatial domain basis vector set, a candidate beam vector set, a beam vector set, a candidate spatial domain beam basis vector set, a spatial domain beam basis vector set, a spatial domain base set, or the like. A plurality of (candidate) spatial domain vectors of different lengths may be included, to correspond to different quantities of antenna ports. In the embodiments, a spatial domain vector used to construct a precoding vector may be determined from the candidate spatial domain vector set. In other words, the candidate spatial domain vector set includes a plurality of candidate spatial domain vectors that can be used to construct a precoding vector.

The candidate spatial domain vector set may include $N_s$ candidate spatial domain vectors, and every two of the $N_s$ candidate spatial domain vectors may be orthogonal to each other. Each candidate spatial domain vector in the candidate spatial domain vector set may be a vector of a 2D-DFT matrix. 2D may represent two different directions, for example, a horizontal direction and a vertical direction. If a quantity of antenna ports in the horizontal direction is $N_1$ and a quantity of antenna ports in the vertical direction is $N_2$, $N_s=N_1 \times N_2$, $N_s$, $N_1$, and $N_2$ are all positive integers.

For example, the $N_s$ candidate spatial domain vectors may be denoted as $u_0, u_1, \ldots,$ and $u_{N_s-1}$. The $N_s$ candidate spatial domain vectors may construct a matrix $B_s$, where $B_s \triangleq [u_0 \ u_1 \ \ldots \ u_{N_s-1}]$. The matrix $B_s$ may be used to perform spatial compression described below, to select one or more candidate spatial domain vectors used to construct a precoding matrix. If each candidate spatial domain vector in the candidate spatial domain vector set is extracted from a 2D-DFT matrix, $B_s = D_{N_1} \otimes D_{N_2}$, where $D_N$ is an N×N orthogonal DFT matrix, and an element in the $m^{th}$ row and the $n^{th}$ column is $$[D_N]_{m,n} = \frac{1}{\sqrt{N}} e^{\frac{j2\pi mn}{N}}.$$

The candidate spatial domain vector set may be extended to $O_s \times N_s$ candidate spatial domain vectors by using an oversampling factor $O_s$. In this case, the candidate spatial domain vector set may include $O_s$ subsets, and each subset may include $N_s$ candidate spatial domain vectors. Every two of the $N_s$ candidate spatial domain vectors in each subset may be orthogonal to each other. Each candidate spatial domain vector in the candidate spatial domain vector set may be obtained from an oversampling 2D-DFT matrix. The oversampling factor $O_s$ is a positive integer. $O_s=O_1 \times O_2$, $O_1$ may be an oversampling factor in a horizontal direction, and $O_2$ may be an oversampling factor in a vertical direction. $O_1 \geq 1$, $O_2 \geq 1$, $O_1$ and $O_2$ cannot be 1 at the same time and are both integers.

$N_s$ candidate spatial domain vectors in an $o_s^{th}$ (where $0 \leq o_s \leq O_s - 1$, and $o_s$ is an integer) subset in the candidate spatial domain vector set may be, for example, denoted as $u_1^{o_s}, u_2^{o_s}, \ldots,$ and $u_{N_s}^{o_s}$. Therefore, a matrix $B_s^{o_s}$ may be constructed based on the $N_s$ candidate spatial domain vectors in the $o_s^{th}$ subset, where $B_s^{o_s} \triangleq [u_1^{o_s}, u_2^{o_s} \ldots u_{N_s}^{o_s}]$. A matrix constructed by one or more subsets in the $O_s$ subsets may be used to perform spatial compression described below, to select one or more spatial domain vectors used to construct a precoding matrix.

It should be understood that a form of the candidate spatial domain vector set and a form of the candidate spatial domain vector are not limited in the embodiments.

(9) Frequency Domain Unit

The frequency domain unit is a unit of a frequency domain resource and may represent different frequency domain resource granularities. For example, the frequency domain unit may include, but is not limited to, a subband, a resource block (RB), a subcarrier, a resource block group (RBG), or a precoding resource block group (PRG). In addition, a frequency domain length of one frequency domain unit may be R times a CQI subband, where R is less than or equal to 1, and a value of R may be, for example, 1 or ½. In a possible implementation, the value of R may be preconfigured by a network device for a terminal device by using signaling. In addition, the frequency domain length of one frequency domain unit may alternatively be an RB.

In the embodiments, a precoding matrix corresponding to the frequency domain unit may be a precoding matrix determined by performing channel measurement and feedback based on a reference signal on the frequency domain unit. The precoding matrix corresponding to the frequency domain unit may be used to precode data subsequently transmitted on the frequency domain unit. In the following description, a precoding matrix corresponding to a frequency domain unit may also be briefly referred to as a precoding matrix of the frequency domain unit.

(10) Frequency Domain Vector

The frequency domain vector may also be referred to as a frequency domain component vector, a frequency domain basis vector, a frequency domain base, or the like, and may be a vector used to represent a change rule of a channel in frequency domain Each frequency domain vector may represent one change rule. When a signal is transmitted through a radio channel, the signal may arrive at a receive antenna through a plurality of paths from a transmit antenna. A multipath delay causes frequency selective fading, that is, a change on a frequency domain channel. Therefore, different frequency domain vectors may be used to represent a change rule of the channel in frequency domain caused by delays on different transmission paths.

A length of the frequency domain vector $u_f$ may be denoted as $N_f$, where $N_f$ is a positive integer, and the frequency domain vector may be, for example, a column vector or a row vector whose length is $N_f$. The length of the frequency domain vector may be determined based on a quantity of to-be-reported frequency domain units preconfigured in a reporting bandwidth, may be determined based on a length of the reporting bandwidth, or may be a value predefined in a protocol. The length of the frequency domain vector is not limited in the embodiments. The reporting bandwidth may be, for example, CSI reporting bandwidth (csi-ReportingBand) carried in a CSI reporting preconfiguration in higher layer signaling (for example, a radio resource control (RRC) message).

All frequency domain vectors corresponding to all spatial domain vectors corresponding to each spatial layer may be referred to as frequency domain vectors corresponding to the spatial layer. Frequency domain vectors corresponding to all spatial layers may be the same or may be different.

(11) Candidate Frequency Domain Vector Set

The candidate frequency domain vector set may also be referred to as a candidate frequency domain component vector set, a frequency domain component vector set, a frequency domain basis vector set, a frequency domain vector set, a frequency domain base set, or the like, and may include candidate frequency domain vectors of different lengths. In the embodiments, a frequency domain vector used to construct a precoding vector may be determined from the candidate frequency domain vector set. In other words, the candidate frequency domain vector set includes a plurality of candidate frequency domain vectors that can be used to construct a precoding vector.

The candidate frequency domain vector set may include $N_f$ candidate frequency domain vectors. Every two of the $N_f$ candidate frequency domain vectors may be orthogonal to each other. Each candidate frequency domain vector in the candidate frequency domain vector set may be a vector of a DFT matrix or an IDFT matrix (that is, a conjugate transpose matrix of the DFT matrix).

For example, the $N_f$ candidate frequency domain vectors may be denoted as $v_0, v_1, \ldots,$ and $v_{N_f-1}$. The $N_f$ candidate frequency domain vectors may construct a matrix $B_f$, where $B_f \triangleq [v_0 \ v_1 \ \ldots \ v_{N_f-1}]$. The matrix may be used to perform frequency domain compression described below, to select one or more frequency domain vectors used to construct a precoding matrix.

The candidate frequency domain vector set may be extended to $O_f \times N_f$ candidate frequency domain basis vectors by using an oversampling factor $O_f$. In this case, the candidate frequency domain vector set may include $O_f$ subsets, and each subset may include $N_f$ candidate frequency domain basis vectors. Every two of the $N_f$ candidate frequency domain basis vectors in each subset may be orthogonal to each other. Each candidate frequency domain vector in the candidate frequency domain vector set may be selected from an oversampling DFT matrix or a conjugate transpose matrix of the oversampling DFT matrix. The oversampling factor $O_f$ is a positive integer.

Therefore, each candidate frequency domain vector in the candidate frequency domain vector set may be selected from a DFT matrix or an oversampling DFT matrix or selected from a conjugate transpose matrix of the DFT matrix or a conjugate transpose matrix of the oversampling DFT matrix. Each column vector in the candidate frequency domain vector set may be referred to as a DFT vector or an oversampling DFT vector. In other words, the candidate frequency domain vector may be a DFT vector or an oversampling DFT vector.

(12) Space-Frequency Vector Pair

The space-frequency vector pair may also be referred to as a space-frequency component vector, and one spatial domain vector and one frequency domain vector may be combined to obtain one space-frequency vector pair. In other words, one space-frequency vector pair may include one spatial domain vector and one frequency domain vector. One space-frequency component matrix may be obtained by using a spatial domain vector and a frequency domain vector in one space-frequency vector pair. For example, one space-frequency component matrix may be obtained by multiplying one spatial domain vector by a conjugate transpose of one frequency domain vector. The space-frequency component matrix described herein is relative to a space-frequency matrix described below. A space-frequency matrix may be obtained by performing weighted summation on a plurality of space-frequency component matrices. Therefore, each item used for weighting may be referred to as a component of a space-frequency matrix, that is, the space-frequency component matrix described herein.

(13) Space-Frequency Matrix

In the embodiments, the space-frequency matrix may be understood as an intermediate quantity used to determine a precoding matrix or a channel matrix corresponding to each frequency domain unit. For a terminal device, the space-frequency matrix may be determined based on a precoding matrix or a channel matrix corresponding to each frequency domain unit. For a network device, the space-frequency matrix may be obtained by using a weighted sum of a plurality of space-frequency component matrices and is used to restore a channel matrix or a precoding matrix.

For example, the space-frequency matrix may be denoted as $H$, where $H=[w_0 \ w_1 \ \ldots \ w_{N_f-1}]$. $w_0$ to $w_{N_f-1}$ are $N_f$ column vectors corresponding to $N_f$ frequency domain units, each column vector may be a precoding matrix corresponding to each frequency domain unit, and a length of each column vector may be $N_s$. The $N_f$ column vectors are in a one-to-one correspondence with precoding vectors of the $N_f$ frequency domain units. That is, the space-frequency matrix may be considered as a joint matrix constructed by combining the precoding vectors corresponding to the $N_f$ frequency domain units.

The space-frequency matrix may correspond to a spatial layer. The space-frequency matrix corresponds to the spatial layer because the terminal device may feedback a frequency domain vector and a space-frequency combination coefficient based on each spatial layer. A space-frequency matrix determined by the network device based on the feedback of the terminal device is a space-frequency matrix corresponding to the spatial layer. The space-frequency matrix corresponding to the spatial layer may be directly used to determine a precoding matrix corresponding to each frequency domain unit. For example, a precoding matrix corresponding to a frequency domain unit may be constructed by using column vectors that correspond to a same frequency domain unit and that are in space-frequency matrices corresponding to spatial layers. For example, $n^{th}$ (where $0 \leq n \leq N_3-1$, and n is an integer) column vectors are extracted from the space-frequency matrices corresponding to the spatial layers, and may be arranged from left to right in an order of the spatial layers to obtain a matrix having $N_s \times Z$ dimensions, where Z represents a quantity of the spatial layers, $Z \geq 1$, and Z is an integer. Normalization processing is performed on the matrix, for example, the matrix is multiplied by a power normalization coefficient, to obtain a precoding matrix of an $n^{th}$ frequency domain unit.

It should be understood that performing normalization processing on the matrix by multiplying the matrix by the power normalization coefficient is merely a possible implementation and shall not constitute any limitation. A manner of the normalization processing is not limited in the embodiments.

It should be understood that the space-frequency matrix is merely a representation form of the intermediate quantity used to determine the precoding matrix or the channel matrix and shall not constitute any limitation. For example, the column vectors of the space-frequency matrix are successively arranged end to end from left to right, or are arranged according to another predefined rule, to obtain a vector whose length is $N_s \times N_f$. The vector may be referred to as a space-frequency vector.

It should be further understood that the dimensions of the space-frequency matrix and the space-frequency vector shown above are merely examples and shall not constitute any limitation. For example, the space-frequency matrix may also be a matrix having $N_f \times N_s$ dimensions. Each row vector may correspond to one frequency domain unit, to determine a precoding vector of the corresponding frequency domain unit.

In addition, when a transmit antenna is configured with a plurality of polarization directions, the dimensions of the space-frequency matrix may be further extended. For example, for an antenna with dual-polarization directions, the space-frequency matrix may have $2N_s \times N_f$ or $N_f \times 2N_s$ dimensions. It should be understood that a quantity of polarization directions of a transmit antenna is not limited in the embodiments.

(14) Space-Frequency Combination Coefficient

The space-frequency combination coefficient may also be referred to as a space-frequency coefficient, a weighting coefficient, or the like. Each space-frequency combination coefficient may correspond to one spatial domain vector and one frequency domain vector, or each space-frequency combination coefficient may correspond to one space-frequency vector pair. Each space-frequency combination coefficient is a weighting coefficient, or a weight, of a space-frequency component matrix constructed by the space-frequency vector pair corresponding to the space-frequency combination coefficient. The space-frequency combination coefficient corresponds to one spatial domain vector and one frequency domain vector. An element in an $i^{th}$ row and a $j^{th}$ column of a space-frequency combination coefficient matrix $\tilde{W}$ may be a combination coefficient corresponding to a space-frequency vector pair constructed by an $i^{th}$ spatial domain vector and a $j^{th}$ frequency domain vector. For an antenna with dual-polarization directions, $i \in \{1, 2, \ldots, 2L\}$, and a length of each spatial domain vector is $2N_s$.

In an implementation, to control reporting overheads, a terminal device may report only a subset of 2LM combination coefficients included in the space-frequency combination coefficient matrix $\tilde{W}$. A network device may configure a maximum quantity $K_0$ of space-frequency combination coefficients that can be reported by the terminal device and that correspond to each spatial layer, where $K_0 \leq 2LM$. There may be a proportional relationship between $K_0$ and the total quantity 2LM of the combination coefficients included in $\tilde{W}$. For example, $\beta \cdot 2LM$, where a value of $\beta$ may be $\{\frac{3}{4}, \frac{1}{2}, \frac{1}{4}\}$. In addition, the terminal device may report only $K_1$ space-frequency combination coefficients with non-zero amplitudes, and $K_1 \leq K_0$.

Each space-frequency combination coefficient may include an amplitude and a phase. For example, in a space-frequency combination coefficient $ae^{j\theta}$, a is an amplitude, and $\theta$ is a phase.

In an implementation, amplitude values and phase values of the $K_1$ reported space-frequency combination coefficients may be independently quantized. An amplitude quantization method includes the following steps.

1. The $K_1$ combination coefficients are normalized by using a combination coefficient with a largest amplitude value as a reference. If an $i^{th}$ combination coefficient is $c_i$ before the normalization, the $i^{th}$ combination coefficient is $c_i' = c_i/c_{i_\square}$ after the normalization, where $c_{i_\square}$ is the combination coefficient with the largest amplitude value. After the normalization, the combination coefficient with the largest quantization reference amplitude value is 1.

2. The terminal device reports an index of the combination coefficient with the largest amplitude value, and indication information indicating the index of the combination coefficient with the largest amplitude value may include $\lceil \log_2 K_1 \rceil$ bits.

3. For a polarization direction of the combination coefficient with the largest amplitude value, the quantization reference amplitude value is 1. An amplitude value of a combination coefficient with a largest amplitude value in the other polarization direction may be used as a quantization reference amplitude value in the polarization direction. The quantization reference amplitude value is quantized by using 4 bits and is reported, and candidate quantization reference amplitude values include $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}, 0\right\}.$$

4. For each polarization direction, 3-bit quantization is performed on a differential amplitude value of each combination coefficient by using a quantization reference amplitude value corresponding to the polarization direction as a reference, and candidate differential amplitude values include $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

The differential amplitude value represents a difference value relative to a quantization reference amplitude value corresponding to the polarization direction. If a quantization reference amplitude value corresponding to a polarization direction of a combination coefficient is A, and a differential amplitude value, obtained by quantization, of the combination coefficient is B, an amplitude value, obtained by quantization, of the combination coefficient is A×B.

5. A phase of each normalized combination coefficient is quantized by using 3 bits (8PSK) or 4 bits (16PSK).

In a plurality of space-frequency vector pairs selected by the terminal device for constructing a precoding matrix, each space-frequency vector pair may correspond to one space-frequency combination coefficient. In the plurality of space-frequency combination coefficients corresponding to the plurality of space-frequency vector pairs, amplitude values of some space-frequency combination coefficients may be zero or close to zero, and quantization values corresponding to the space-frequency combination coefficients may be zero. A space-frequency combination coefficient whose amplitude is quantized by using a quantization value of zero may be referred to as a space-frequency combination coefficient with a zero amplitude. Correspondingly, amplitude values of some space-frequency combination coefficients are large, and quantization values corresponding to the space-frequency combination coefficients are not zero. A space-frequency combination coefficient whose amplitude is quantized by using a non-zero quantization value may be referred to as a space-frequency combination coefficient with a non-zero amplitude. In other words, the plurality of space-frequency combination coefficients corresponding to the plurality of space-frequency vector pairs may include one or more space-frequency combination coefficients with non-zero amplitudes and one or more space-frequency combination coefficients with zero amplitudes.

It should be understood that the space-frequency combination coefficient may be indicated by using a quantization value, may be indicated by using an index of the quantization value, or may be indicated by using a non-quantization value. A manner of indicating the space-frequency combination coefficient is not limited in the embodiments, provided that a receive end can learn of the space-frequency combination coefficient. In the following description, for ease of description, information used to indicate the space-frequency combination coefficient is referred to as quantization information of the space-frequency combination coefficient. The quantization information may be, for example, a quantization value, an index, or any other information that may be used to indicate the space-frequency combination coefficient.

(15) Dual-Domain Compression

The dual-domain compression may include compression of two dimensions: spatial domain compression and frequency domain compression. The spatial domain compression may mean that one or more spatial domain vectors are selected from a spatial domain vector set, as a vector used to construct a precoding matrix. The frequency domain compression may mean that one or more frequency domain vectors are selected from a frequency domain vector set, as a vector used to construct a precoding matrix. As described above, for example, a matrix constructed by using one spatial domain vector and one frequency domain vector may be referred to as a space-frequency component matrix. The one or more selected spatial domain vectors and the one or more selected frequency domain vectors may be used to construct one or more space-frequency component matrices. A weighted sum of the one or more space-frequency component matrices may be used to construct a space-frequency matrix corresponding to one spatial layer. In other words, the space-frequency matrix may approximate to the weighted sum of the space-frequency component matrix that is constructed by using the one or more selected spatial domain vectors and the one or more selected frequency domain vectors. Based on a space-frequency matrix corresponding to one spatial layer, a precoding vector corresponding to each frequency domain unit at the spatial layer may be further determined.

The one or more selected spatial domain vectors may be used to construct a matrix $W_1$, where each column vector of $W_1$ corresponds to one selected spatial domain vector. The one or more selected frequency domain vectors may be used to construct a matrix $W_3$, where each column vector of $W_3$ corresponds to one selected frequency domain vector. A space-frequency matrix H may be represented as a result of linear combination of the one or more selected spatial domain vectors and the one or more selected frequency domain vectors:

$$H = W_1 \overline{W} W_3^H.$$

A space-frequency matrix corresponding to a spatial layer is used as an example. A space-frequency matrix corresponding to a spatial layer is $H = W_1 \overline{W} W_3^H$.

When a rank R is greater than 1, spatial domain vectors used by spatial layers may not be completely the same, that is, the spatial layers use independent spatial domain vectors; or spatial domain vectors used by the transmission layers may be the same, that is, a plurality of transmission layers share L spatial domain vectors.

When the rank R is greater than 1, frequency domain vectors used by the spatial layers may not be completely the same, that is, the spatial layers use independent frequency domain vectors; or frequency domain vectors used by the spatial layers may be the same, that is, a plurality of spatial layers share M frequency domain vectors. It is assumed that each spatial layer uses an independent frequency domain vector. For example, an $i^{th}$ (where $0 \leq i \leq R-1$, and i is an integer) spatial layer in the R spatial layers corresponds to $M^i$ frequency domain vectors, that is, there are $M^i$ frequency domain vectors that are reported by the terminal device and that correspond to the $i^{th}$ spatial layer. $M^i \geq 1$, and $M^i$ is an integer.

In this case, a precoding vector corresponding to each frequency domain unit on the $i^{th}$ spatial layer may be constructed based on the L spatial domain vectors and the $M^i$ frequency domain vectors.

If a transmit antenna with dual-polarization directions is used, L spatial domain vectors may be selected in each polarization direction. In this case, a dimension of $W_1$ may be $2N_s \times 2L$. In a possible implementation, L same spatial domain vectors $\{b_s^0, b_s^1, \ldots, b_s^{L-1}\}$ may be used in the two polarization directions, where for example, $b_s^0, b_s^1, \ldots, b_s^{L-1}$ may be the L spatial domain vectors selected from the foregoing spatial domain vector set. In this case, $W_1$ may be represented as:

$$\begin{bmatrix} b_s^0 & b_s^1 & \ldots & b_s^{L-1} & 0 & 0 & \ldots & 0 \\ 0 & 0 & \ldots & 0 & b_s^0 & b_s^1 & \ldots & b_s^{L-1} \end{bmatrix}.$$

$b_s^i$ represents the $i^{th}$ spatial domain vector in the L selected spatial domain vectors, and $i = 0, 1, \ldots, L-1$.

For the $i^{th}$ spatial layer, $W_3^H$ may have $M^i \times N_f$ dimensions. Each column vector of $W_3$ may be one frequency domain vector. In this case, each spatial domain vector of $W_1$ and each frequency domain vector of $W_3$ may constitute a space-frequency vector pair, and each space-frequency vector pair may correspond to one space-frequency combination coefficient. Therefore, $2L \times M^i$ space-frequency vector pairs constructed by 2L spatial domain vectors and $M^i$ frequency domain vectors may correspond to $2L \times M^i$ space-frequency combination coefficients one by one.

For the $i^{th}$ spatial layer, $\overline{W}$ may be a coefficient matrix constructed by the $2L \times M^i$ space-frequency combination coefficients, and the coefficient matrix may have $2L \times M^i$ dimensions. An $l^{th}$ row of the coefficient matrix $\overline{W}$ may correspond to an $l^{th}$ spatial domain vector in a first polarization direction of the 2L spatial domain vectors, and an $(L+l)^{th}$ row of the coefficient matrix $\overline{W}$ may correspond to an $l^{th}$ spatial domain vector in a second polarization direction of the 2L spatial domain vectors. An $m^{th}$ (where $0 \leq m \leq -1$, and m is an integer) column of the coefficient matrix $\tilde{W}$ may correspond to an $m^{th}$ frequency domain vector in the W frequency domain vectors.

Therefore, in a dual-domain compression feedback manner, a frequency domain vector and a spatial domain vector that correspond to each of the R spatial layers are fed back, and then a selected position of a space-frequency vector pair for constructing a precoding matrix and a selected space-frequency combination coefficient of each space-frequency vector pair are fed back.

The position of the space-frequency vector pair used to construct the precoding matrix may be a position of a spatial domain vector used to construct the precoding matrix in spatial domain vectors reported by the terminal device and a position of a frequency domain vector used to construct the precoding matrix in frequency domain vectors reported by the terminal device. Because each space-frequency vector pair corresponds to one non-zero space-frequency combination coefficient (also referred to as a non-zero coefficient), the position of the space-frequency vector pair used to construct the precoding matrix is a position of a non-zero coefficient.

It should be understood that a relationship among each spatial layer, the spatial domain vector, and the frequency domain vector that are enumerated above is merely an example and shall not constitute any limitation.

A relationship among the space-frequency matrix H, $W_1$, and $W_3$ shown above is merely an example, and shall not constitute any limitation. A person skilled in the art may perform mathematical transformation on the foregoing relationship based on a same concept, to obtain another calculation formula used to represent the relationship among the space-frequency matrix H, $W_1$, and $W_3$. For example, the space-frequency matrix H may also be represented as $H = W_1 \overline{W} W_3$. In this case, each row vector of $W_3$ may correspond to one selected frequency domain vector.

In dual-domain compression, compression is performed in both spatial domain and frequency domain. When providing feedback, the terminal device may feedback the one or more selected spatial domain vectors and the one or more selected frequency domain vectors to a network device, and does not need to feedback, based on each frequency domain unit (for example, subband), a weighting coefficient (for example, including an amplitude and a phase) of the subband. Therefore, feedback overheads can be greatly reduced. In addition, because a frequency domain vector can represent a change rule of a channel in frequency domain, one or more frequency domain vectors are linearly superposed to simulate a change of the channel in frequency domain. In this way, high feedback precision can still be kept, so that a precoding matrix that is restored by the network device based on the feedback of the terminal device can still adapt to the channel.

It should be understood that, for ease of understanding of dual-domain compression, terms such as the space-frequency matrix and the space-frequency vector pair are separately described above. However, this shall not constitute any limitation. A process in which the terminal device determines a PMI is an internal implementation behavior of the terminal device. The process in which the terminal device determines the PMI is not limited in the embodiments. A process in which the network device determines a precoding matrix based on the PMI is an internal implementation behavior of the network device. The process in which the network device determines the precoding matrix based on the PMI is not limited in the embodiments. The terminal device and the network device may separately generate a PMI and restore a precoding matrix by using different algorithms.

With reference to a possible implementation, the following describes a process in which a terminal device reports a precoding matrix based on dual-domain compression in a related technology.

For example, RI=1, and there are two polarization directions (a horizontal direction and a vertical direction). Precoding matrices corresponding to $N_f$ frequency domain units may be combined into a $2N_1N_2 \times N_f$ matrix $H=[H_1\ H_2\ L\ H_{N_f}]$, where $H=[H_1\ H_2\ L\ H_{N_f}]$ to $H_{N_f}$ are $N_f$ precoding vectors corresponding to the $N_f$ frequency domain units, and $N_1$ and $N_2$ are antenna port quantities in the horizontal direction and the vertical direction respectively. A frequency domain length occupied by a frequency domain unit may be a bandwidth of a frequency domain subband or f times the bandwidth of the frequency domain subband, where for example, $f=\frac{1}{2}$ or $f=\frac{1}{4}$, or may be one RB, two RBs, or four RBs. This is not limited herein. Further, the precoding matrices H corresponding to the $N_f$ frequency domain units are transformed into $H=W_1 \bar{W} W_3^H$.

$W_1^i$ is a matrix (having $2N_1N_2 \times 2L$ dimensions) constructed by selected spatial domain component vectors, and 2L spatial domain component vectors (column vectors of $W_1^i$) in total are included in dual polarization directions, that is, $$W_1 = \begin{bmatrix} b_s^0 & b_s^1 & \ldots & b_s^{L-1} & 0 & 0 & \ldots & 0 \\ 0 & 0 & \ldots & 0 & b_s^0 & b_s^1 & \ldots & b_s^{L-1} \end{bmatrix}.$$

L is a quantity of spatial domain component vectors that are selected for each spatial layer and that are configured by a network device. In an implementation, a same spatial domain component vector is selected for the two polarization directions, where the selected spatial domain component vector $b_s^{I(i)}$ (i=0, 1, . . . , L−1) is an $i^{th}$ spatial domain component vector selected from a rotation DFT basis matrix (having $N_1N_2 \times N_1N_2$ dimensions), and correspondingly, I(i) represents an index corresponding to the selected spatial domain component vector. The rotation 2D-DFT basis matrix may be represented as:

$$B_{N_1,N_2}(q_1,q_2)=(R_{N_1}(q_1)D_{N_1}) \otimes (R_{N_2}(q_2)D_{N_2}).$$

$D_N$ is an orthogonal DFT matrix of N×N, and an element in an $m^{th}$ row and an $n^{th}$ column is $$[D_N]_{m,n} = \frac{1}{\sqrt{N}} e^{\frac{j2\pi mn}{N}} \cdot R_N(q) = \mathrm{diag}\left(\left[e^{j2\pi \cdot 0 \cdot \frac{q}{N}} e^{j2\pi \cdot 1 \cdot \frac{q}{N}} \ldots e^{j2\pi \cdot (N-1) \cdot \frac{q}{N}}\right]\right)$$

represents an N×N rotation matrix. Assuming that a rotation factor q is evenly distributed, $$q_1 = \frac{i}{o_1}, i = 0, 1, \ldots, O_1-1, q_2 = \frac{i}{o_2},$$

and i=0, 1, . . . , $O_2$−1. Correspondingly, a matrix constructed by a product of the rotation matrix and the orthogonal DFT matrix satisfies $$[R_N(q)D_N]_{m,n} = \frac{1}{\sqrt{N}} e^{\frac{j2\pi m(n+q)}{N}}.$$

$W_3$ is a matrix constructed by a selected frequency domain component vector. The selected frequency domain component vector may be selected from a predefined DFT basis matrix or a rotation DFT basis matrix (with a dimension of $N_f \times N_f$). The network device configures a quantity M of frequency domain component vectors included in $W_3$ corresponding to each spatial layer, where a value of M is related to a quantity $N_f$ of frequency domain units, and $M=\lceil p \cdot N_f \rceil$. A value of p may be $\{\frac{1}{2}, \frac{1}{4}\}$. If all spatial domain component vectors at one spatial layer correspond to same M frequency domain component vectors, $W_3^H$ has $M \times N_f$ dimensions, and each column vector of $W_3$ corresponds to one frequency domain component vector. In this case, frequency domain component vectors corresponding to each spatial domain component vector are all the M frequency domain component vectors of $W_3$.

$\bar{W}$ is a space-frequency combination coefficient matrix and has 2L×M dimensions. An $i^{th}$ row of the space-frequency combination coefficient matrix $\bar{W}$ corresponds to an $i^{th}$ spatial domain component vector in the 2L spatial domain component vectors, and a $j^{th}$ column of the space-frequency combination coefficient matrix $\bar{W}$ corresponds to a $j^{th}$ frequency domain component vector in the M frequency domain component vectors. A space-frequency combination coefficient corresponding to the $i^{th}$ spatial domain component vector is an element included in the $i^{th}$ row vector of the space-frequency combination coefficient matrix $\bar{W}$.

To control reporting overheads, the network device configures a maximum quantity $K_0$ ($K_0 \le 2LM$) of actually reported combination coefficients in $\bar{W}$ corresponding to each spatial layer. A value of $K_0$ is related to the quantity L of spatial domain component vectors and the quantity M of frequency domain component vectors, and $K_0=\lceil \beta \cdot 2LM \rceil$. A value of β may be $\{\frac{3}{4}, \frac{1}{2}, \frac{1}{4}, \frac{1}{8}\}$. For example, if all spatial domain component vectors correspond to same M frequency domain component vectors, after space-frequency compression is performed, a terminal device can report a maximum of $K_0$ element subsets in 2L×M combination coefficients. In addition, the terminal device may further report only $K_1$ combination coefficients whose amplitudes are not 0 and that correspond to the $K_0$ combination coefficient subsets, and indexes of the $K_1$ elements ($K_1 \le K_0$). It may be understood that the $K_0$ combination coefficients are a subset of the 2LM combination coefficients, and the actually reported $K_1$ combination coefficients are a subset of the $K_0$ combination coefficients. The indexes of the $K_1$ elements may be indicated by using a bitmap (where the bitmap includes 2LM bits).

In conclusion, for a space-frequency compression codebook, the terminal device needs to report the following information to the network device:

(1) indexes of L spatial domain component vectors included in the matrix $W_1^i$ corresponding to each spatial layer;
(2) indexes of the M frequency domain component vectors included in the matrix $W_3$ corresponding to each spatial layer;
(3) position indication information of a space-frequency combination coefficient corresponding to each spatial layer;
(4) amplitudes of $K_1$ space-frequency combination coefficients reported corresponding to each spatial layer; and
(5) phases of the $K_1$ space-frequency combination coefficients reported corresponding to each spatial layer.

In an example, for a position of a space-frequency combination coefficient corresponding to each spatial layer, the terminal device reports the position in the following manner.

For each spatial layer, L spatial domain component vectors are selected from $N_1 \times N_2$ candidate spatial domain component vectors. Indication is performed by using a combination quantity, and $\lceil \log_2 C_{N_1 N_2}^L \rceil$-bit indication overheads are required.

Further, the terminal device may indicate a position of a non-zero combination coefficient using "window+combination quantity+bitmap". Refer to FIG. 1. It is assumed that r spatial layers share one window, $r \in \{1, 2, \ldots, R\}$, and $\lceil \log_2 N_f \rceil$ bits are required to feed back a start position of the window. Assuming that a quantity of frequency domain bases corresponding to each spatial layer is M, a length of the window is M multiplied by a preconfigured coefficient $\alpha$. If 2L spatial domain component vectors of one spatial layer share one combination quantity, indication overheads of the combination quantity are $r \times \lceil \log_2 C_{\alpha M}^M \rceil$ bits. Each layer occupies one bitmap and required indication overheads are $r \times 2L \times M$ bits. Therefore, required total indication overheads are $\lceil \log_2 C_{N_1 N_2}^L \rceil + \lceil \log_2 N_f \rceil + r \times \lceil \log_2 C_{\alpha M}^M \rceil + r \times 2L \times M$ bits.

It can be understood that the indication overheads increase as a quantity of candidate spatial domain component vectors and a quantity of candidate frequency domain component vectors increase. In a MIMO scenario, a quantity of transmit antennas may be increased to improve MIMO performance. In this case, candidate spatial domain component vectors increase. Alternatively, in a MIMO scenario, channel precoding of a finer granularity may be supported, for example, channel precoding at a resource element (RE) level may be supported. In this case, a quantity of candidate frequency domain component vectors increases. Therefore, when the foregoing indication manner is applied to the MIMO scenario, overheads of indication information used to indicate a position of a space-frequency combination coefficient corresponding to each spatial layer are higher.

In view of this, the embodiments may provide a method, to reduce indication overheads for a terminal device to feed back a position of a space-frequency combination coefficient.

The following describes an application scenario of the embodiments.

Figure 2:
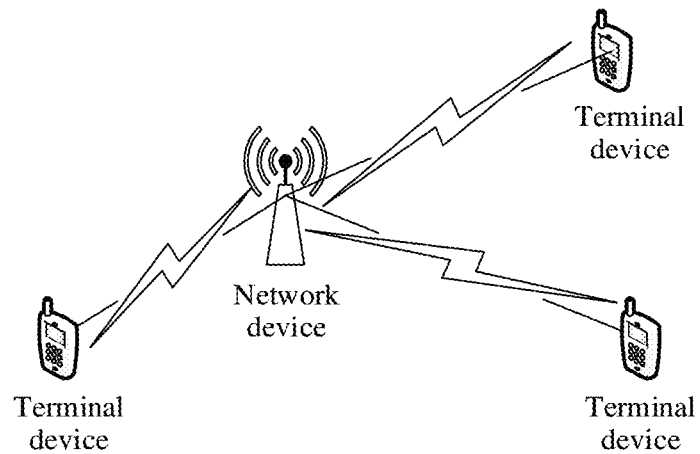
FIG. 2 is a schematic diagram of an example of a network architecture.

FIG. 2 is a schematic diagram of an example of a network architecture according. FIG. 2 includes a network device and a terminal device. The network device and the terminal device may communicate with each other. For example, the network device and the terminal device communicate with each other by using a new radio (NR) communication system, a long term evolution-advanced (LTE-A) system, or the like. A communication system used by the network device and the terminal device is not limited herein. In addition, in FIG. 2, the network architecture includes one network device and three terminal devices. A quantity of network devices and a quantity of terminal devices are merely an example. This is not limited in the embodiments.

The terminal device is also referred to as a terminal, user equipment (UE), a mobile station (MS), a mobile terminal (MT), or the like, and is an independent device that provides voice and/or data connectivity for a user. For example, the terminal device may communicate with a core network by using a radio access network (RAN), and exchange voice and/or data with the RAN. For example, the terminal device may include user equipment (UE), a wireless terminal, a mobile terminal, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal, a portable, a pocket-sized, a handheld, a computer built-in, or a vehicle-mounted mobile apparatus, or a smart wearable device (for example, a smartwatch, smart glasses, a smart helmet, or smart jewelry). Alternatively, the terminal device may further include a limited device, for example, a power limited device, a storage capability limited device, or a computing capability limited device. For example, the terminal device includes an information sensing device such as a barcode, a radio frequency identification (RFID), a sensor, a global positioning system (GPS), or a laser scanner. For another example, the terminal device may be a virtual reality (VR) device, an augmented reality (AR) device, a wireless terminal in industrial control (industrial control), a wireless terminal in self-driving (driverless), a wireless terminal in remote medical surgery, a wireless terminal in a smart grid, a wireless terminal in transportation safety, a wireless terminal in a smart city, or a wireless terminal in a smart home.

The network device may be a (radio) access network (®AN) device. T®(R)AN device includes, for example, a base station (such as an access point) and may be a device that is in an access network and that communicates with a wireless terminal over an air interface and through one or more cells. The (radio) access network device may be configured to perform mutual conversion between a received over-the-air frame and an Internet protocol (IP) packet and serve as a router between a terminal device and a remaining portion of the access network, and the remaining portion of the access network may include an IP network. The (radio) access network device may further coordinate attribute management of the air interface. For example, the (radio) access network device may include a radio network controller (RNC), a NodeB (NB), a base station controller (BSC), a base transceiver station (BTS), a home evolved NodeB (HNB), a baseband unit (BBU), or a wireless fidelity (Wi-Fi) access point (AP). Alternatively, the (radio) access network device may include an evolved NodeB (eNB) in a long term evolution (LTE) system or an LTE-advanced (LTE-A) system. Alternatively, the (radio) access network device may include a next generation NodeB (gNB), a transmission reception point (TRP), or a transmission point (TP) in a 5G system or a new radio (NR) system. Alternatively, the (radio) access network device may include a centralized unit (CU) and/or a distributed unit (DU) in a cloud radio access network (CloudRAN) system, may be a node in an integrated access backhaul (IAB) system, or may be a road side unit (RSU) in a vehicle network system. This is not limited in the embodiments.

The following describes the embodiments with reference to the accompanying drawings.

Embodiment 1

Figure 3:
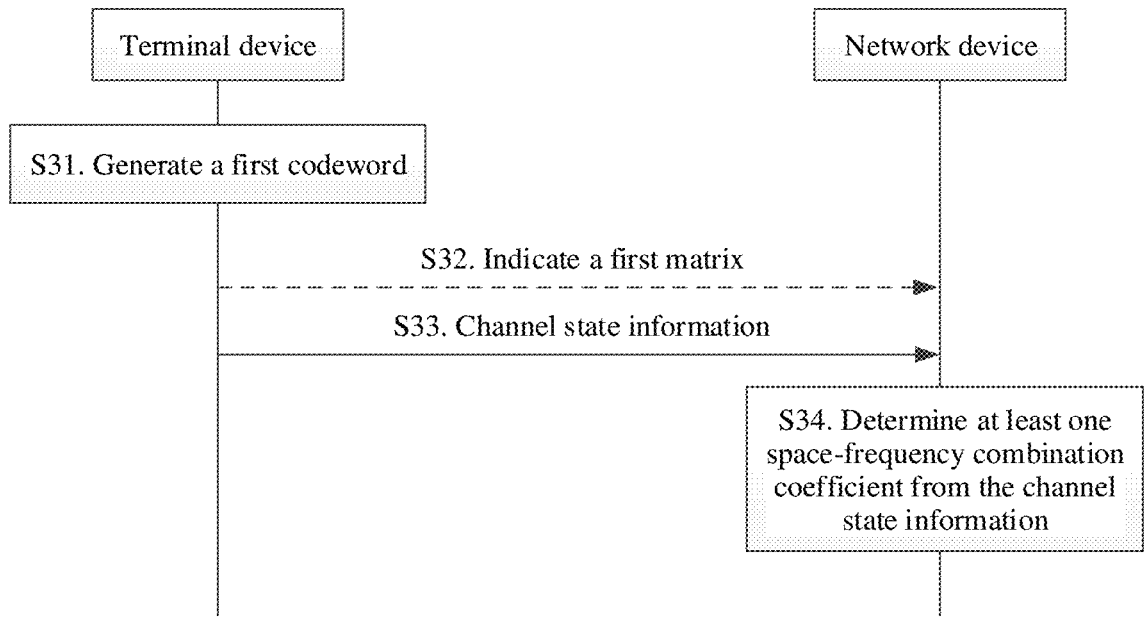
FIG. 3 is a flowchart of an example of an information transmission method according to an embodiment.

FIG. 3 is a flowchart of a channel state information transmission method according to an embodiment. The flowchart is as follows:

S31. A terminal device generates a first codeword.

In this embodiment, the first codeword is obtained based on a second codeword, the second codeword is associated with a first coefficient set of a downlink channel, and the first coefficient set includes an element included in at least one row vector or column vector of a first coefficient matrix.

Manners of determining the first coefficient matrix may include, but are not limited to, the following four manners:

First manner: The first coefficient matrix is determined based on a first matrix, a second matrix, and a third matrix, the third matrix is a channel matrix or a precoding matrix of the downlink channel, and the third matrix satisfies a product of the first matrix, the first coefficient matrix, and the second matrix.

In an example, the first matrix may be understood as the foregoing described matrix $W_1$ corresponding to each spatial layer or some elements in the matrix $W_1$, the second matrix may be understood as the foregoing described matrix $W_3$ corresponding to each spatial layer or some elements in the matrix $W_3$, and the third matrix may be understood as the foregoing described space-frequency matrix H. In this case, the first coefficient matrix may be understood as a matrix $\tilde{W}$.

Second manner: third matrix is a channel matrix or a precoding matrix of the downlink channel, and the third matrix satisfies a product of the first matrix and the first coefficient matrix.

In an example, in this case, it may be understood as that a network device indicates the second matrix in the first manner to the terminal device through beamforming. In other words, in this manner, the first coefficient matrix determined by the terminal device may be understood as a result of multiplying the first coefficient matrix in the first manner by a known number.

Third manner: The first coefficient matrix is determined based on a second matrix and a third matrix, the third matrix is a channel matrix or a precoding matrix of the downlink channel, and the third matrix satisfies a product of the first coefficient matrix and the second matrix.

In an example, in this case, it may be understood as that a network device indicates the first matrix in the first manner to the terminal device through beamforming. In other words, in this manner, the first coefficient matrix determined by the terminal device may be understood as a result of multiplying a known number by the first coefficient matrix in the first manner.

Fourth manner: The first coefficient matrix is determined based on a third matrix, and the third matrix is a channel matrix or a precoding matrix of the downlink channel.

In this case, it may be understood as that a network device indicates both the first matrix and the second matrix in the first manner to the terminal device through beamforming, and the first coefficient matrix is a result of measuring a reference signal by the terminal device.

It should be noted that a process of determining the first coefficient matrix is not described in Embodiment 1. A manner of determining the first coefficient matrix is to be described in detail in Embodiment 2.

It should be additionally noted that each spatial layer or receive port is in a one-to-one correspondence with one third matrix and one first coefficient matrix.

In the following description, an example in which the first coefficient matrix is understood as the matrix $\tilde{W}$ is used for description. That is, elements included in the first coefficient matrix are space-frequency combination coefficients in the matrix $\tilde{W}$. In this case, the second codeword is associated with at least one space-frequency combination coefficient of the downlink channel between the terminal device and the network device. The downlink channel is a channel on which the network device sends downlink information (including downlink data or control instructions) to the terminal device, for example, may be a channel on which a reference signal sent by the network device and received by the terminal device is located. It should be noted that the space-frequency combination coefficient is used to construct a precoding matrix or a channel matrix. In another embodiment, the space-frequency combination coefficient may have another name, for example, may also be referred to as a first coefficient or a weight coefficient. In the embodiments, a name of the space-frequency combination coefficient is not limited. The following uses the space-frequency combination coefficient as an example for description.

First, a relationship between the second codeword and the first coefficient set is described.

An element in the second codeword is an element included in the first coefficient set, and a quantity of elements included in the second codeword is equal to a quantity of elements included in the first coefficient set. The second codeword includes each element in the first coefficient set; an element in the first coefficient set may be split into "amplitude+phase" for separate quantization, and the second codeword includes an amplitude value of each element in the first coefficient set; or an element in the first coefficient set may be split into "real part+imaginary part" for separate quantization, and the second codeword includes a real part of each element in the first coefficient set, or the second codeword includes an imaginary part of each element in the first coefficient set.

For example, when the element in the first coefficient set is a space-frequency combination coefficient, the second codeword may include the at least one space-frequency combination coefficient; if each space-frequency combination coefficient may be split into "amplitude+phase" for separate quantization, the second codeword may include an amplitude value of each of the at least one space-frequency combination coefficient; or if each space-frequency combination coefficient may be split into "real part+imaginary part" for separate quantization, the second codeword may include a real part of each space-frequency combination coefficient, or the second codeword includes an imaginary part of each space-frequency combination coefficient.

The second codeword may be obtained by processing an element in the first coefficient matrix.

In an example, elements included in a row vector or column vector of a first coefficient matrix are located in adjacent positions in the second codeword. That is, the second codeword is obtained by performing concatenation or combination based on a row vector or column vector of a first coefficient matrix. For example, if a first coefficient matrix includes two row vectors, the second codeword may be obtained by placing the $2^{nd}$ row vector after the $1^{st}$ row vector.

For example, the second codeword may be obtained by combining the at least one space-frequency combination coefficient. For example, the second codeword is associated with two space-frequency combination coefficients. Assuming that a first space-frequency combination coefficient is A and a second space-frequency combination coefficient is B, the second codeword is [A, B]. It should be noted that, if the first space-frequency combination coefficient and the second space-frequency combination coefficient each are a sequence, when the first space-frequency combination coefficient and the second space-frequency combination coefficient are combined, a sequence corresponding to one of the space-frequency combination coefficients may be directly added after a sequence corresponding to the other space-frequency combination coefficient.

In another example, elements included in a row vector or column vector of a first coefficient matrix are at equal intervals in the second codeword. For example, if a first coefficient matrix includes two row vectors, the second codeword may be obtained by interpolating and combining the $1^{st}$ row vector and the $2^{nd}$ row vector, and interpolating is performed by one element.

For example, the second codeword is associated with two space-frequency combination coefficients. The $1^{st}$ element in a sequence corresponding to a second space-frequency combination coefficient is added after the $1^{st}$ element in a sequence corresponding to a first space-frequency combination coefficient, the $2^{nd}$ element in the sequence corresponding to the second space-frequency combination coefficient is added after the $2^{nd}$ element in the sequence corresponding to the first space-frequency combination coefficient, and the rest can be deduced by analogy, to obtain a concatenated sequence.

In another example, elements included in row vectors or column vectors located in a same position in first coefficient matrices are located in adjacent positions in the second codeword. That is, if a first coefficient matrix includes two row vectors, the second codeword may be obtained by interpolating and combining the $1^{st}$ row vector and the $2^{nd}$ row vector, and interpolating may be performed by any quantity of elements.

For example, the second codeword is associated with two space-frequency combination coefficients. The $1^{st}$ element in a sequence corresponding to a second space-frequency combination coefficient is added after the $1^{st}$ element in a sequence corresponding to a first space-frequency combination coefficient, the $2^{nd}$ element and the $3^{rd}$ element in the sequence corresponding to the second space-frequency combination coefficient are added after the $3^{rd}$ element in the sequence corresponding to the first space-frequency combination coefficient, the $4^{th}$ element in the sequence corresponding to the second space-frequency combination coefficient is added after the $4^{th}$ element in the sequence corresponding to the first space-frequency combination coefficient, and the rest can be deduced by analogy, to obtain a concatenated sequence.

In another example, it is still assumed that the second codeword may be obtained by combining the at least one space-frequency combination coefficient. The second codeword may be obtained by performing a mathematical operation on the at least one space-frequency combination coefficient. For example, the second codeword is associated with two space-frequency combination coefficients, and the second codeword may be obtained by adding a preset threshold to each space-frequency combination coefficient and then combining two addition results. Assuming that a first space-frequency combination coefficient is A, a second space-frequency combination coefficient is B, and the preset threshold is C, the second codeword is [A+C, B+C]. Also, the mathematical operation may alternatively be subtracting a preset threshold from each space-frequency combination coefficient, performing a multiplication operation on each space-frequency combination coefficient and a preset weight value, or another operation. This is not limited herein. If each space-frequency combination coefficient corresponds to one sequence, performing a mathematical operation may be performing an operation on elements in a same position in sequences.

In another example, the second codeword may be obtained by converting the at least one space-frequency combination coefficient according to a preset rule. For example, the terminal device and the network device may store a mapping relationship between a space-frequency combination coefficient and a preset value. The mapping relationship may be shown in Table 1. In Table 1, a space-frequency combination coefficient A corresponds to a numerical value 1, and a space-frequency combination coefficient A corresponds to a numerical value 2.

TABLE 1

| Space-frequency combination coefficient | Numerical value |
|---|---|
| A | 1 |
| B | 2 |

Assuming that a first space-frequency combination coefficient is A and a second space-frequency combination coefficient is B, the second codeword is [1, 2]. If each space-frequency combination coefficient corresponds to one sequence, the foregoing mapping processing needs to be performed on each element in the sequence.

In another example, the second codeword may be obtained by performing normalization processing on the at least one space-frequency combination coefficient. For example, assuming that a first space-frequency combination coefficient is A and a second space-frequency combination coefficient is B, the second codeword is [A/A+B, B/A+B]. If each space-frequency combination coefficient corresponds to one sequence, normalization processing needs to be performed on each element in the sequence.

It should be noted that the relationship between the second codeword and the first coefficient set is not limited to the foregoing several cases, and cases are not enumerated one by one herein. When the second codeword includes the amplitude value of each element in the first coefficient set or the real part or the imaginary part of each space-frequency combination coefficient, a processing manner is similar to that in the foregoing process. Details are not described herein.

In a related technology, the terminal device may feed back CSI in, but not limited to, the following two manners. The first manner is explicit feedback. In this manner, the terminal device feeds back a channel matrix by using the CSI, and three-dimensional signal space corresponding to the channel matrix is three-dimensional signal space "transmit antenna-receive antenna-frequency". In an example, the terminal device may perform dual-domain compression on a "transmit antenna" dimension (that is, a spatial domain dimension) and a "frequency domain" dimension in the three-dimensional signal space, and then report a space-frequency combination coefficient obtained through the dual-domain compression, that is, the first coefficient matrix. In another example, a base station may send a CSI-reference signal (RS) for each beam. In this way, the terminal device may directly determine a to-be-reported space-frequency combination coefficient, namely, the first coefficient matrix, based on the received CSI-RS. In this case, each space-frequency combination coefficient may be understood as a space-frequency combination coefficient of a frequency domain basis vector corresponding to a spatial domain basis vector on a receive antenna or may be understood as a space-frequency combination coefficient of a spatial domain basis vector corresponding to a frequency domain basis vector on a receive antenna. The second manner is implicit feedback. In this manner, the terminal device feeds back a precoding matrix by using the CSI, and three-dimensional signal space corresponding to the precoding matrix is three-dimensional signal space "transmit antenna-spatial layer-frequency". In an example, the terminal device may perform dual-domain compression on a "transmit antenna" dimension (that is, a spatial domain dimension) and a "frequency domain" dimension in the three-dimensional signal space, and then report a space-frequency combination coefficient obtained through the dual-domain compression, that is, the first coefficient matrix. In another example, a base station may send a CSI-RS for each beam. In this way, the terminal device may directly determine a to-be-reported space-frequency combination coefficient, namely, the first coefficient matrix, based on the received CSI-RS. In this case, each space-frequency combination coefficient may be understood as a space-frequency combination coefficient of a frequency domain basis vector for a spatial domain basis vector at a spatial layer or may be understood as a space-frequency combination coefficient of a spatial domain basis vector for a frequency domain basis vector at a spatial layer. In this embodiment, a manner in which the terminal device obtains the space-frequency combination coefficient is not limited.

It should be noted that, in this embodiment, the "receive antenna" and the "receive port" may be used interchangeably, and may be a physical antenna unit, or may be a virtualized unit such as a port. This is not limited herein.

Based on the foregoing description, in this embodiment, the first coefficient set may include, but is not limited to, the following several cases:

First case: The first coefficient set is an element included in one row vector or column vector of a first coefficient matrix corresponding to one spatial layer or receive port. An example in which the first coefficient set is an element included in at least one row vector of a first coefficient matrix corresponding to a spatial layer is used for description. In an example, an element included in a row vector of the first coefficient matrix may be understood as a space-frequency combination coefficient of a spatial domain basis vector at the spatial layer. In this case, the first coefficient set may be understood as a space-frequency combination coefficient of a spatial domain basis vector at a spatial layer.

Figure 4:
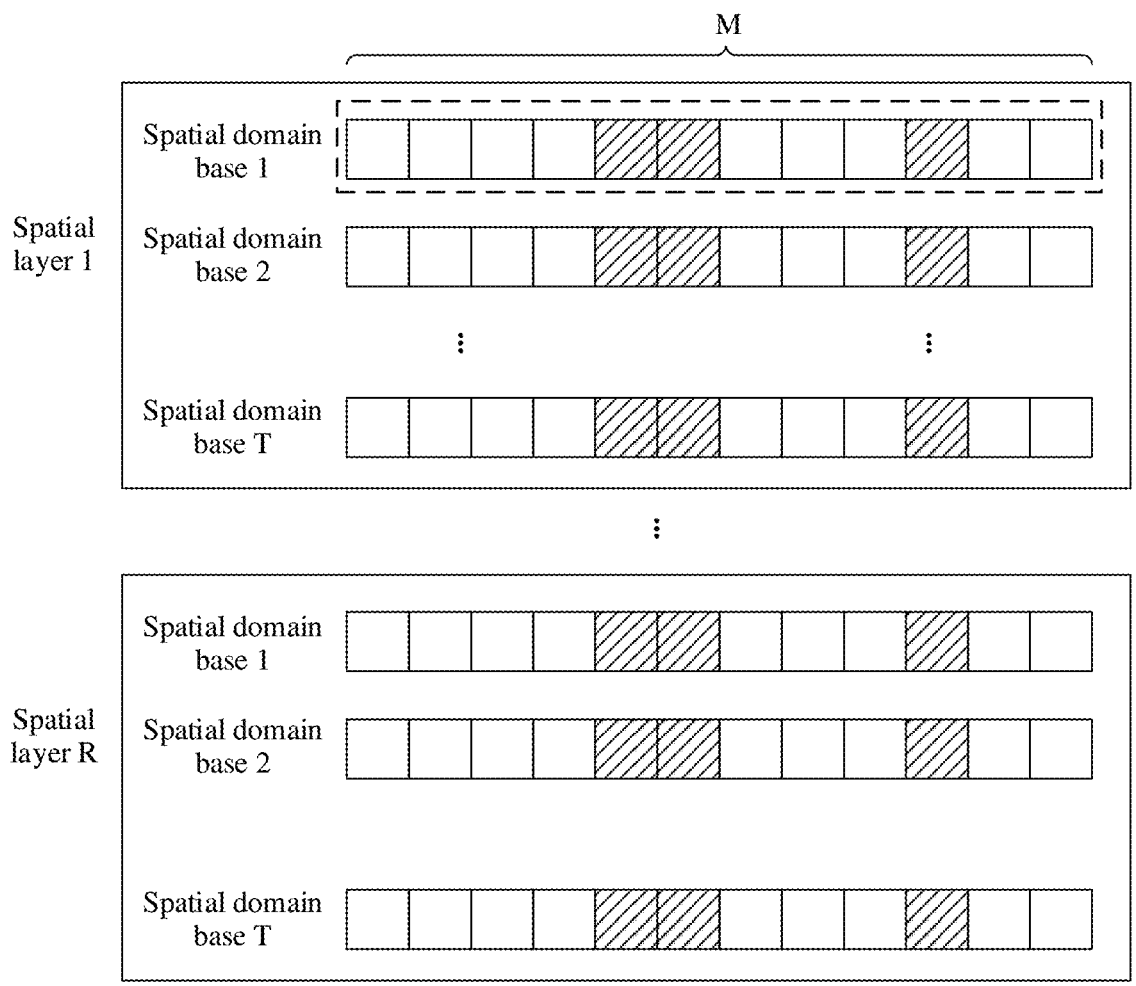
FIG. 4 is a schematic diagram of an example of a first coefficient set according to an embodiment.

FIG. 4 is a schematic diagram of an example of the first coefficient set. In FIG. 4, an example in which a transmit antenna includes two polarization directions (a horizontal direction and a vertical direction), R spatial layers share same T spatial domain bases, and a quantity of frequency domain component vectors corresponding to each spatial domain base is M is used. Each square in FIG. 4 represents a space-frequency combination coefficient corresponding to a space-frequency vector pair at a spatial layer.

In the first case, the first coefficient set may be M space-frequency combination coefficients corresponding to any spatial domain base at any spatial layer in FIG. 4. In FIG. 4, the first coefficient set is M space-frequency combination coefficients corresponding to a spatial domain base 1 at a spatial layer 1, as shown by a dashed box in FIG. 4. Alternatively, the first coefficient set may be M space-frequency combination coefficients corresponding to a spatial domain base 1 at a spatial layer 2. Examples are not described one by one herein.

It should be noted that, in this embodiment, for ease of description, when numbering is used, consecutive numbering may start from 1. For example, the R spatial layers may include the $1^{st}$ spatial layer (that is, the spatial layer 1) to an $R^{th}$ spatial layer (that is, a spatial layer R), and the T spatial domain bases may include the $1^{st}$ spatial domain base (that is, the spatial domain base 1) to a $T^{th}$ spatial domain base (that is, a spatial domain base T), and so on. Examples are not described one by one herein. Further, an implementation is not limited thereto. For example, consecutive numbering may alternatively start from 0. It should be understood that the foregoing descriptions are all provided for ease of describing the embodiments, but are not intended to limit the scope of the embodiments.

Second case: The first coefficient set is elements included in at least two row vectors or column vectors located in a same position in at least two first coefficient matrices corresponding to at least two spatial layers or receive ports, and the at least two row vectors or column vectors include one row vector or column vector of each first coefficient matrix. An example in which the first coefficient set is an element included in at least one row vector of a first coefficient matrix corresponding to a spatial layer is used for description. In an example, an element included in a row vector of the first coefficient matrix may be understood as a space-frequency combination coefficient of a spatial domain basis vector at the spatial layer. In this case, the first coefficient set may be understood as space-frequency combination coefficients of a same spatial domain basis vector at least two spatial layers.

Figure 5:
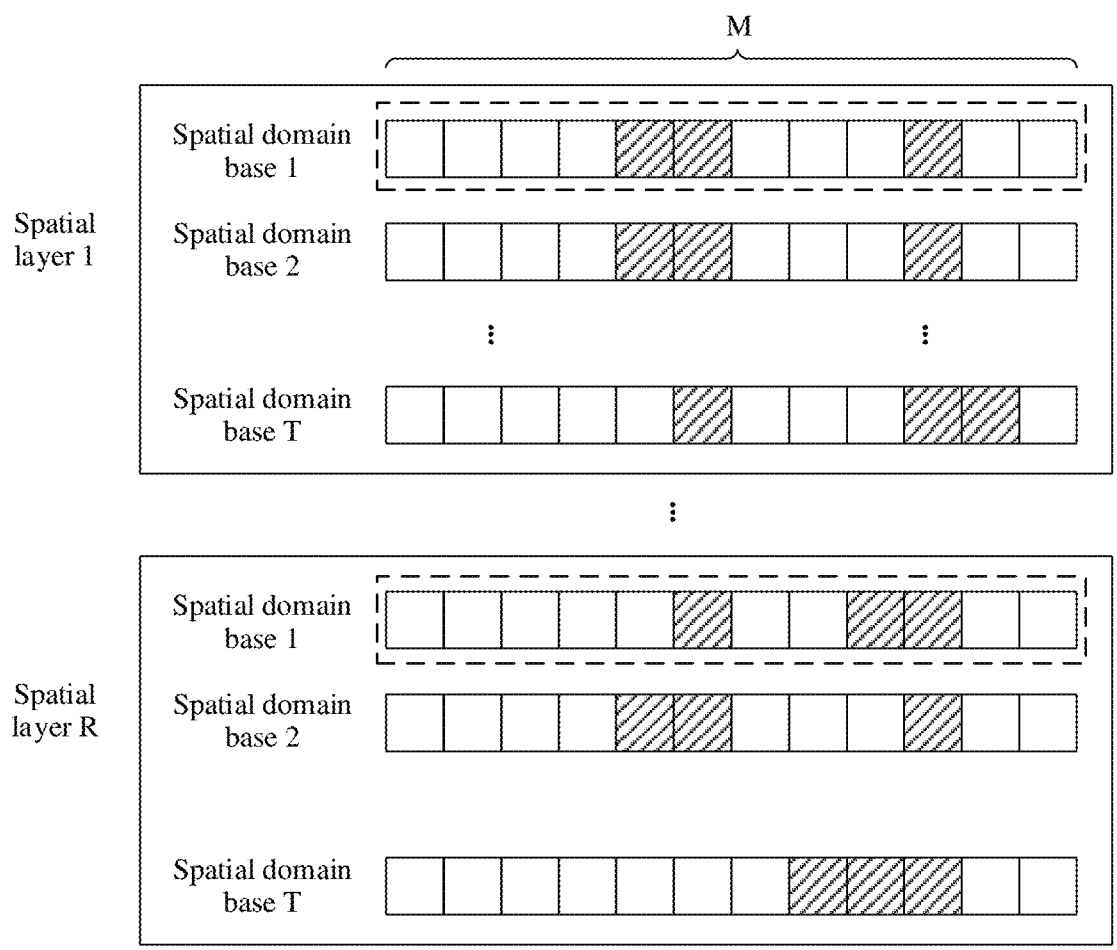
FIG. 5 is a schematic diagram of an example of a first coefficient set according to an embodiment.

FIG. 5 is a schematic diagram of another example of the first coefficient set. A polarization direction of a transmit antenna, a quantity of spatial layers, a quantity of spatial domain bases, and a quantity of frequency domain component vectors corresponding to each spatial domain base in FIG. 5 are similar to those in FIG. 4. Details are not described herein again.

In the second case, the first coefficient set is X×M space-frequency combination coefficients corresponding to a same spatial domain base at X spatial layers or may be understood as X×M space-frequency combination coefficients located in a same position at X spatial layers, where X is an integer greater than or equal to 2. In FIG. 5, an example in which a value of X is 2 is used. The first coefficient set is 2M space-frequency combination coefficients corresponding to a spatial domain base 1 at a spatial layer 1 and a spatial layer 2, that is, the first rows of space-frequency combination coefficients at the spatial layer 1 and the spatial layer 2 in FIG. 5, as shown by dashed boxes in FIG. 5. Also, the first coefficient set may alternatively be space-frequency combination coefficients of another spatial domain base at another spatial layer, for example, 2M space-frequency combination coefficients corresponding to a spatial domain base 2 at a spatial layer 2 and a spatial layer 4. Details are not described herein.

Third case: The first coefficient set is elements included in at least two row vectors or column vectors of a first coefficient matrix corresponding to one spatial layer or receive port. An example in which the first coefficient set is elements included in at least one row vector of a first coefficient matrix corresponding to a spatial layer is used for description. In an example, an element included in a row vector of the first coefficient matrix may be understood as a space-frequency combination coefficient of a spatial domain basis vector at the spatial layer. In this case, the first coefficient set may be understood as space-frequency combination coefficients of at least two spatial domain basis vectors at a same spatial layer.

Figure 6:
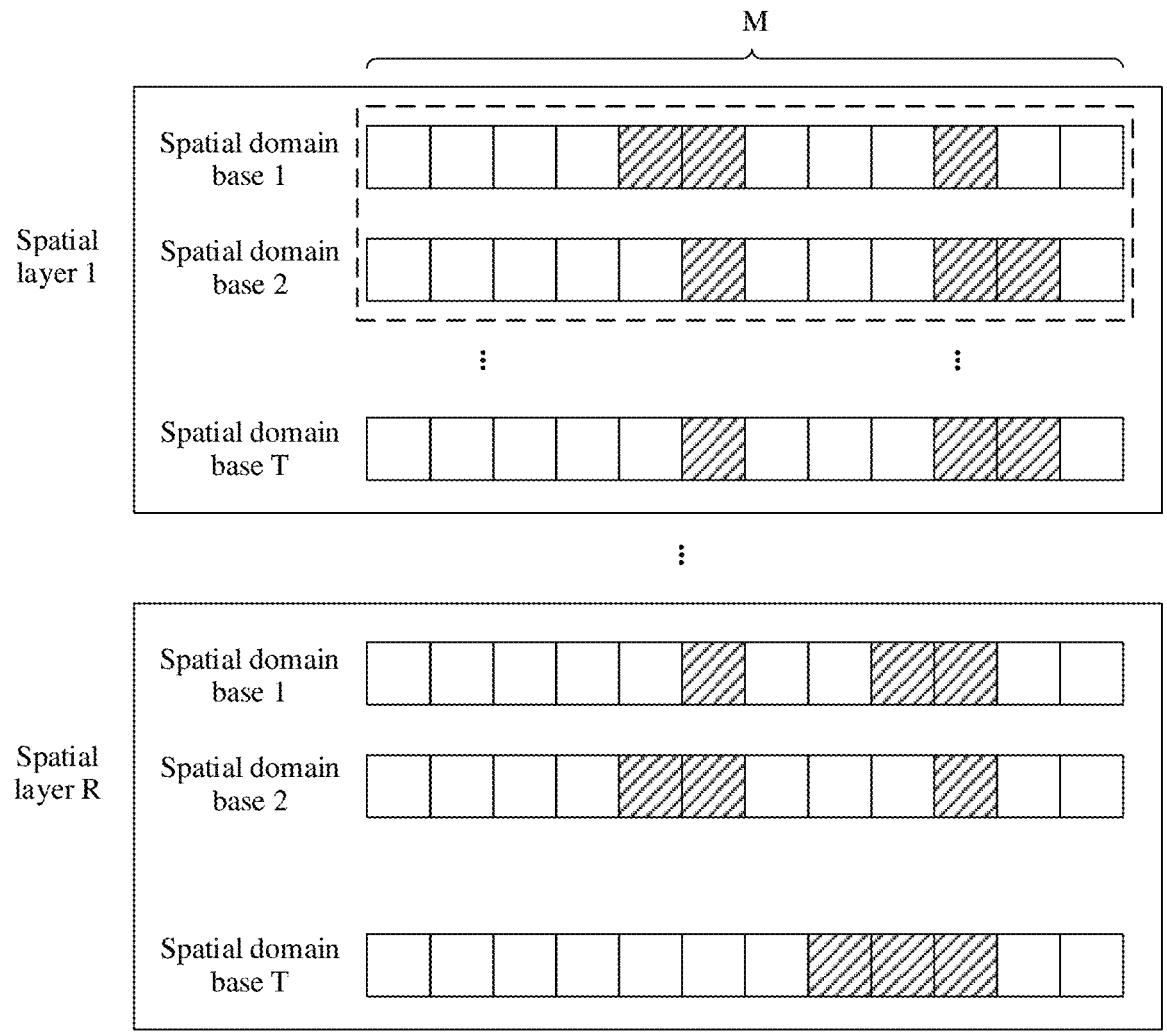
FIG. 6 is a schematic diagram of an example of a first coefficient set according to an embodiment.

FIG. 6 is a schematic diagram of another example of the first coefficient set. A polarization direction of a transmit antenna, a quantity of spatial layers, a quantity of spatial domain bases, and a quantity of frequency domain component vectors corresponding to each spatial domain base in FIG. 6 are similar to those in FIG. 4. Details are not described herein again.

In the third case, the first coefficient set is X×M space-frequency combination coefficients corresponding to X spatial domain bases at a same spatial layer or may be understood as X×M space-frequency combination coefficients located in different positions at a same spatial layer, where X is an integer greater than or equal to 2. In FIG. 6, an example in which a value of X is 2 is used. The first coefficient set is 2M space-frequency combination coefficients of a spatial domain base 1 and a spatial domain base 2 at a spatial layer 1, that is, the first row of space-frequency combination coefficients and the second row of space-frequency combination coefficients at the spatial layer 1 in FIG. 6, as shown by a dashed box in FIG. 6. Also, the first coefficient set may alternatively be space-frequency combination coefficients of other spatial domain bases at another spatial layer, for example, 2M space-frequency combination coefficients of a spatial domain base 2 and a spatial domain base 3 at a spatial layer 2. Details are not described herein.

Fourth case: The first coefficient set is elements included in at least two row vectors or column vectors located in a same position in at least two first coefficient matrices corresponding to at least two spatial layers or receive ports, and the at least two row vectors or column vectors include at least two row vectors or column vectors of each first coefficient matrix. An example in which the first coefficient set is elements included in at least one row vector of a first coefficient matrix corresponding to a spatial layer is used for description. In an example, an element included in a row vector of the first coefficient matrix may be understood as a space-frequency combination coefficient of a spatial domain basis vector at the spatial layer. In this case, the first coefficient set may be understood as space-frequency combination coefficients of at least two spatial domain basis vectors at least two spatial layers.

Figure 7:
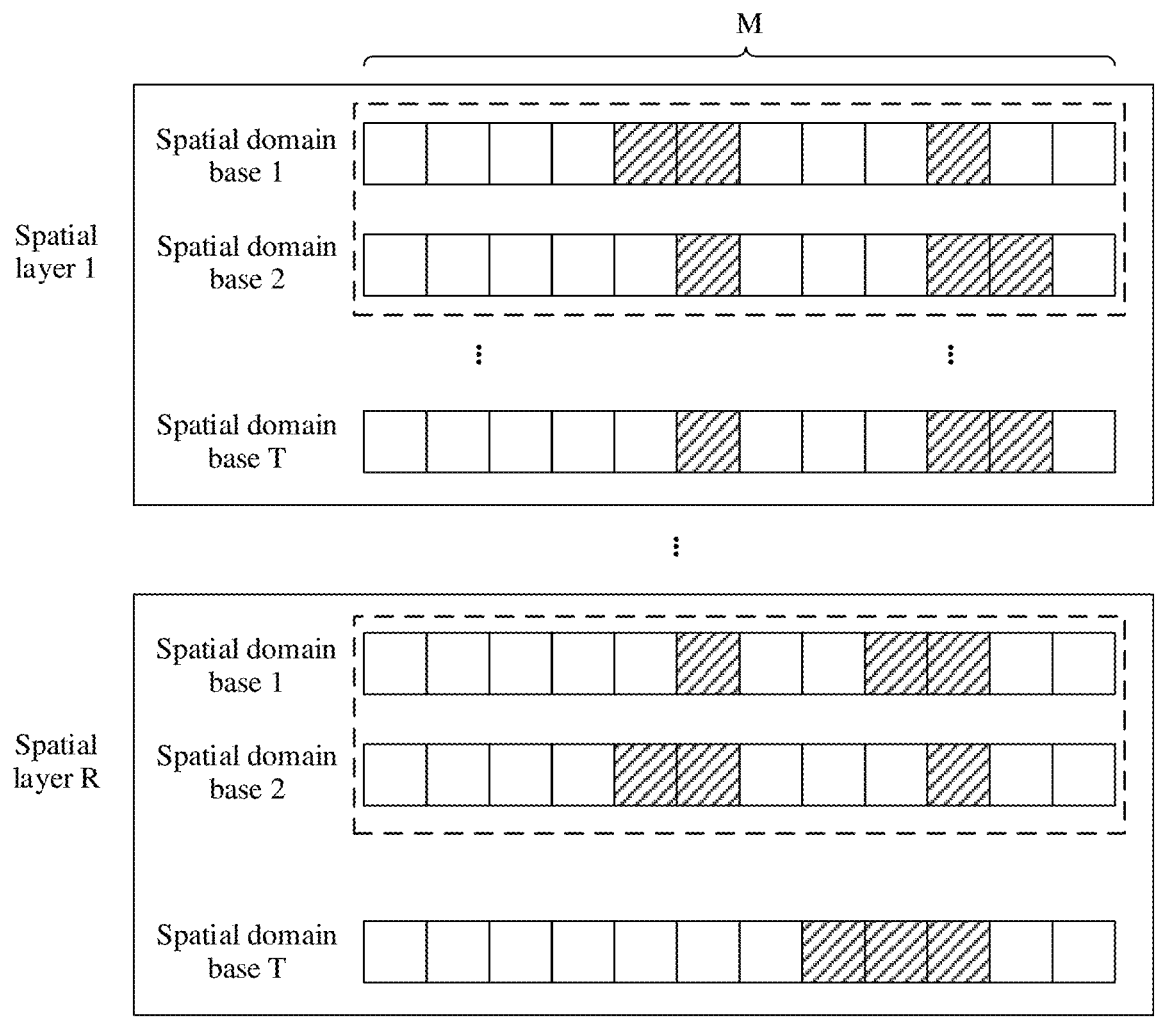
FIG. 7 is a schematic diagram of an example of a first coefficient set according to an embodiment.

FIG. 7 is a schematic diagram of another example of the first coefficient set. A polarization direction of a transmit antenna, a quantity of spatial layers, a quantity of spatial domain bases, and a quantity of frequency domain component vectors corresponding to each spatial domain base in FIG. 7 are similar to those in FIG. 4. Details are not described herein again.

In the fourth case, the first coefficient set is X×Y×M space-frequency combination coefficients of X spatial domain bases at Y spatial layers, where X is an integer greater than or equal to 2. In FIG. 7, an example in which values of X and Y are both 2 is used. The first coefficient set may be 2M space-frequency combination coefficients of a spatial domain base 1 at a spatial layer 1 and a spatial layer 2 and 2M space-frequency combination coefficients of a spatial domain base 2 at the spatial layer 1 and the spatial layer 2, that is, the first row of space-frequency combination coefficients and the second row of space-frequency combination coefficients at the spatial layer 1 and the first row of space-frequency combination coefficients and the second row of space-frequency combination coefficients at the spatial layer 2 in FIG. 7, as shown by dashed boxes in FIG. 7. Additionally, the first coefficient set may alternatively be space-frequency combination coefficients of other spatial domain bases at other spatial layers, for example, 2M space-frequency combination coefficients of a spatial domain base 2 at a spatial layer 2 and a spatial layer 3 and 2M space-frequency combination coefficients of a spatial domain base 3 at the spatial layer 2 and the spatial layer 3. Details are not described herein.

It should be noted that, in the example shown in FIG. 7, the first coefficient set is space-frequency combination coefficients of a plurality of different spatial domain bases at a same spatial layer, for example, the space-frequency combination coefficients at the spatial layer 1 and the spatial layer 2.

Figure 8:
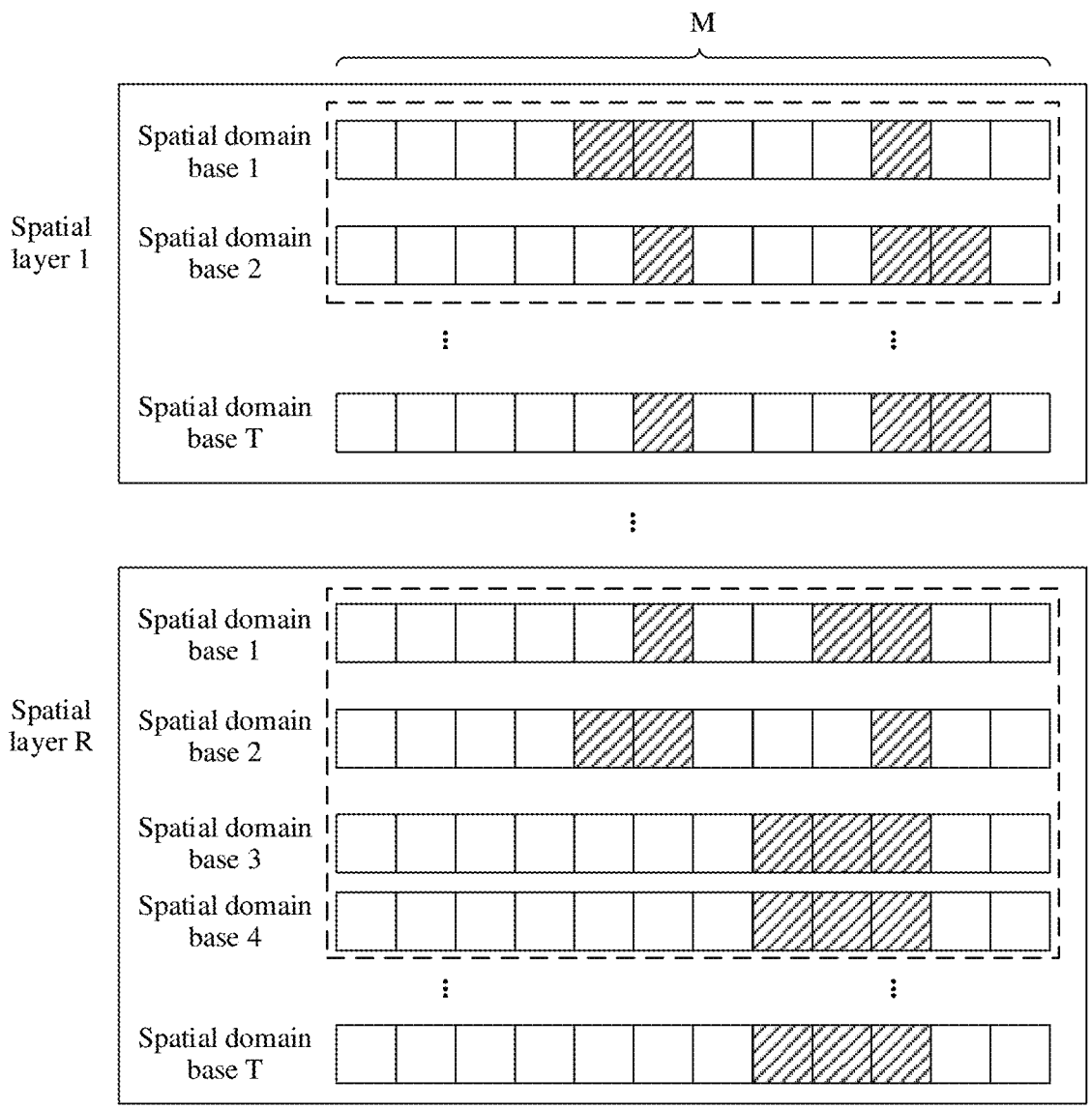
FIG. 8 is a schematic diagram of an example of a first coefficient set according to an embodiment.

Fifth case: The first coefficient set is elements included in at least two row vectors or column vectors located in different positions in at least two first coefficient matrices corresponding to at least two spatial layers or receive ports, and the at least two row vectors or column vectors include at least two row vectors or column vectors of each first coefficient matrix. An example in which the first coefficient set is an element included in at least one row vector of a first coefficient matrix corresponding to a spatial layer is used for description. In an example, an element included in a row vector of the first coefficient matrix may be understood as a space-frequency combination coefficient of a spatial domain basis vector at the spatial layer. In this case, the first coefficient set may be understood as space-frequency combination coefficients of a plurality of different spatial domain bases at a plurality of different spatial layers. As shown by dashed lines in FIG. 8, the first coefficient set is 2M space-frequency combination coefficients of a spatial domain base 1 at a spatial layer 1 and a spatial layer 2 and 3M space-frequency combination coefficients of a spatial domain base 2 at the spatial layer 2 to a spatial layer 4.

It should be noted that, in the foregoing examples, the first coefficient set is an element included in at least one row vector of a first coefficient matrix corresponding to a spatial layer. When the first coefficient set is an element included in at least one row vector of a first coefficient matrix corresponding to an interface port, cases of an element included in the first coefficient set may be similar to that in the foregoing examples. Details are not described herein again.

Figure 9:
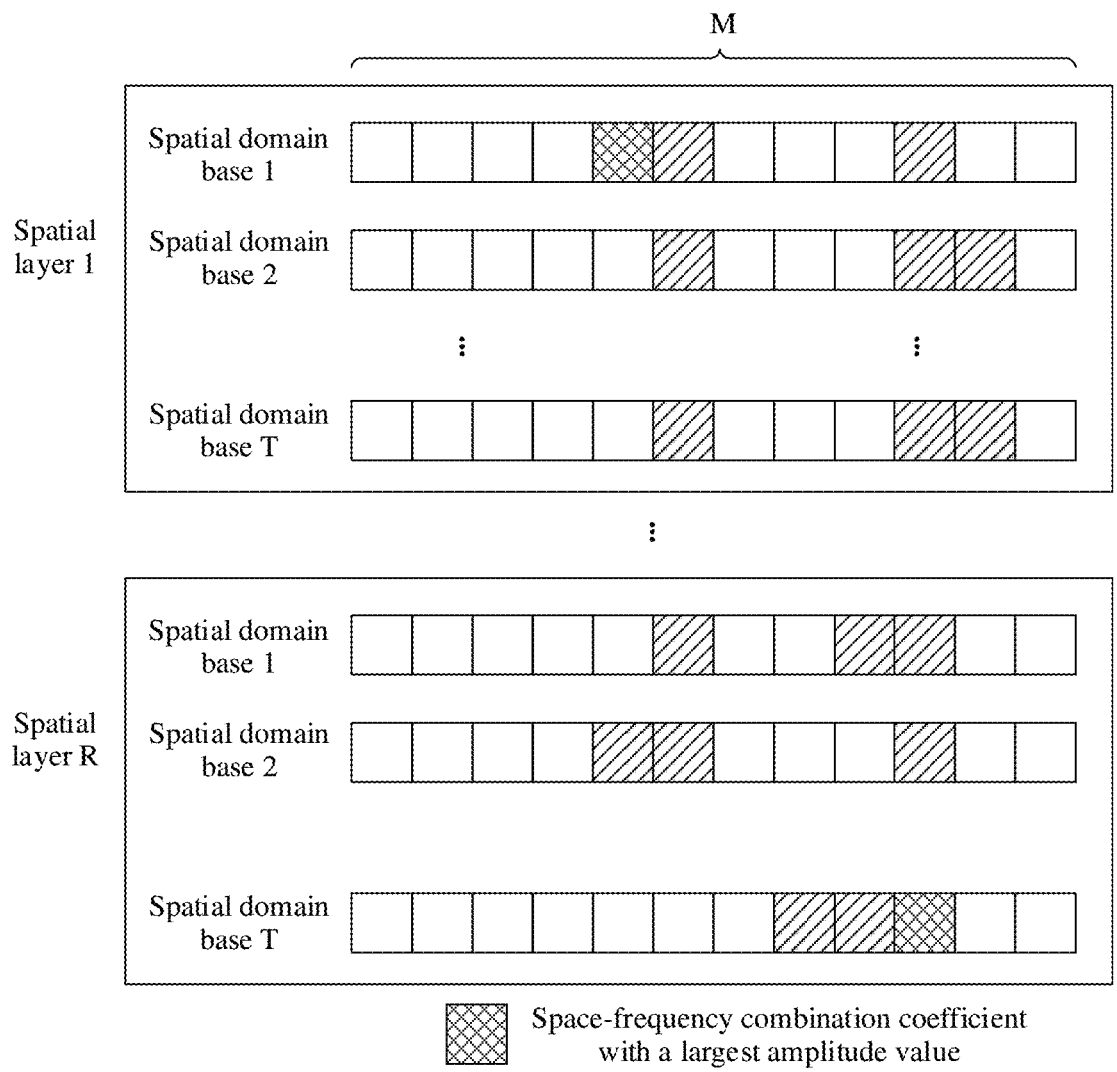
FIG. 9 is a schematic diagram of an example of a first coefficient set according to an embodiment.

In addition, it should be noted that, for any one of the first case to the fifth case, in an example in which an element included in a row vector of a first coefficient matrix may be understood as a space-frequency combination coefficient of a spatial domain basis vector at a spatial layer, the first coefficient set may include only a part of M space-frequency combination coefficients corresponding to the spatial domain basis vector at one spatial layer or on one receive antenna, for example, include only a plurality of space-frequency combination coefficients with large amplitude values. The foregoing third case is used as an example. Refer to FIG. 9. A shadow block in each row of space-frequency combination coefficients in FIG. 9 is a space-frequency combination coefficient whose amplitude value is greater than a threshold or may be understood as an area in which non-zero space-frequency combination coefficients are centralized or an area in which a quantity of non-zero space-frequency combination coefficients is greater than a threshold. In this case, the first coefficient set is a part of a plurality of non-zero space-frequency combination coefficients of the spatial domain base 1 and the spatial domain base 2 at the spatial layer 1, as shown by a dashed box in FIG. 9, that is, a plurality of space-frequency combination coefficients in a window whose window length is M (a quantity of frequency domain bases) multiplied by a preconfigured coefficient α. Therefore, a length of the second codeword can be reduced, and overheads can be reduced. In this case, a start position and the window length of the window further need to be separately indicated. A manner of indicating the start position and the window length of the window is similar to that in the foregoing related technology. Details are not described herein again.

In an example, the start position and the window length of the window may be indicated based on a long periodicity. The indication based on the long periodicity may be understood as that a periodicity of indicating the start position and the window length of the window is greater than a periodicity of sending channel state information by the terminal device to the network device, for example, may be several times the periodicity of sending the channel state information by the terminal device to the network device. Therefore, the periodicity of sending the channel state information by the terminal device to the network device may also be referred to as a short periodicity. In this case, it may be understood as that a same window is used at a plurality of moments. In another example, the start position and the window length of the window may be indicated based on a short periodicity, that is, may be the same as a periodicity of sending channel state information by the terminal device to the network device. In this case, it may be understood as that the windows used at a plurality of moments may not be completely the same.

Further, for the implicit feedback manner, space-frequency combination coefficients with largest amplitude values at different spatial layers are located in different positions. For example, refer to FIG. 9. A space-frequency combination coefficient with a largest amplitude value in space-frequency combination coefficients at a spatial layer 1 is located in the 5$^{th}$ block in the first row, and a space-frequency combination coefficient with a largest amplitude value at a spatial layer R is located in the last but two block in the last row. To further reduce overheads, cyclic shift processing may be performed on all space-frequency combination coefficients corresponding to all spatial domain bases at each spatial layer, so that elements with largest amplitude values at different spatial layers or receive ports are located in same columns of corresponding first coefficient matrices. It may be understood as that space-frequency combination coefficients with largest amplitude values at different spatial layers are located in a same frequency domain unit. For example, a frequency domain component vector corresponding to a strongest space-frequency component vector corresponding to each spatial layer is the 1$^{st}$ frequency domain component vector in a candidate frequency domain component vector sequence, or a frequency domain component vector corresponding to a strongest space-frequency component vector corresponding to each spatial layer is a frequency domain component vector in the middle of a candidate frequency domain component vector sequence. The space-frequency combination coefficient with the largest amplitude value may be understood as a strongest space-frequency component vector or a strongest space-frequency pair.

Figure 10:
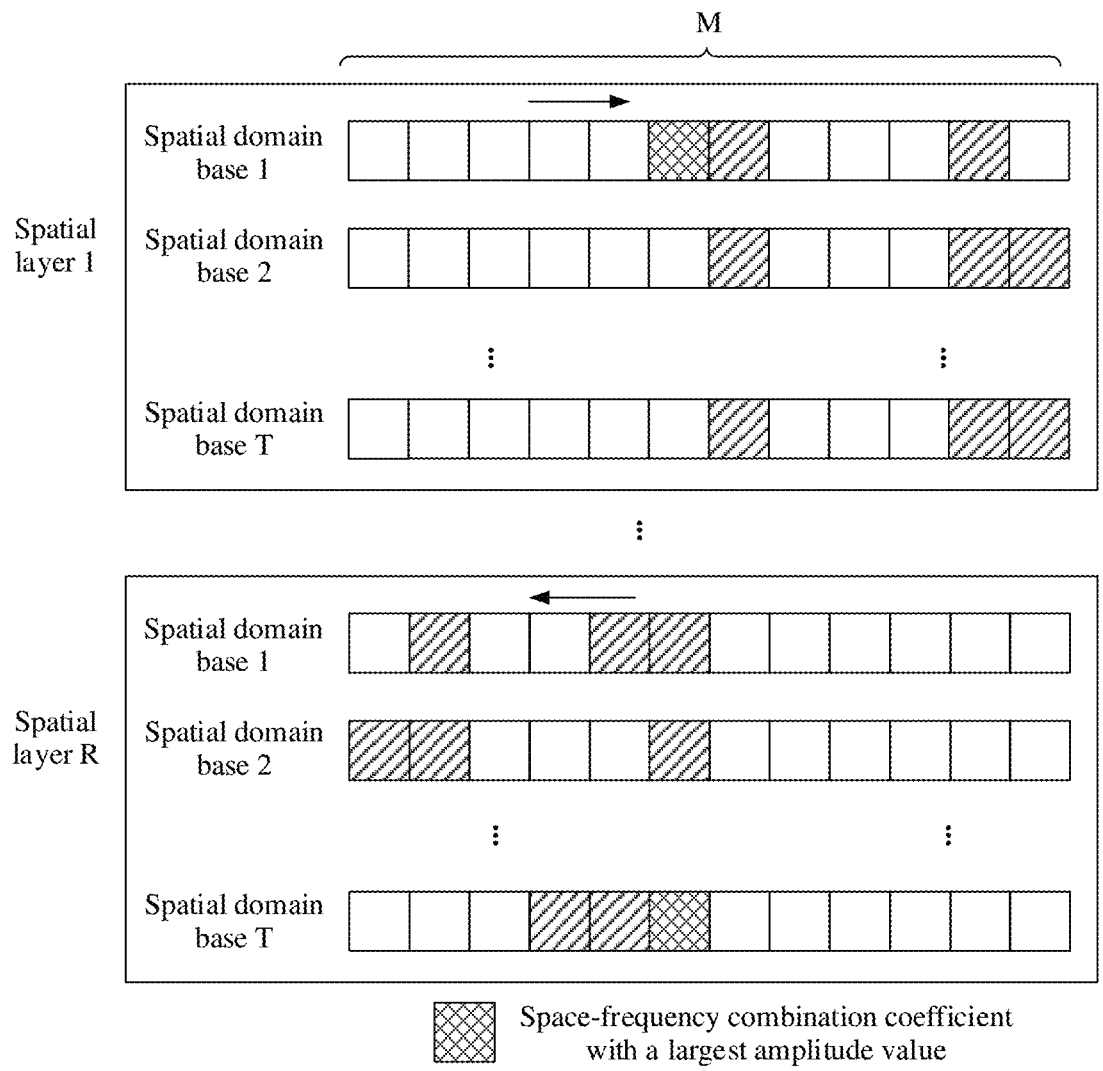
FIG. 10 is a schematic diagram of an example of a first coefficient set according to an embodiment.

The terminal device may move, onto a frequency domain vector in a fixed position (for example, a frequency domain component vector in a middle position, where the fixed position may also be referred to as a fixed index value, and for example, an index value 5), a frequency domain component vector that is in m frequency domain component vectors including a union set of $M_{i,j}$ frequency domain component vectors corresponding to each of $T_i$ spatial domain component vectors corresponding to an i$^{th}$ spatial layer and that corresponds to a space-frequency combination coefficient with a largest amplitude value, and perform same cyclic shift on indexes of other $M^i-1$ frequency domain component vectors in sequence. In this embodiment, in the frequency domain component vectors corresponding to each spatial layer, the frequency domain component vector corresponding to the strongest space-frequency component vector is the 6$^{th}$ frequency domain component vector (with an index value of 5) in the candidate frequency domain component vector sequence. In an example, the foregoing shift is performed on the plurality of space-frequency combination coefficients shown in FIG. 9. For example, the space-frequency combination coefficient with the largest amplitude value at each spatial layer in FIG. 9 is moved to the 6$^{th}$ block, and a plurality of space-frequency combination coefficients shown in FIG. 10 may be obtained.

T is a quantity of spatial domain component vectors at each spatial layer. If the quantity of spatial domain component vectors at each spatial layer is different, $T_i$ is the quantity of spatial domain component vectors at an i$^{th}$ spatial layer, where i∈{0, 1, . . . , R−1}.

M is a quantity of frequency domain component vectors corresponding to each spatial domain component vector at each spatial layer. If the quantity of frequency domain component vectors corresponding to each spatial domain component vector is different, $M_{i,j}$ is a quantity of frequency domain component vectors corresponding to a j$^{th}$ spatial domain component vector at the i$^{th}$ spatial layer, where j∈{0, 1, . . . , $L_i$−1}.

$M^i$ is a quantity of frequency domain component vectors constructed by the union set of the $M_{i,j}$ frequency domain component vectors corresponding to each of the $T_i$ spatial domain component vectors corresponding to the i$^{th}$ spatial layer.

After shifting the frequency domain component vector corresponding to the strongest space-frequency component vector corresponding to each spatial layer to the 6$^{th}$ frequency domain component vector in the candidate frequency domain component vector sequence, the terminal device may first determine a quantity $M_2$ of the plurality of frequency domain component vectors, and then select a start position of the plurality of frequency domain component vectors. Because the plurality of frequency domain component vectors selected by the terminal device need to include the frequency domain component vector (the 6$^{th}$ in the candidate frequency domain component vector sequence) corresponding to the strongest space-frequency component vector, and the quantity $M_2$ of the plurality of frequency domain component vectors is known, there are a total of $M_2$ possible cases for the start position of the plurality of frequency domain component vectors, and a quantity of bits occupied for indicating the start position of the plurality of frequency domain component vectors is $\lceil \log_2 M_2 \rceil$. $M_2$ is less than $N_f$. Therefore, overheads for feeding back the start position of the plurality of frequency domain component vectors can be reduced based on the shift manner. $N_f$ is a quantity of frequency domain units included in a CSI reporting bandwidth.

A reason why the $M^i$ frequency domain component vectors are reported after cyclic shift is performed on the $M^i$ frequency domain component vectors may be that although the $M^i$ frequency domain component vectors reported by the terminal device are m frequency domain component vectors obtained through the cyclic shift, calculation of a CQI by the network device is not affected.

In a channel measurement process, the terminal device may select a corresponding frequency domain component vector for each spatial layer based on a currently estimated channel matrix. It is assumed that $M^i$ frequency domain component vectors selected for all spatial domain component vectors at an $i^{th}$ (where $0 \leq i \leq R-1$, and i is an integer) spatial layer are $\{v_{f(0)}, v_{f(1)}, \ldots, v_{f(M^i-1)}\}$. A matrix $W_3{}^H = [v_{f(0)}, v_{f(1)} \ldots v_{f(M^i-1)}]$ may be constructed, where an index corresponding to a $k^{th}$ (where $0 \leq k \leq M^i-1$, and k is an integer) frequency domain component vector is f(k). A fixed offset $\lambda$ is adjusted for an index value of each frequency domain component vector in the $M^i$ frequency domain component vectors. For example, a frequency domain component vector $v_{f(k)}$ whose index is f(k) is adjusted to a frequency domain component vector whose index value is $m(k) = \mod(f(k)+\lambda, N_3)$. In this case, a group of new frequency domain component vectors $\{v_{m(0)}, v_{m(1)}, \ldots, v_{m(M^i-1)}\}$ may be obtained, and the $M^i$ frequency domain component vectors may be used to construct a matrix $\hat{W}_3{}^H = [v_{m(0)} v_{m(1)} \ldots v_{m(M^i-1)}]$. For each frequency domain unit, there is only one fixed phase differing between a precoding matrix corresponding to the space-frequency matrix restored by the network device based on $H = W_1 \check{W} W_3{}^H$ and a precoding matrix corresponding to the space-frequency matrix restored by the network device based on $H = W_1 \check{W} \hat{W}_3{}^H$, and therefore CQI calculation is not affected. Therefore, impact on system performance can be ignored. In other words, reporting $M^i$ frequency domain vectors $\{v_{f(0)}, v_{f(1)}, \ldots, v_{f(M_{i,j}-1)}\}$ by the terminal device is equivalent to reporting $M^i$ frequency domain vectors $\{v_{m(0)}, v_{m(1)}, \ldots, v_{m(M_{i,j}-1)}\}$ by the terminal device. A reason is as follows:

$$v_{f(k)+\lambda} = \left[ 1 \ e^{-\frac{j2\pi(f(k)+\lambda)}{N_f}} \ \ldots \ e^{-\frac{j2\pi(f(k)+\lambda)(N_f-1)}{N_f}} \right] = \underbrace{\left[ 1 \ e^{-\frac{j2\pi(f(k))}{N_f}} \ \ldots \ e^{-\frac{j2\pi(f(k))(N_f-1)}{N_f}} \right]}_{v_{f(k)}} \times \begin{bmatrix} 1 & & & \\ & e^{-j2\pi\lambda \cdot \frac{1}{N_f}} & & \\ & & \ddots & \\ & & & e^{-j2\pi\lambda \cdot \frac{N_f-1}{N_f}} \end{bmatrix}.$$

Therefore, the terminal device may use a frequency domain component vector obtained by performing cyclic shift on an index value to replace a frequency domain component vector that is used before the cyclic shift. For example, a frequency domain component vector that is obtained by performing cyclic shift and whose index value is m(k) is used to replace the frequency domain component vector whose index value is f(k).

In an optional embodiment, if $K_2 + M_2 \leq N_f$, indexes of the plurality of frequency domain component vectors are $K_2$ to $K_2 + M_2 - 1$; or if $K_2 + M_2 > N_f$, indexes of the plurality of frequency domain component vectors are $K_2$ to $N_f - 1$ and 0 to $(K_2 + M_2 - 1) \mod N_f$.

A plurality of consecutive frequency domain component vectors in this embodiment may have a "cyclic" characteristic. In a candidate frequency domain component vector sequence including $N_f$ candidate frequency domain component vectors, if the length of the window exceeds a tail of the sequence, a remaining window covers a header of the sequence. An example in which $N_f = 10$ (indexes of the 10 candidate frequency domain component vectors are sequentially 0 to 9) is used. For a plurality of consecutive frequency domain component vectors, if a start position is $K_2 = 3$ and a quantity is $M_2 = 5$, indexes of five frequency domain component vectors corresponding to the window length are sequentially 3 to 7. For a plurality of consecutive frequency domain component vectors, if a start position is $K_2 = 8$ and a quantity is $M_2 = 5$, indexes of five frequency domain component vectors corresponding to the window length are sequentially 8 to 9 and 0 to 2. According to the foregoing cyclic characteristic, the length of the window may be as small as possible, so that fewer bits are used to indicate the start position and the window length of the window, helping reduce reporting overheads of the terminal device.

After obtaining the second codeword, the terminal device obtains the first codeword based on the second codeword.

The terminal device may first calculate a fourth matrix, which is denoted as a matrix cp. The fourth matrix is a dictionary matrix used to compress an element in the first coefficient set. In this embodiment, the fourth matrix may include, but is not limited to, one or a combination of a plurality of the following features:

1 Amplitude values of a plurality of elements included in each column correspond to a same candidate value set, where the candidate value set includes a plurality of different candidate values.

For example, the fourth matrix is a Q1×Q2 matrix, and each element in the fourth matrix may be quantized by using "amplitude+phase". In this case, each column of the fourth matrix includes Q1 elements. Because amplitude values of the Q1 elements are selected from a same candidate value set, the amplitude values of the Q1 elements may be completely the same, or elements with a same amplitude value exist in the Q1 elements and elements with different amplitude values exist in the Q1 elements, that is, amplitude values of some elements are the same. Alternatively, the amplitude values of the Q1 elements are different from each other.

2. Amplitude values of a plurality of elements included in each row correspond to a same candidate value set, where the candidate value set includes a plurality of different candidate values.

For example, the fourth matrix is a Q1×Q2 matrix, and each element in the fourth matrix may be quantized by using "amplitude+phase". In this case, each row of the fourth matrix includes Q2 elements. Because amplitude values of the Q2 elements are selected from a same candidate value set, the amplitude values of the Q2 elements may be completely the same, or elements with a same amplitude value exist in the Q2 elements and elements with different amplitude values exist in the Q2 elements, that is, amplitude values of some elements are the same. Alternatively, the amplitude values of the Q2 elements are different from each other.

3. Phase differences between every two adjacent elements in a plurality of elements included in each column correspond to a same candidate value set, where the candidate value set includes a plurality of different candidate values.

For example, the fourth matrix is a Q1×Q2 matrix, and each element in the fourth matrix may be quantized by using "amplitude+phase". In this case, each column of the fourth matrix includes Q1 elements. Because phase differences between any two adjacent elements in the Q1 elements are selected from a same candidate value set, the phase differences between any two adjacent elements in the Q1 elements are not completely the same. For example, a phase difference between the $1^{st}$ element and the $2^{nd}$ element in the first column is different from a phase difference between the $2^{nd}$ element and the $3^{rd}$ element in the first column, but the phase difference between the $1^{st}$ element and the $2^{nd}$ element is the same as a phase difference between the $3^{rd}$ element and the $4^{th}$ element in the first column. Alternatively, phase differences between any two adjacent elements in the first column are different.

4. Phase differences between every two adjacent elements in a plurality of elements included in each row correspond to a same candidate value set, where the candidate value set includes a plurality of different candidate values.

For example, the fourth matrix is a Q1×Q2 matrix, and each element in the fourth matrix may be quantized by using "amplitude+phase". In this case, each row of the fourth matrix includes Q2 elements. Because phase differences between any two adjacent elements in the Q2 elements are selected from a same candidate value set, the phase differences between any two adjacent elements in the Q2 elements are not completely the same. For example, a phase difference between the $1^{st}$ element and the $2^{nd}$ element in the first row is different from a phase difference between the $2^{nd}$ element and the $3^{rd}$ element in the first row, but the phase difference between the $1^{st}$ element and the $2^{nd}$ element is the same as a phase difference between the $3^{rd}$ element and the $4^{th}$ element in the first row. Alternatively, phase differences between any two adjacent elements in each row are different.

5. The matrix is fed back to the network device by one element, the matrix is fed back to the network device by one vector, or the matrix is fed back to the network device by one matrix of a preset scale.

All elements in the fourth matrix may be sequentially indicated to the network device in a preset order, for example, may be indicated using "amplitude+phase". Alternatively, feedback may be performed by vector, or feedback may be performed by submatrix. The submatrix may be understood as a matrix whose dimension is less than that of the fourth matrix. This is not limited herein.

It should be noted that, in this embodiment, all spatial layers may share one fourth matrix, or each spatial layer may correspond to one fourth matrix. In other words, T fourth matrices need to be calculated for T spatial layers, and then each fourth matrix is reported to the network device.

In an example, the fourth matrix may be a dictionary matrix used in sparse representation of the second codeword or may be another dictionary matrix. This is not limited herein. The fourth matrix and the second codeword may satisfy the following relationship:

The second codeword satisfies a product of the fourth matrix and a first vector or satisfies a product of the first vector and the fourth matrix, where the first vector includes at least one non-zero element; and a quantity of non-zero elements included in the first vector is less than a first preset value, and a difference between the second codeword and a result of multiplying the fourth matrix by the first vector or multiplying the first vector by the fourth matrix is less than a second preset value.

Alternatively, the second codeword satisfies a product of the fourth matrix and a first vector or satisfies a product of the first vector and the fourth matrix, where the first vector includes at least one non-zero element; and a quantity of non-zero elements included in the first vector is less than a first preset value, and an energy ratio of first energy corresponding to a result of multiplying the fourth matrix by the first vector or multiplying the first vector by the fourth matrix to second energy corresponding to the second codeword is greater than or equal to a third preset value.

The second energy corresponding to the second codeword may be understood as information energy of information indicated by the second codeword, and the result of multiplying the first vector by the fourth matrix is also a codeword. In this case, the first energy corresponding to the result of multiplying the first vector by the fourth matrix may be understood as information energy of information indicated by the codeword corresponding to the result. The information energy may be understood as a sum of squares of elements included in a corresponding codeword.

Then, the terminal device may generate a fifth matrix based on the fourth matrix and a preset codeword length of the first codeword, where the fourth matrix and the fifth matrix satisfy a first rule. The first rule is: An eighth matrix satisfies a product of the fifth matrix and the fourth matrix, and a maximum value of a correlation coefficient of any two columns of the eighth matrix is less than a first threshold; or an eighth matrix satisfies a product of the fourth matrix and the fifth matrix, and a maximum value of a correlation coefficient of any two rows of the eighth matrix is less than a first threshold.

Obtaining the fifth matrix based on the fourth matrix may be an iterative process. Each iterative process includes singular value decomposition (singular value decomposition, SVD), and eliminating a component corresponding to a maximum eigenvalue obtained through the SVD. A quantity of iterations included in the iteration process of obtaining the fifth matrix based on the fourth matrix is related to the first threshold.

The correlation coefficient may be understood as a result of dividing an inner product of vectors corresponding to any two rows or two columns by a result of a modulus of the two vectors or an absolute value of the result.

After the fifth matrix is determined, the first codeword is obtained based on the fifth matrix and the second codeword. In this embodiment, the codeword length of the first codeword may be indicated by the network device, may be agreed on in advance, or may be determined by the terminal device. If the codeword length of the first codeword is determined by the terminal device, the terminal device may further indicate the codeword length of the first codeword to the network device, so that the network device learns of the codeword length of the first codeword. It should be noted that after calculating the fifth matrix, the terminal device may report the fifth matrix to the network device or may not report the fifth matrix. This is not limited herein.

In this embodiment, the terminal device may calculate the fourth matrix in a plurality of manners. In an example, the fourth matrix may be obtained by solving historical signal space of a channel by using an SVD algorithm or a K-singular value decomposition (K-SVD, K-SVD) algorithm, that is, the historical signal space of the channel is used to replace future signal space of the channel. The historical signal space of the channel may include signal space obtained by combining, according to a preset rule, a plurality of reference signals received in preset duration before the fourth matrix is calculated. The preset rule may be following a sequence of receiving time points, or the like. This is not limited herein. A person skilled in the art may also calculate the first matrix in other manners. Examples are not described one by one herein.

Further, the fourth matrix may be preset, or a matrix set may be set. The matrix set may be agreed on with the network device in advance. In this case, the terminal device may select one matrix from the matrix set as the fourth matrix. This is not limited herein.

The first codeword, the fourth matrix, and the fifth matrix satisfy the following relationship:

The first codeword and the second codeword are column vectors, and the first codeword satisfies a product of the fifth matrix and the second codeword; or the first codeword and the second codeword are row vectors, and the first codeword satisfies a product of the second codeword and the fifth matrix.

The following uses an example to describe a process in which the terminal device obtains the first codeword based on the fifth matrix and the second codeword.

As shown in FIG. 11, the second codeword is a column vector $N_3 \times 1$, and is denoted as $h_{i,l}$, and the fifth matrix is an $X_1 \times N_3$ matrix, and is denoted as a matrix $\emptyset$. A multiplication operation is performed on the second codeword and the fifth matrix, to obtain a column vector of $X_1 \times 1$, that is, the first codeword, which is denoted as $s_{i,l}$. A relationship among the three satisfies the following expression:

$$s_{i,l} = \emptyset \times h_{i,l} \qquad (1)$$

As shown in FIG. 11, the terminal device compresses an N3-dimensional column vector into an $X_1$-dimensional column vector based on the matrix $\emptyset$. The compression refers to dimension reduction. Additionally, in an actual use process, because the matrix $\emptyset$ differs, the length of the second codeword may be the same as the length of the first codeword after the operation that is based on the matrix $\emptyset$. A dimensional relationship between the first codeword and the second codeword is not limited herein.

S32. The terminal device indicates the fourth matrix to the network device.

If the fourth matrix is obtained through calculation by the terminal device, the terminal device may transmit the fourth matrix to the network device. If the fourth matrix is a matrix selected by the terminal device from the preset matrix set, the terminal device may send, to the network device, an identifier, such as an index number or a sequence number, of the matrix selected by the terminal device. The terminal device may periodically indicate the fourth matrix to the network device. Alternatively, the terminal device may indicate the fourth matrix to the network device when a preset condition is satisfied. For example, the terminal device may perform compression budgeting on a channel, and then decompress the channel, to determine whether an error between a channel obtained after the decompression and the original channel exceeds a threshold. If the error exceeds the threshold, the terminal device indicates the fourth matrix to the network device. Alternatively, the terminal device indicates the fourth matrix to the network device after receiving a sending indication sent by the network device. A manner of indicating the fourth matrix by the terminal device is not limited herein. In addition, fourth matrices may be the same or may be different at different moments. In other words, a same fourth matrix may be shared at a plurality of moments, or a fourth matrix unique to each moment exists at the moment.

In this embodiment, the terminal device may feedback the fourth matrix to the network device based on a long periodicity, and the terminal device feeds back the first codeword based on a short periodicity, where a value of the long periodicity is greater than a value of the short periodicity.

Alternatively, the terminal device may separately feedback the fourth matrix and the first codeword to the network device, where the terminal device determines to feed back the fourth matrix to the network device in a first case, and determines to feed back the first codeword to the network device in a second case, the first case is that the terminal device satisfies a first preset condition or the terminal device receives a first indication from the network device, and the second case is that the terminal device satisfies a second preset condition or the terminal device receives a second indication from the network device. Alternatively, the terminal device may separately feedback the fourth matrix and the first codeword to the network device, where the terminal device periodically feeds back the fourth matrix to the network device, and the terminal device feeds back the first codeword to the network device in the second case.

Alternatively, the terminal device may separately feedback the fourth matrix and the first codeword to the network device, where the terminal device periodically feeds back the fourth matrix to the network device, and the terminal device feeds back the first codeword to the network device in the second case.

Alternatively, the terminal device may separately feedback the fourth matrix and the first codeword to the network device, where the terminal device feeds back the fourth matrix to the network device in the first case, and the terminal device periodically feeds back the first codeword to the network device.

For example, the terminal device may perform compression budgeting on a channel, and then decompress the channel, to determine whether an error between a channel obtained after the decompression and the original channel exceeds a threshold. If the error exceeds the threshold, it is determined that the first preset condition or the second preset condition is satisfied. The first indication may be understood as an indication that is sent by the network device to the terminal device and that indicates the fourth matrix, and the second indication may be understood as an indication that is sent by the network device to the terminal device and that indicates the first codeword.

It should be noted that step S32 is an optional step, that is, step S32 is not mandatory. For example, the network device may obtain the fourth matrix through calculation based on a same algorithm as that used by the terminal device. In FIG. 3, step S32 is represented by a dashed line as an optional step.

In addition, it should be noted that an execution sequence of step S31 and step S32 is not limited in this embodiment. For example, step S31 may be performed before step S32, or step S31 and step S32 may be simultaneously performed. FIG. 3 is merely an example and should not be understood as a limitation on the execution sequence of the steps.

S33. The terminal device feeds back the first codeword to the network device, and the network device obtains the first codeword.

In this embodiment, the terminal device only needs to report the first codeword to indicate a position and a numerical value of an element in the first coefficient set. This manner is simple. In addition, the codeword length of the first codeword is less than the codeword length of the second codeword, and the second codeword is associated with the element in the to-be-reported first coefficient set. If the element in the first coefficient set is a space-frequency combining quantity, a quantity of bits required for reporting the first codeword by the terminal device is less than a quantity of bits occupied for reporting the at least one space-frequency combination coefficient, so that overheads can be reduced.

S34. The network device determines the element in the first coefficient set based on the first codeword.

In an example, after obtaining the first codeword, the network device may determine the element in the first coefficient set based on the first codeword, the fourth matrix, and the fifth matrix. The fourth matrix may be reported by the terminal device, may be agreed on in advance, or the like. The fifth matrix may be reported by the terminal device, may be agreed on in advance, or may be calculated by the network device based on the codeword length of the first codeword and the fourth matrix in a same calculation manner as that used by the terminal device. Details are not described herein. For the network device, the fourth matrix is a dictionary matrix used by the network device to restore the element in the first coefficient set. The fourth matrix and the fifth matrix satisfy the first rule, and the first rule is: a ninth matrix satisfies a product of the fifth matrix and the fourth matrix, and a maximum value of a correlation coefficient of any two columns of the ninth matrix is less than a first threshold; or a ninth matrix satisfies a product of the fourth matrix and the fifth matrix, and a maximum value of a correlation coefficient of any two rows of the ninth matrix is less than a first threshold.

In an example, a process in which the network device obtains the element in the first coefficient matrix is as follows:

The network device determines the third codeword based on the first codeword, the fourth matrix, and the fifth matrix. A codeword length of the third codeword may be the same as or different from the codeword length of the second codeword. This is not limited herein. The third codeword includes at least one non-zero element. Then, the network device determines the element in the first coefficient matrix based on the third codeword. In an example, if the fourth matrix is a dictionary matrix in sparse representation, the third codeword may be a sparse representation vector of the second codeword.

Content included in the third codeword is similar to that included in the second codeword. The third codeword includes each element in the first coefficient set; the third codeword includes an amplitude value of each element in the first coefficient set; the third codeword includes a real part of each element in the first coefficient set; or the third codeword includes an imaginary part of each element in the first coefficient set.

For example, if the second codeword includes the at least one space-frequency combination coefficient, the third codeword includes the space-frequency combination coefficient; if the second codeword includes the amplitude value of each space-frequency combination coefficient of the at least one space-frequency combination coefficient, the third codeword includes the amplitude value of the space-frequency combination coefficient; if the second codeword includes the real part of each space-frequency combination coefficient of the at least one space-frequency combination coefficient, the third codeword includes the real part of each space-frequency combination coefficient; or if the second codeword includes the imaginary part of each space-frequency combination coefficient of the at least one space-frequency combination coefficient, the third codeword includes the imaginary part of each space-frequency combination coefficient.

As shown in FIG. 12, the network device may solve an underdetermined equation:

$$s_{i,l} = \varnothing \varphi p_{i,l} \qquad (2)$$

The underdetermined equation may be converted into the following problem:

$$\min \|\hat{p}_{i,l}\|_{0/1} \; s.t. \; \|s_{i,l} - \varnothing \varphi \hat{p}_{i,l}\|_2 \leq \varepsilon \qquad (3)$$

$\varepsilon$ is a preset smaller value. $\min\|\hat{p}_{i,l}\|_{0/1}$ is understood as that, in all $\hat{p}_{i,l}$ that satisfy the foregoing expression, the most sparse $\hat{p}_{i,l}$, that is, $\hat{p}_{i,l}$ that has fewest non-zero elements, is selected as a solution, that is, a 0-norm is minimum. Mathematically, a minimum 0-norm is equivalent to a minimum 1-norm. $\|\;\|_2$ indicates calculating a 2-norm. $\hat{p}_{i,l}$ is an estimated value of $p_{i,l}$ obtained through calculation according to the formula (3) and may be understood as the third codeword.

Then, according to the following formula:

$$\hat{h}_{i,l} = \varphi \hat{p}_{i,l} \qquad (4)$$

$\hat{h}_{i,l}$ is obtained through solution, that is, the second codeword is obtained. $\hat{h}_{i,l}$ is an estimated value of $h_{i,l}$ obtained through calculation according to the formula (4). The second codeword is associated with the first coefficient set. It can be understood from step S31 that the second codeword may also be obtained by combining elements in the first coefficient set. Therefore, the elements in the first coefficient set may be obtained by splitting the second codeword. When the second codeword is obtained by performing another operation on the element in the first coefficient set, reverse processing may be performed on the second codeword, to obtain the element in the first coefficient set. Details are not described herein.

In the embodiment shown in FIG. 3, the element in the first coefficient matrix is reported after dimension reduction processing is performed, so that overheads can be reduced. When a spatial layer includes a plurality of first codewords, the terminal device needs to report the plurality of first codewords, that is, perform reporting for a plurality of times, to complete a process of reporting a first coefficient matrix for the spatial layer. In this case, to reduce a quantity of reporting times, a first codeword matrix may be obtained based on a plurality of first codewords corresponding to each spatial layer or each receive port, and then the first codeword matrix is fed back to the network device.

Based on the embodiment shown in FIG. 3, after generating the first codeword, the terminal device may obtain a first codeword matrix based on a plurality of first codewords corresponding to each spatial layer or each receive port. Each spatial layer or each receive port corresponds to one first codeword matrix, the first codeword matrix is determined based on the fifth matrix, the first coefficient matrix, and a seventh matrix, and the first codeword matrix satisfies a product of the seventh matrix, the first coefficient matrix, and the fifth matrix.

Then the terminal device feeds back the first codeword matrix to the network device. Additionally, the terminal device may further determine the seventh matrix based on a sixth matrix, and feedback the sixth matrix to the network device, where the sixth matrix is a dictionary matrix used by the terminal device to compress the first coefficient matrix. Also, the sixth matrix may be preset or agreed on in advance or may be determined by the network device. In this case, the sixth matrix may not need to be fed back. It should be noted that, for the network device, the sixth matrix is a dictionary matrix used by the network device to restore the first coefficient matrix.

After receiving the first codeword matrix, the network device determines that the first codeword matrix satisfies the product of the seventh matrix, the sixth matrix, the eighth matrix, the fourth matrix, the fifth matrix, so that the network device determines the eighth matrix based on the seventh matrix, the sixth matrix, the first codeword matrix, the fourth matrix, and the fifth matrix, and finally determines the element in the first coefficient matrix based on the eighth matrix, the fourth matrix, and the sixth matrix, where the first coefficient matrix satisfies a product of the sixth matrix, the eighth matrix, and the fourth matrix.

An example in which the terminal device reports the first codeword matrix is not shown in FIG. 3.

It should be noted that the symbol "*" in embodiments may be understood as a sequential multiplication operation. For example, A*B indicates that A is post-multiplied by B.

In this embodiment, the sixth matrix and the seventh matrix satisfy a second rule, and the second rule is:

A tenth matrix satisfies a product of the seventh matrix and the sixth matrix, and a maximum value of a correlation coefficient of any two columns of the tenth matrix is less than the first threshold; or a tenth matrix satisfies a product of the sixth matrix and the seventh matrix, and a maximum value of a correlation coefficient of any two rows of the tenth matrix is less than the first threshold.

In addition, it should be noted that, in this embodiment, at least one matrix in the first matrix to the ninth matrix includes at least one of the following features: amplitude values of a plurality of elements included in each column correspond to a same candidate value set, where the candidate value set includes a plurality of different candidate values; amplitude values of a plurality of elements included in each row correspond to a same candidate value set, where the candidate value set includes a plurality of different candidate values; phase differences between every two adjacent elements in a plurality of elements included in each column correspond to a same candidate value set, where the candidate value set includes a plurality of different candidate values; phase differences between every two adjacent elements in a plurality of elements included in each row correspond to a same candidate value set, where the candidate value set includes a plurality of different candidate values; or the matrix is fed back or received by one element, the matrix is fed back or received by one vector, or the matrix is fed back or received by one matrix of a preset scale. For a description of each feature, refer to the description of the fourth matrix. Details are not described herein again.

Embodiment 2

In the embodiment shown in FIG. 3, the element in the first coefficient matrix is reported after dimension reduction processing is performed, so that overheads can be reduced. In some other embodiments, the first coefficient matrix may alternatively be decomposed to obtain a plurality of matrices with low dimensions, so that overheads of reporting the first coefficient matrix are reduced by reporting the matrices with the low dimensions.

In an example, that the first coefficient matrix is a space-frequency combination coefficient matrix is used as an example. The space-frequency combination coefficient matrix may be converted into:

$$W=AB \tag{5}$$

The matrix W may be represented as a space-frequency combination coefficient corresponding to a spatial layer or a receive port, the matrix A may be a matrix obtained by combining the foregoing plurality of first codewords and performing transpose processing, and the matrix B may be a transpose of a submatrix including some or all columns of the matrix φ in the embodiment shown in FIG. 3. In this way, the terminal device only needs to report the matrix A and the matrix B, reducing a quantity of reporting times. It should be noted that the matrix A and the matrix B are merely an example of splitting the first coefficient matrix. The following describes in detail a splitting manner, a reporting manner, and the like of the first coefficient matrix.

The following describes this embodiment with reference to the accompanying drawings.

Figure 13:
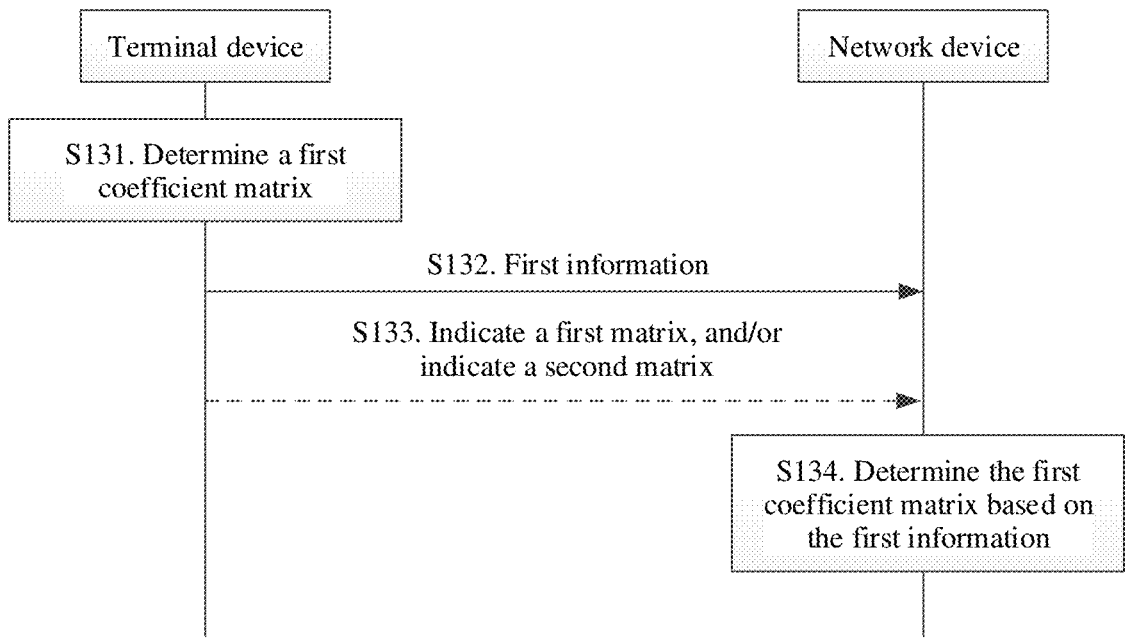
FIG. 13 is a flowchart of another example of an information transmission method according to an embodiment.

FIG. 13 is a flowchart of another example of an information transmission method according to an embodiment. The flowchart is described as follows:

S131. A terminal device determines a first coefficient matrix.

In this embodiment, the first coefficient matrix is determined based on a first matrix, a second matrix, and a third matrix. A relationship among the first coefficient matrix, the first matrix, the second matrix, and the third matrix is that the third matrix may be obtained by post-multiplying the first matrix by the first coefficient matrix, and then post-multiplying a calculation result by the second matrix.

In an example, the first matrix may be understood as at least one spatial domain basis vector corresponding to a downlink channel, the second matrix may be understood as at least one frequency domain basis vector corresponding to the downlink channel, and the third matrix may be understood as a channel matrix or a precoding matrix of the downlink channel. This embodiment is not limited to the foregoing case. Provided that a plurality of matrices can satisfy the foregoing matrix relationship, the matrices may be reported to a network device by using the method provided in this embodiment. This is not limited herein. For ease of description, the following uses an example in which the first matrix is at least one spatial domain basis vector corresponding to the downlink channel, the second matrix is at least one frequency domain basis vector corresponding to the downlink channel, and the third matrix is a precoding matrix of the downlink channel for description.

In this embodiment, the first coefficient matrix may include but is not limited to the following three forms:

In a first form, the first coefficient matrix may be split into two independent matrices. For example, the first coefficient matrix may be split into a fourth matrix and a fifth matrix, and a product of the fourth matrix and the fifth matrix is the first coefficient matrix.

In a first example, a relationship among the first matrix to the fifth matrix may be the following expression:

$$H=SABP \tag{6}$$

The matrix H represents the third matrix, the matrix S represents the first matrix, the matrix P represents the second matrix, the matrix A represents the fourth matrix, and the matrix B represents the fifth matrix. That is, if a matrix W is used as the first coefficient matrix, the first coefficient matrix, the fourth matrix, and the fifth matrix satisfy W=AB. The matrices are described by using an example in which the first matrix is at least one spatial domain basis vector corresponding to the downlink channel, the second matrix is at least one frequency domain basis vector corresponding to the downlink channel, and the third matrix is a precoding matrix of the downlink channel.

The matrix H may be understood as a precoding matrix corresponding to a spatial layer.

The matrix S may be understood as one or more spatial domain basis vectors corresponding to the spatial layer. In an example, the terminal device may select, from a plurality of preset spatial domain basis vectors, one or more spatial domain basis vectors corresponding to the spatial layer, and a dimension of each spatial domain basis vector is associated with a quantity of channel state information reference signal ports. In this case, the terminal device may indicate the matrix by reporting an index number, a sequence number, or the like of a spatial domain basis vector included in the matrix. In another example, the terminal device may alternatively calculate the matrix S based on a reference signal received within preset duration. Alternatively, the matrix S may be calculated by the network device, and then directly indicated to the terminal device through beamforming. A manner of obtaining the matrix S is not limited herein. In an example, the matrix S may have $N_s \times T$ dimensions, where $N_s$ is determined based on a quantity of antenna ports. For example, if quantities of antenna ports in a horizontal direction and a vertical direction are respectively $N_1$ and $N_2$, $N_s = N_1 \times N_2$. If dual polarization directions exist, $N_s = 2N_1 \times N_2$. T may be indicated by the network device, may be determined by the terminal device according to a preset rule, may be agreed on by the terminal device and the network device in advance, or may be fed back by the terminal device to the network device. This is not limited herein. It should be noted that T is less than or equal to $N_f$.

The matrix P may be understood as one or more frequency domain basis vectors corresponding to the spatial layer, a dimension of each frequency domain basis vector is associated with a frequency domain feature parameter, and the frequency domain feature parameter includes a quantity of frequency domain feedback elements and/or a quantity of frequency domain subbands. In an example, the terminal device may select, from a plurality of preset frequency domain basis vectors, one or more frequency domain basis vectors corresponding to the spatial layer. In this case, the terminal device may indicate the matrix by reporting an index number, a sequence number, or the like of a frequency domain basis vector included in the matrix. In another example, the terminal device may alternatively calculate the matrix P based on a reference signal received within preset duration. Alternatively, the matrix P may be calculated by the network device, and then directly indicated to the terminal device through beamforming. A manner of obtaining the matrix P is not limited herein. In an example, a quantity of rows of the matrix P is the same as a quantity of columns of the matrix B, and a quantity of columns of the matrix P is $N_f$. $N_f$ is associated with a frequency domain feature parameter. The frequency domain feature parameter may include a quantity of frequency domain feedback elements. $N_f$ may be indicated by the network device, may be determined by the terminal device according to a preset rule, or may be agreed on by the terminal device and the network device in advance, or may be fed back by the terminal device to the network device. This is not limited herein.

In this embodiment, the matrix B may be understood as a dictionary matrix used to restore at least one coefficient in the first coefficient matrix.

In an example, the matrix B may be a transpose of a submatrix including some columns of the matrix $\varphi$ in the embodiment shown in FIG. 3, or the matrix B may be a transpose of the matrix $\varphi$ in the embodiment shown in FIG. 3. This is not limited herein.

The terminal device may obtain the matrix B based on historical signal space of the downlink channel, for example, obtain the matrix B by performing eigen-decomposition processing or SVD on the historical signal space. Additionally, the matrix B may alternatively be obtained in another manner. This is not limited herein. Also, the matrix B may be preset. Alternatively, a matrix set may be set. The matrix set may be agreed on with the network device in advance. In this case, the terminal device may select one matrix from the matrix set as the matrix B. Alternatively, the terminal device feeds back the matrix B to the network device. This is not limited herein.

It should be noted that, in this embodiment, the matrix B may correspond to a different spatial layer. In other words, each spatial layer corresponds to one matrix B, and matrices B corresponding to different spatial layers may be the same or may be different.

In this embodiment, the matrix B may include but is not limited to the following three cases:

In a first case, the matrix B may be an $S1 \times N_f$ matrix.

In a second case, the matrix B may be an $S1 \times \alpha N_f$ matrix.

In a third case, the matrix B may be an $S1 \times F$ matrix.

The parameters S1, $\alpha$, and F may be indicated by the network device, may be determined by the terminal device according to a preset rule, may be agreed on by the terminal device and the network device in advance, or may be fed back by the terminal device to the network device. This is not limited herein. It should be noted that for different dimensions of the matrix B, a dimension of the matrix P also changes. For example, when the matrix B is an $S1 \times N_f$ matrix, the matrix P is an $N_f \times N_f$ matrix; when the matrix B is an $S1 \times \alpha N_f$ matrix, the matrix P is an $\alpha N_f \times N_f$ matrix; when the matrix B is an $S1 \times F$ matrix, the matrix P is an $F \times N_f$ matrix.

It should be noted that, one of reasons why quantities of columns of the matrix B in the foregoing three cases are different is that results obtained by the terminal device by measuring a reference signal, for example, a CSI-RS, sent by the network device are different.

Figure 14:
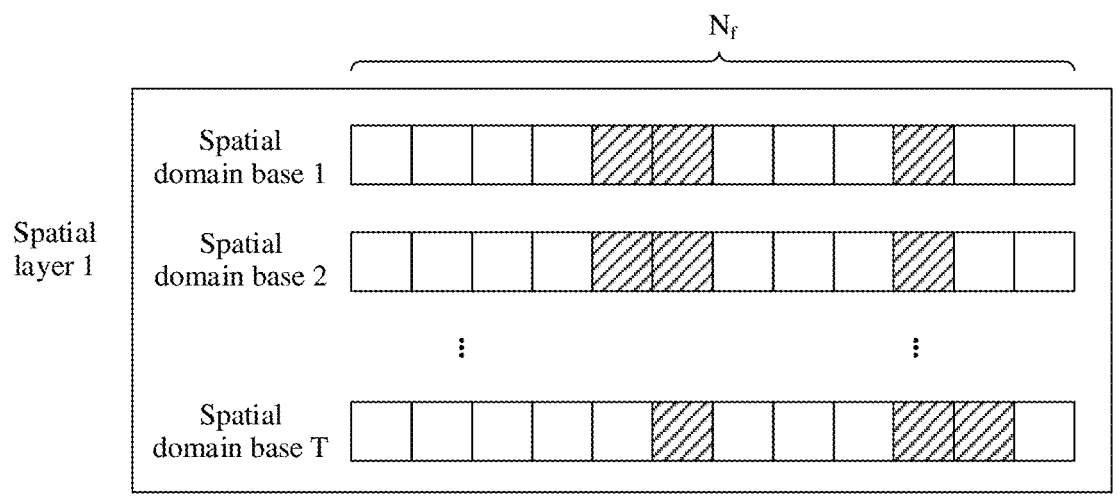
FIG. 14 is a schematic diagram of an example of a matrix B according to an embodiment.
Figure 15:
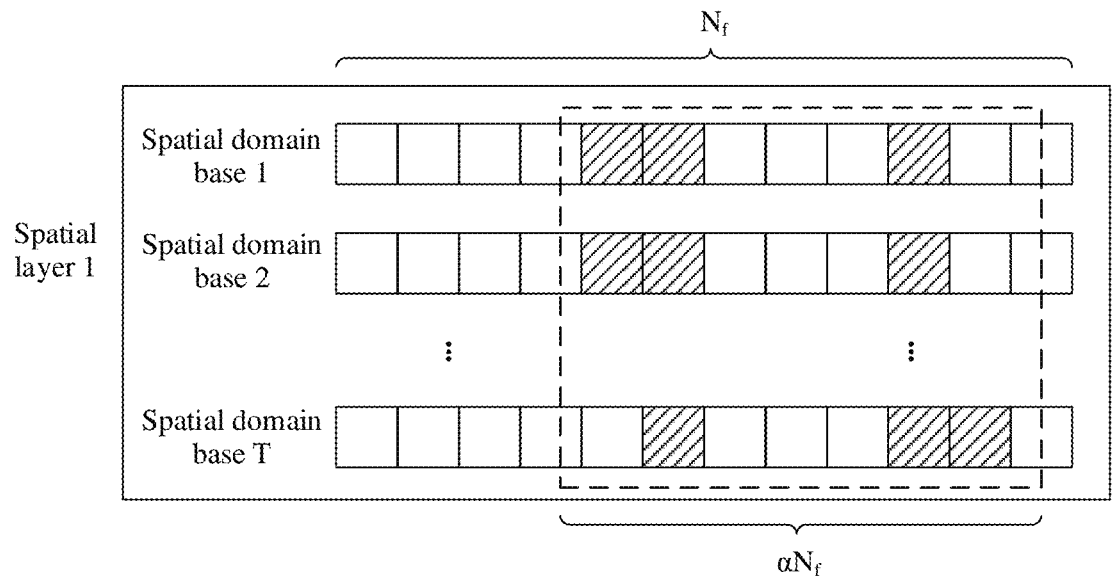
FIG. 15 is a schematic diagram of an example of a matrix B according to an embodiment.

One spatial layer is used as an example. In the first case and the second case, after obtaining a plurality of pieces of information of a spatial domain base on a plurality of frequency domain units at the spatial layer through measurement, the terminal device performs projection on a frequency domain base corresponding to a CSI reporting bandwidth, where for example, a quantity of frequency domain units included in the CSI reporting bandwidth is $N_f$, to obtain $N_f$ space-frequency combination coefficients of the spatial domain base at the spatial layer. As shown in FIG. 14 and FIG. 15, $N_f$ space-frequency combination coefficients may correspond to each of T spatial domain bases at only one spatial layer. A difference between the second case and the first case is that the network device may indicate the parameter $\alpha$, that is, a window length is set for a space-frequency combination coefficient that needs to be reported, to reduce a quantity of space-frequency combination coefficients that need to be reported. In other words, the terminal device needs to report only a space-frequency combination coefficient within the window length.

Figure 16:
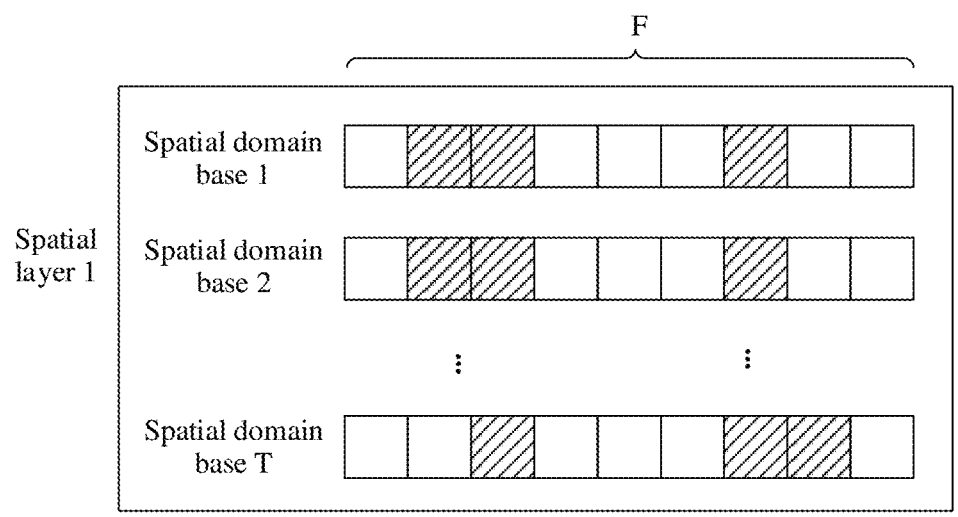
FIG. 16 is a schematic diagram of an example of a matrix B according to an embodiment.

In the third case, after the terminal device obtains a plurality of space-frequency combination coefficients of a spatial domain base at one spatial layer through measurement, the terminal device does not perform projection on a frequency domain base corresponding to a CSI reporting bandwidth. In other words, the parameter F may be a quantity of space-frequency combination coefficients of a spatial domain base at one spatial layer that are obtained through measurement by the terminal device, as shown in FIG. 16, or may be a quantity of some space-frequency combination coefficients obtained by the terminal device through measurement. When F is the quantity of some space-frequency combination coefficients, the F space-frequency combination coefficients may be inconsecutive.

In addition, in the third case, after obtaining a plurality of pieces of information of a spatial domain base on a plurality of frequency domain units at the spatial layer through measurement, the terminal device may alternatively perform projection on a frequency domain base corresponding to a CSI reporting bandwidth, where for example, a quantity of frequency domain units included in the CSI reporting bandwidth is $N_f$, to obtain $N_f$ space-frequency combination coefficients of the spatial domain base at the spatial layer. Then, the terminal device may select F frequency domain bases from $N_f$ frequency domain bases corresponding to the $N_f$ space-frequency combination coefficients, and then select space-frequency combination coefficients corresponding to the F frequency domain bases. In addition, the F frequency domain bases may be inconsecutive. It should be noted that the parameter F and the parameter $\alpha N_f$ may be the same or may be different. This is not limited herein.

It should be noted that the terminal device may determine, in a plurality of manners, a case to which the matrix B belongs in the foregoing three cases. For example, the terminal device and the network device may agree in advance on a manner of determining the matrix B, or the network device may indicate, to the terminal device, a manner of determining the matrix B. A determining manner is not limited herein.

In addition, if the terminal device determines that the matrix B belongs to the second case, the terminal device further needs to indicate a start position of a window to the network device. A manner of indicating the start position may be similar to that in the current technology. Details are not described herein. A manner of reporting the start position of the window may be a reporting manner based on a long periodicity or may be a reporting manner based on a short periodicity. Details are not described herein.

The matrix A may be determined by the terminal device based on a space-frequency combination coefficient matrix and the matrix B. The space-frequency combination coefficient matrix is obtained by the terminal device by measuring the reference signal sent by the network device. A process is similar to that in the current technology. Details are not described herein. The terminal device may obtain a space-frequency combination coefficient matrix for each spatial layer.

It can be understood from FIG. 14 to FIG. 16 that, a space-frequency combination coefficient matrix of each spatial layer includes a plurality of space-frequency combination coefficients corresponding to each of T spatial domain bases at the spatial layer. A plurality of space-frequency combination coefficients of one spatial domain base at the spatial layer may be understood as one row of elements corresponding to the spatial domain base in FIG. 14 to FIG. 16. Therefore, an operation may be performed on each row of elements in the space-frequency combination coefficient matrix and the matrix B to obtain each row of elements in the matrix A. After the operation on all elements in the space-frequency combination coefficient matrix is completed, the matrix A is obtained. The matrix A may have T×S1 dimensions. Manners of determining S1 and T are similar to the foregoing content. Details are not described herein again.

A row of elements in the space-frequency combination coefficient matrix is denoted as $h_1''_{i,j}$. Correspondingly, a row of elements corresponding to the matrix A may be denoted as $p_1''_{i,j}$. A relationship between the rows of elements is:

$$h_1''=p_1''_{i,j}B \tag{7}$$

In this embodiment, the matrix A includes K1 non-zero elements, and the terminal device may report only K0 of the K1 non-zero elements. K0 is less than or equal to K1, and K0 may be indicated by the network device, may be determined by the terminal device according to a preset rule, may be agreed on by the terminal device and the network device in advance, or may be fed back by the terminal device to the network device. This is not limited herein. In an example, if the matrix B is a dictionary matrix in sparse representation, K0 may be understood as a sparse degree of the dictionary matrix.

In a second example, a relationship among the first matrix to the fifth matrix may be the following expression:

$$H=SCA''P \tag{8}$$

The matrix H represents the third matrix, the matrix S represents the first matrix, the matrix P represents the second matrix, the matrix C represents the fourth matrix, and the matrix A" represents the fifth matrix. That is, if a matrix W is used as the first coefficient matrix, the first coefficient matrix, the fourth matrix, and the fifth matrix satisfy W=CA". The matrices are described by using an example in which the first matrix is at least one spatial domain basis vector corresponding to the downlink channel, the second matrix is at least one frequency domain basis vector corresponding to the downlink channel, and the third matrix is a precoding matrix of the downlink channel.

Descriptions of the matrix H, the matrix S, and the matrix P are similar to those in the foregoing first example. Details are not described herein again.

The matrix C may be understood as a dictionary matrix used to restore at least one coefficient in the first coefficient matrix.

A manner of determining the matrix C is similar to the manner of determining the matrix B in the first example. For example, the matrix C may be obtained based on historical signal space of the downlink channel. Additionally, the matrix C may alternatively be obtained in another manner. This is not limited herein.

In this embodiment, the matrix C may correspond to a different spatial layer. In other words, each spatial layer corresponds to one matrix C, and matrices C corresponding to different spatial layers may be the same or may be different. The matrix C may have T×U dimensions. U and T may be indicated by the network device, may be determined by the terminal device according to a preset rule, may be agreed on by the terminal device and the network device in advance, or may be fed back by the terminal device to the network device. This is not limited herein.

The matrix A" may be determined by the terminal device based on a space-frequency combination coefficient matrix and the matrix C. For example, an operation may be performed on each column of elements in the space-frequency combination coefficient matrix and the matrix C to obtain each column of elements in the matrix A. After the operation on all elements in the space-frequency combination coefficient matrix is completed, the matrix A" is obtained.

In this embodiment, the matrix A" may include, but is not limited to, the following three cases:

In a first case, the matrix A" may be a $U \times N_f$ matrix.
In a second case, the matrix A" may be a $U \times \alpha N_f$ matrix.
In a third case, the matrix A" may be a U×F matrix.

The parameters U, $\alpha$, and F may be indicated by the network device, may be determined by the terminal device according to a preset rule, may be agreed on by the terminal device and the network device in advance, or may be fed back by the terminal device to the network device. This is not limited herein.

A manner of determining, by the terminal device, a case to which the matrix A" belongs in the foregoing three cases may be indicated by the network device or may be obtained by the terminal device through calculation. This is not limited herein.

A column of elements in the space-frequency combination coefficient matrix is denoted as $h_2''_{i,l}$. Correspondingly, a column of elements corresponding to the matrix A" may be denoted as $p_2''_{i,l}$. A relationship between the columns of elements is:

$$h_2''_{i,l} = C p_2''_{i,l} \quad (9).$$

In this embodiment, the matrix A" includes K2 non-zero elements, and the terminal device may report only K0 of the K2 non-zero elements. K0 is less than or equal to K1, and K0 may be indicated by the network device, may be determined by the terminal device according to a preset rule, may be agreed on by the terminal device and the network device in advance, or may be fed back by the terminal device to the network device. This is not limited herein.

In a second form, the first coefficient matrix may be split into three independent matrices. For example, the first coefficient matrix may be split into a fourth matrix, a fifth matrix, and a sixth matrix, and a product of the fourth matrix, the fifth matrix, and the sixth matrix is the first coefficient matrix. It should be noted that the fourth matrix and the fifth matrix in the second form are completely independent of and are different from the fourth matrix and the fifth matrix in the first form matrices.

In an example, a relationship among the first matrix to the sixth matrix may be the following expression:

$$H = SCA'BP \quad (10)$$

The matrix H represents the third matrix, the matrix S represents the first matrix, the matrix P represents the second matrix, the matrix C represents the fourth matrix, and the matrix A' represents the fifth matrix, and the matrix B represents the sixth matrix. That is, if a matrix W is used as the first coefficient matrix, the first coefficient matrix and the fourth matrix to the sixth matrix satisfy W=CA'B. The matrices are described by using an example in which the first matrix is at least one spatial domain basis vector corresponding to the downlink channel, the second matrix is at least one frequency domain basis vector corresponding to the downlink channel, and the third matrix is a precoding matrix of the downlink channel.

Descriptions of the matrix H, the matrix S, the matrix P, and the matrix B are similar to those in the foregoing first example. Details are not described herein again. It should be noted that the matrix B may include, but is not limited to, the following three cases: In a first case, the matrix B may be an $S1 \times N_f$ matrix. In a second case, the matrix B may be an $S1 \times \alpha N_f$ matrix. In a third case, the matrix B may be an $S1 \times F$ matrix. The parameters S1, $\alpha$, and F may be indicated by the network device, may be determined by the terminal device according to a preset rule, may be agreed on by the terminal device and the network device in advance, or may be fed back by the terminal device to the network device. This is not limited herein.

It can be understood from the formula (6) and the formula (10) that the matrix A=CA'. From this perspective, the matrix C may be understood as a dictionary matrix used to restore at least one element in the matrix A.

A manner of determining the matrix C is similar to the manner of determining the matrix B in the first example. For example, the matrix C may be obtained based on historical signal space of the downlink channel. Further, the matrix C may alternatively be obtained in another manner. This is not limited herein.

In this embodiment, the matrix C may correspond to a different spatial layer. In other words, each spatial layer corresponds to one matrix C, and matrices C corresponding to different spatial layers may be the same or may be different.

The matrix C may have T×U dimensions. U and T may be indicated by the network device, may be determined by the terminal device according to a preset rule, may be agreed on by the terminal device and the network device in advance, or may be fed back by the terminal device to the network device. This is not limited herein.

The matrix A' may have U×S1 dimensions. The parameters U and S1 may be indicated by the network device, may be determined by the terminal device according to a preset rule, may be agreed on by the terminal device and the network device in advance, or may be fed back by the terminal device to the network device. This is not limited herein.

In this embodiment, the matrix A' includes K3 non-zero elements, and the terminal device may report only K0 of the K3 non-zero elements. K0 is less than or equal to K1, and K0 may be indicated by the network device, may be determined by the terminal device according to a preset rule, may be agreed on by the terminal device and the network device in advance, or may be fed back by the terminal device to the network device. This is not limited herein.

It should be noted that, in this case, a space-frequency combination coefficient matrix, denoted as W, has the following relationship with the K0 non-zero elements reported in the matrix A', the matrix C, and the matrix B:

$$W = \Sigma a'_{ij} c_i b_j \quad (11)$$

$c_i$ is an $i^{th}$ column of the matrix C, $b_j$ is a $j^{th}$ row of the matrix B, $a'_{ij}$ is an element in an $i^{th}$ row and a $j^{th}$ column of the matrix A', and $\Sigma$ is a summation operation.

In a third form, the first coefficient matrix is an independent matrix.

In this case, a relationship among the first coefficient matrix, a first matrix, a second matrix, and a third matrix may be the following expression:

$$H = SA'''P \quad (12)$$

The matrix H represents the third matrix, the matrix S represents the first matrix, the matrix P represents the second matrix, and the matrix A''' represents the first coefficient matrix. The matrices are described by using an example in which the first matrix is at least one spatial domain basis vector corresponding to the downlink channel, the second matrix is at least one frequency domain basis vector corresponding to the downlink channel, and the third matrix is a precoding matrix of the downlink channel.

Descriptions of the matrix H are similar to that in the foregoing first example. Details are not described herein again.

The matrix S may be one or more spatial domain basis vectors corresponding to the spatial layer and selected by the terminal device from a plurality of preset spatial domain basis vectors. In this case, the terminal device may indicate the matrix by reporting an index number, a sequence number, or the like of a spatial domain basis vector included in the matrix. In another example, the terminal device may alternatively calculate the matrix S based on a reference signal received within preset duration. Alternatively, the matrix S may be calculated by the network device, and then directly indicated to the terminal device through beamforming. A manner of obtaining the matrix S is not limited herein.

The matrix P may be one or more frequency domain basis vectors corresponding to the spatial layer and selected by the terminal device from a plurality of preset frequency domain basis vectors. In this case, the terminal device may indicate the matrix by reporting an index number, a sequence number, or the like of a frequency domain basis vector included in the matrix. In another example, the terminal device may alternatively calculate the matrix P based on a reference signal received within preset duration. Alternatively, the matrix P may be calculated by the network device, and then directly indicated to the terminal device through beamforming. A manner of obtaining the matrix P is not limited herein.

It can be understood from the formula (6) and the formula (12) that the matrix A'''=AB. In this embodiment, the matrix A''' may include, but is not limited to, the following three cases:

In a first case, the matrix A''' may be a $T \times N_f$ matrix.
In a second case, the matrix A''' may be a $T \times \alpha N_f$ matrix.
In a third case, the matrix A''' may be a T×F matrix.

The parameters T, α, and F may be indicated by the network device, may be determined by the terminal device according to a preset rule, may be agreed on by the terminal device and the network device in advance, or may be fed back by the terminal device to the network device. This is not limited herein.

The matrix A''' may be obtained by measuring a CSI-RS and processing a measurement result. It should be noted that, in this obtaining manner, the matrix A''' is different from the matrix $\tilde{W}$ in the current technology. Apparently, in this embodiment, the matrix S and the matrix P are calculated by the terminal device based on historical signal space of a channel. Alternatively, the matrix S and the matrix P may be calculated by the network device, and then directly indicated to the terminal device through beamforming. It may be understood that the matrix S and the matrix P are customized based on a channel. Compared with a DFT-based space-frequency matrix in the current technology, the matrix S includes a smaller quantity of columns and the matrix P includes a smaller quantity of rows, so that the matrix A''' has fewer dimensions than the matrix W. Additionally, the matrix A''' may alternatively be obtained in another manner. This is not limited herein.

In this embodiment, the matrix A''' may correspond to a different spatial layer, that is, each spatial layer corresponds to one matrix A.

In addition, it should be noted that in this embodiment, the matrix A''' includes K4 non-zero elements, and the terminal device may report only K0 of the K4 non-zero elements. K0 is less than or equal to K4, and K0 may be indicated by the network device, may be determined by the terminal device according to a preset rule, or may be agreed on by the terminal device and the network device in advance. This is not limited herein. In addition, if the matrix A''' has T×F dimensions, the matrix P has $F \times N_f$ dimensions.

It should be noted that, in this embodiment, at least one of the plurality of matrices includes at least one of the following features: amplitude values of a plurality of elements included in each column correspond to a same candidate value set, where the candidate value set includes a plurality of different candidate values; amplitude values of a plurality of elements included in each row correspond to a same candidate value set, where the candidate value set includes a plurality of different candidate values; phase differences between every two adjacent elements in a plurality of elements included in each column correspond to a same candidate value set, where the candidate value set includes a plurality of different candidate values; phase differences between every two adjacent elements in a plurality of elements included in each row correspond to a same candidate value set, where the candidate value set includes a plurality of different candidate values; or the matrix is fed back or received by one element, the matrix is fed back or received by one vector, or the matrix is fed back or received by one matrix of a preset scale. For a description of each feature, refer to the description of the fourth matrix in Embodiment 1. Details are not described herein again.

S132. The terminal device sends first information to the network device, and the network device receives the first information.

In this embodiment, the first information is used to indicate the first coefficient matrix. The first information may be independent information or may be included in channel state information. This is not limited herein.

In this embodiment, based on different first coefficient matrices, the first information may include, but is not limited to, the following three cases:

A first case corresponds to the first form in step S131:

The first information includes second information and third information, the second information is used to indicate the fourth matrix, and the third information is used to indicate the fifth matrix.

In other words, in this case, the first information is split into two pieces of information: second information and third information. The terminal device may send the second information and the third information together or may separately send the second information and the third information. This is not limited herein.

The terminal device may send the second information based on a long periodicity and send the third information based on a short periodicity; or the terminal device may send the second information based on a short periodicity and send the third information based on a long periodicity. For example, the terminal device may indicate the matrix A based on a short periodicity and indicate the matrix B based on a long periodicity; and the terminal device may indicate the matrix C based on a long periodicity and indicate the matrix A" based on a short periodicity.

A second case corresponds to the second form in step S131:

The first information includes second information, third information, and fourth information, the second information is used to indicate the fourth matrix, the third information is used to indicate the fifth matrix, and the fourth information is used to indicate the sixth matrix.

In other words, in this case, the first information is split into three pieces of information: second information, third information, and fourth information. The terminal device may send the second information to the fourth information together or may separately send the second information to the fourth information. This is not limited herein.

The terminal device sends the second information and the fourth information based on a long periodicity and sends the third information based on a short periodicity. For example, the terminal device may indicate the matrix C based on a long periodicity, indicate the matrix A' based on a short periodicity, and indicate the matrix B based on a long periodicity.

A third case corresponds to the third form in step S131:

The first information is only one piece of information, and for example, is used to indicate the matrix A'''. In this case, the first information is used to indicate a position and a numerical value of a non-zero element in the first coefficient matrix. For example, the terminal device may indicate the position of the non-zero element in the first coefficient matrix using "window+quantity of combinations+bitmap" and indicate the numerical value of the non-zero element in the first coefficient matrix using an amplitude value and a phase value. A process may be similar to that in the current technology. Details are not described herein. Alternatively, the terminal device may perform indication in another manner, for example, may perform indication by using a bitmap. This is not limited herein.

It should be noted that when the terminal device indicates different matrices, for example, indicates two matrices based on a long periodicity, periodicities of indicating the two matrices may be the same or may be different. In an example, the terminal device indicates the matrix B and the matrix C both based on a long periodicity, denotes a periodicity used by the terminal device to indicate the matrix B as T3, and denotes a periodicity used by the terminal device to indicate the matrix C as T4. In this case, both T3 and T4 are greater than T1 and T2, and T3 and T4 may be the same or may be different. For another example, if both matrices are indicated based on a short periodicity, periodicities of indicating the two matrices may be the same or may be different. In an example, the terminal device indicates the matrix A and the matrix A' both based on a short periodicity, denotes a periodicity used by the terminal device to indicate the matrix A as T1, and denotes a periodicity used by the terminal device to indicate the matrix A' as T2. In this case, T1 and T2 need to be less than a value of a long periodicity, and T1 and T2 may be the same or may be different.

S133. The terminal device indicates the first matrix to the network device; and/or the terminal device indicates the second matrix to the network device.

In this embodiment, when the terminal device indicates the first coefficient matrix by using the first information, a first periodicity in which the terminal device feeds back the first matrix and a second periodicity in which the terminal device feeds back the second matrix are greater than a third periodicity in which the terminal device sends the first information.

Alternatively, the terminal device separately feeds back the first information and the first matrix and/or the second matrix to the network device, where the terminal device determines to feed back the first matrix and/or the second matrix to the network device in a first case, and determines to feed back the first information to the network device in a second case, the first case is that the terminal device satisfies a first preset condition or the terminal device receives a first indication from the network device, and the second case is that the terminal device satisfies a second preset condition or the terminal device receives a second indication from the network device.

Alternatively, the terminal device separately feeds back the first information and the first matrix and/or the second matrix to the network device, where the terminal device periodically feeds back the first matrix and/or the second matrix to the network device, and the terminal device determines to feed back the first information to the network device in the second case.

Alternatively, the terminal device separately feeds back the first information and the first matrix and/or the second matrix to the network device, where the terminal device determines to feed back the first matrix and/or the second matrix to the network device in the first case, and the terminal device periodically feeds back the first information to the network device.

When the terminal device indicates the first coefficient matrix by using the second information and the third information, the terminal device may send the second information based on a long periodicity and send the third information based on a short periodicity, or the terminal device may send the second information based on a short periodicity and send the third information based on a long periodicity.

In this case, if the terminal device sends the second information based on the short periodicity, the first periodicity in which the terminal device indicates the first matrix and the second periodicity in which the terminal device indicates the second matrix are both greater than a fourth periodicity in which the terminal device sends the second information.

Alternatively, if the terminal device sends the third information based on the short periodicity, the first periodicity in which the terminal device indicates the first matrix and the second periodicity in which the terminal device indicates the second matrix are both greater than a fifth periodicity in which the terminal device sends the third information.

If the terminal device sends the second information based on the long periodicity, the first periodicity in which the terminal device indicates the first matrix and the second periodicity in which the terminal device indicates the second matrix are both greater than the fourth periodicity in which the terminal device sends the second information.

Alternatively, if the terminal device sends the third information based on the long periodicity, the first periodicity in which the terminal device indicates the first matrix and the second periodicity in which the terminal device indicates the second matrix are both greater than a fifth periodicity in which the terminal device sends the third information.

In an example, the matrix S represents the first matrix, the matrix P represents the second matrix, the matrix A represents the fourth matrix, the matrix B represents the fifth matrix, a periodicity of sending the matrix S by the terminal device is marked as T1, a periodicity of sending the matrix P by the terminal device is denoted as T2, a periodicity of sending the matrix A by the terminal device is denoted as T4, a periodicity of sending the matrix B by the terminal device is denoted as T5, the matrix A is sent based on a long periodicity, and the matrix B is sent based on a short periodicity. In this case, T1, T2, and T4 are all greater than T5, and a value relationship between T1, T2, and T4 is not limited. For example, both T1 and T2 may be greater than T4, T1 may be greater than T4 and T2 may be less than T4, or both T1 and T2 may be less than T4. This is not limited herein.

When the terminal device indicates the first coefficient matrix by using the second information, the third information, and the fourth information, the terminal device may send the second information and the fourth information based on a long periodicity and send the third information based on a short periodicity. In other words, the fourth periodicity in which the terminal device sends the second information and the sixth periodicity in which the terminal device sends the fourth information are both greater than the fifth periodicity in which the terminal device sends the third information.

In this case, the first periodicity in which the terminal device indicates the first matrix and the second periodicity in which the terminal device indicates the second matrix are both greater than the fifth periodicity in which the terminal device sends the third information; and/or the first periodicity in which the terminal device indicates the first matrix and the second periodicity in which the terminal device indicates the second matrix are both greater than the fourth periodicity in which the terminal device sends the second information and the sixth periodicity in which the terminal device sends the fourth information.

In this embodiment, a value relationship between the plurality of long periodicities is not limited. For example, the first periodicity may be greater than the fourth periodicity, or the first periodicity may be less than the fourth periodicity. Alternatively, a value relationship between the plurality of short periodicities is not limited. Details are not described herein.

In addition to periodically sending each piece of information, the terminal device may send each piece of information in a trigger manner. For example, the terminal device may indicate the first matrix and/or the second matrix to the network device after determining that the first preset condition is satisfied, and send the first information to the network device after determining that the second preset condition is satisfied; the terminal device periodically indicates the first matrix and/or the second matrix to the network device, and sends the first information to the network device after determining that the second preset condition is satisfied; or the terminal device indicates the first matrix and/or the second matrix to the network device after determining that the first preset condition is satisfied, and the terminal device periodically sends the first information to the network device. The first preset condition and the second preset condition may be set based on an actual use requirement. Herein, the first preset condition and the second preset condition are merely used to indicate that the foregoing information may be sent in a trigger manner, and content is not limited.

It should be noted that step S133 is an optional step, that is, step S133 is not mandatory. For example, the terminal device and the network device may agree on the used first matrix and the used second matrix in advance. In this case, the first matrix and the second matrix may not need to be indicated. Alternatively, the terminal device may indicate only the first matrix but not the second matrix, or the terminal device indicates only the second matrix but not the first matrix. In FIG. 13, step S133 is represented by a dashed line.

S134. The network device determines the first coefficient matrix based on the first information.

Due to different first information, the network device determines the first coefficient matrix in different manners.

A first example corresponds to the first case in step S132:

After obtaining the second information and the third information, the network device determines the fourth matrix based on the second information, determines the fifth matrix based on the third information, and then multiplies the fourth matrix by the fifth matrix to obtain the first coefficient matrix.

A second example corresponds to the second case in step S132:

After obtaining the second information, the third information, and the fourth information, the network device determines the fourth matrix based on the second information, determines the fifth matrix based on the third information, determines the sixth matrix based on the fourth information, and then multiplies the fourth matrix, the fifth matrix, and the sixth matrix to obtain the first coefficient matrix.

A third example corresponds to the third case in step S132:

After the network device obtains the first information, the network device may obtain the first coefficient matrix based on the first information, positions of a plurality of non-zero elements in the first coefficient matrix, and numerical values of the plurality of non-zero elements.

Additionally, the network device may alternatively determine the first coefficient matrix in another manner. Details are not described herein.

In the foregoing embodiments, the method provided in the embodiments is separately described from a perspective of the network device, the terminal device, and interaction between the network device and the terminal device. To implement the functions in the method provided in the embodiments, the network device and the terminal device may each include a hardware structure and/or a software module, and implement the functions by the hardware structure, the software module, or a combination of the hardware structure and the software module. Whether a function in the foregoing functions is performed by using the hardware structure, the software module, or the combination of the hardware structure and the software module depends on particular applications.

Figure 17:
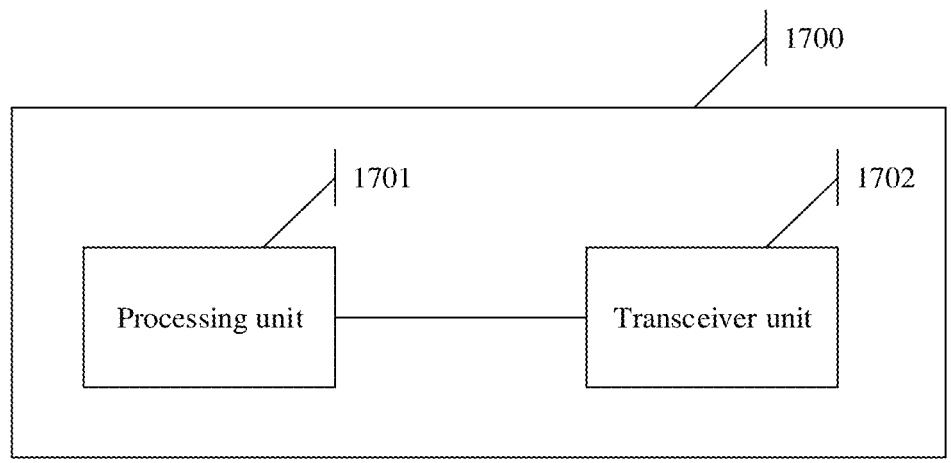
FIG. 17 is a schematic diagram of an example of an information transmission apparatus according to embodiments.

FIG. 17 is a schematic diagram of a structure of an information transmission apparatus 1700. The information transmission apparatus 1700 may implement a function of the terminal device described above. The information transmission apparatus 1700 may include a processing unit 1701 and a transceiver unit 1702. The processing unit 1701 may be configured to perform step S31 in the embodiment shown in FIG. 3 or may be configured to perform step S131 in the embodiment shown in FIG. 13, and/or configured to support another process of the technology described in the embodiments. The transceiver unit 1702 is configured to perform step S32 and step S33 in the embodiment shown in FIG. 3 or may be configured to perform step S132 and step S133 in the embodiment shown in FIG. 13, and/or configured to support another process of the technology described in the embodiments. All related content of the steps in the foregoing method embodiments may be cited in function descriptions of the corresponding function modules. Details are not described herein again.

Figure 18:
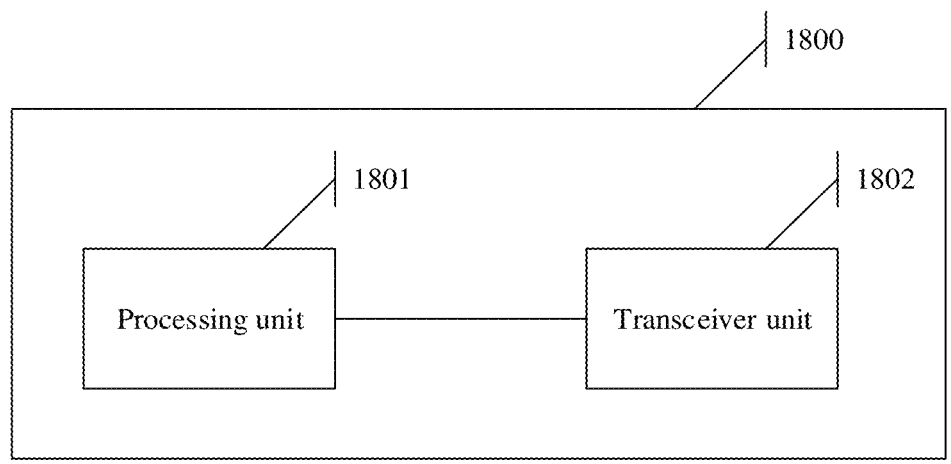
FIG. 18 is a schematic diagram of an example of an information transmission apparatus according to embodiments.

FIG. 18 is a schematic diagram of a structure of an information transmission apparatus 1800. The information transmission apparatus 1800 may implement a function of the network device described above. The information transmission apparatus 1800 may include a processing unit 1801 and a transceiver unit 1802. The processing unit 1801 may be configured to perform step S34 in the embodiment shown in FIG. 3 or may be configured to perform step S134 in the embodiment shown in FIG. 13. The transceiver unit 1802 is configured to perform step S32 and step S33 in the embodiment shown in FIG. 3 or may be configured to perform step S132 and step S133 in the embodiment shown in FIG. 13, and/or configured to support another process of the technology described in the embodiments. All related content of the steps in the method embodiments may be cited in function descriptions of corresponding function modules. Details are not described herein again.

Division into modules in the embodiments is an example and is merely logical function division. During actual implementation, there may be another division manner. In addition, functional modules in the embodiments may be integrated into one processor, or each of the modules may exist alone physically, or two or more modules are integrated into one module. The integrated module may be implemented by hardware or may be implemented by a software function module.

Figure 19:
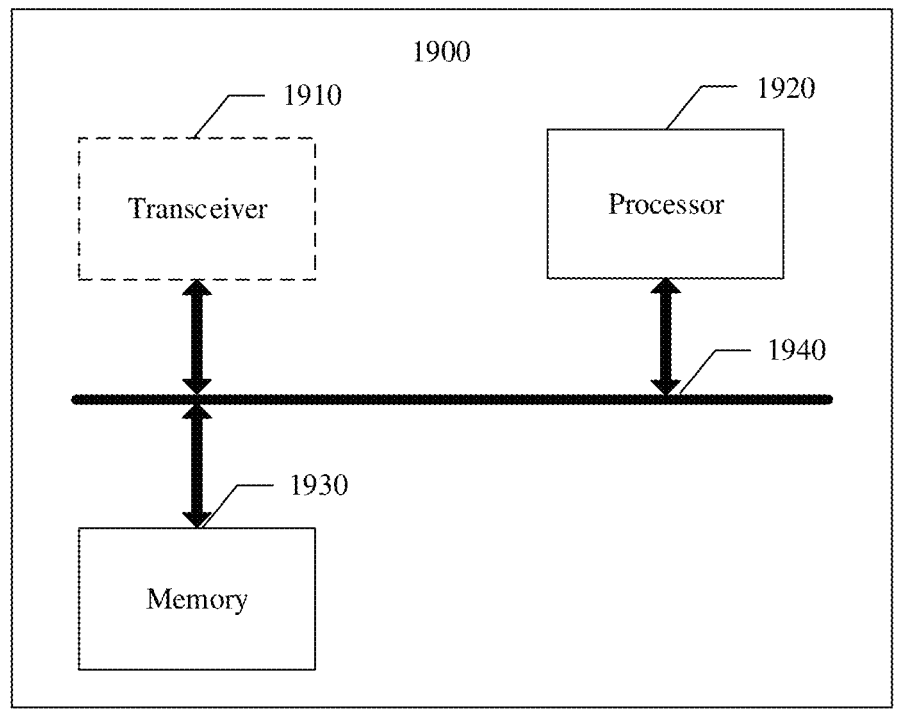
FIG. 19 is a schematic diagram of an example of an information transmission apparatus according to embodiments.

FIG. 19 shows an information transmission apparatus 1900 according to an embodiment, configured to implement a function of the network device in the foregoing methods. The network device may be the network device or may be an apparatus in the network device. The network device may be a chip system. In this embodiment, the chip system may include a chip, or may include a chip and another discrete device. The information transmission apparatus 1900 includes at least one processor 1920, configured to implement a function of the network device in the methods provided in the embodiments. For example, the processor 1920 may generate and send information such as first information and second information. For details, refer to detailed descriptions in the method examples. Details are not described herein again.

The information transmission apparatus 1900 may further include at least one memory 1930, configured to store program instructions and/or data. The memory 1930 is coupled to the processor 1920. The coupling in this embodiment is an indirect coupling or a communication connection between apparatuses, units, or modules in an electrical form, a mechanical form, or another form, and is used for information exchange between the apparatuses, the units, or the modules. The processor 1920 may cooperate with the memory 1930. The processor 1920 may execute the program instructions stored in the memory 1930. At least one of the at least one memory may be included in the processor.

The information transmission apparatus 1900 may further include a communication interface 1910, configured to communicate with another device through a transmission medium, so that an apparatus used in the information transmission apparatus 1900 can communicate with the another device. For example, the another device may be a terminal device. The processor 1920 receives and sends data through the communication interface 1910 and is configured to implement the method performed by the network device in the embodiment corresponding to FIG. 4.

A connection medium between the communication interface 1910, the processor 1920, and the memory 1930 is not limited in this embodiment. In this embodiment, the memory 1930, the processor 1920, and the communication interface 1910 are connected by using a bus 1940 in FIG. 19, and the bus is represented by using a bold line in FIG. 19. A connection manner between other components is merely an example for description and is not limited thereto. The bus may be classified into an address bus, a data bus, a control bus, and the like. For ease of representation, only one thick line is used to represent the bus in FIG. 19, but this does not mean that there is only one bus or only one type of bus.

In this embodiment, the processor 1920 may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams in the embodiments. The general-purpose processor may be a microprocessor, any conventional processor, or the like. The steps of the method with reference to this embodiment may be directly performed by a hardware processor or may be performed by using a combination of hardware in the processor and a software module.

In this embodiment, the memory 1930 may be a non-volatile memory, such as a hard disk drive (HDD) or a solid-state drive (SSD), or may be a volatile memory, such as a random access memory (RAM). The memory is any other medium that can carry or store expected program code by an instruction structure or a data structure and that can be accessed by a computer, but is not limited thereto. The memory in this embodiment may alternatively be a circuit or any other apparatus that can implement a storage function and is configured to store program instructions and/or data.

Figure 20:
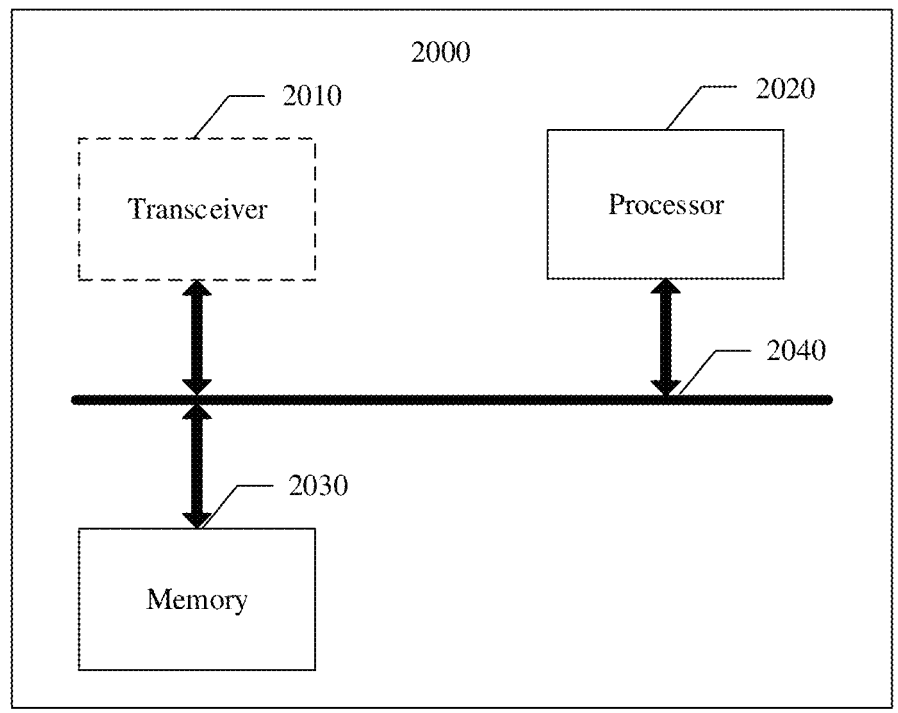
FIG. 20 is a schematic diagram of an example of an information transmission apparatus according to embodiments.

FIG. 20 shows an information transmission apparatus 2000 according to an embodiment, configured to implement a function of the terminal device in the foregoing methods. The terminal device may be the terminal device or may be an apparatus in the terminal device. The terminal device may be a chip system. In this embodiment, the chip system may include a chip, or may include a chip and another discrete device. The information transmission apparatus 2000 includes at least one processor 2020, configured to implement a function of the terminal device in the methods provided in the embodiments. For example, the processor 2020 may generate and send information such as first information and second information. For details, refer to detailed descriptions in the method examples. Details are not described herein again.

The information transmission apparatus 2000 may further include at least one memory 2030, configured to store program instructions and/or data. The memory 2030 is coupled to the processor 2020. The coupling in this embodiment is an indirect coupling or a communication connection between apparatuses, units, or modules in an electrical form, a mechanical form, or another form, and is used for information exchange between the apparatuses, the units, or the modules. The processor 2020 may operate with the memory 2030. The processor 2020 may execute the program instruction stored in the memory 2030. At least one of the at least one memory may be included in the processor.

The information transmission apparatus 2000 may further include a communication interface 2010, configured to communicate with another device through a transmission medium, so that an apparatus used in the information transmission apparatus 2000 can communicate with the another device. For example, the another device may be a terminal device. The processor 2020 receives and sends data through the communication interface 2010 and is configured to implement the methods performed by the terminal device in embodiments corresponding to FIG. 2 to FIG. 14.

In this embodiment, a connection medium between the communication interface 2010, the processor 2020, and the memory 2030 is not limited. In this embodiment, the memory 2030, the processor 2020, and the communication interface 2010 are connected through a bus 2040 in FIG. 20, and the bus is represented by a thick line in FIG. 20. A connection manner between other components is merely an example for description and is not limited thereto. The bus may be classified into an address bus, a data bus, a control bus, and the like. For ease of representation, only one thick line is used to represent the bus in FIG. 20, but this does not mean that there is only one bus or only one type of bus.

In this embodiment, the processor 2020 may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams in the embodiments. The general-purpose processor may be a microprocessor, any conventional processor, or the like. The steps of the method with reference to this embodiment may be directly performed by a hardware processor or may be performed by using a combination of hardware in the processor and a software module.

In this embodiment, the memory 2030 may be a non-volatile memory, such as a hard disk drive (HDD) or a solid-state drive (SSD), or may be a volatile memory, such as a random access memory (RAM). The memory is any other medium that can carry or store expected program code by an instruction structure or a data structure and that can be accessed by a computer, but is not limited thereto. The memory in this embodiment may alternatively be a circuit or any other apparatus that can implement a storage function and is configured to store program instructions and/or data.

An embodiment further provides a computer-readable storage medium, including instructions. When the instructions are run on a computer, the computer is enabled to perform the method performed by the network device in FIG. 3 or FIG. 13.

An embodiment further provides a non-transitory computer-readable storage medium, including instructions. When the instructions are run on a computer, the computer is enabled to perform the method performed by the terminal device in FIG. 3 or FIG. 13.

An embodiment provides a chip system. The chip system includes a processor, may further include a memory, and is configured to implement functions of the network device in the foregoing methods. The chip system may include a chip or may include a chip and another discrete device.

An embodiment provides a chip system. The chip system includes a processor, may further include a memory, and is configured to implement functions of the terminal device in the foregoing methods. The chip system may include a chip or may include a chip and another discrete device.

An embodiment provides a system. The system includes the foregoing network device and the foregoing terminal device.

The method according to any one of the foregoing embodiments may be completely or partially implemented by using software, hardware, firmware, or any combination thereof. When software is used to implement embodiments, all or some of embodiments may be implemented by a computer program product. The computer program product includes one or more computer instructions. When the computer program instructions are loaded and executed on a computer, the procedures or functions according to embodiments are all or partially generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

A person skilled in the art can make various modifications and variations to the embodiments without departing from the scope of the embodiments. In this way, the embodiments are intended to cover modifications and variations of provided that they fall within the scope of the embodiments and their equivalent technologies.

What is claimed is:

1. An information transmission method, comprising:
    generating, by a terminal device, a first codeword, wherein the first codeword is obtained based on a second codeword, a quantity of elements comprised in the second codeword is greater than a quantity of elements comprised in the first codeword, the second codeword is associated with a first coefficient set corresponding to a plurality of spatial layers or ports having same domain bases of a downlink channel, and the first coefficient set comprises an element comprised in at least one row vector or column vector of a first coefficient matrix corresponding to a spatial layer or port of the plurality of spatial layer or ports, wherein the first coefficient matrix is determined based on a first matrix, a second matrix, and a third matrix, the third matrix is a channel matrix or a precoding matrix of the downlink channel, and the third matrix satisfies a product of the first matrix, the first coefficient matrix, and the second matrix; the first coefficient matrix is determined based on a first matrix and a third matrix, the third matrix is a channel matrix or a precoding matrix of the downlink channel, and the third matrix satisfies a product of the first matrix and the first coefficient matrix; the first coefficient matrix is determined based on a second matrix and a third matrix, the third matrix is a channel matrix or a precoding matrix of the downlink channel, and the third matrix satisfies a product of the first coefficient matrix and the second matrix; or the first coefficient matrix is determined based on a third matrix, and the third matrix is a channel matrix or a precoding matrix of the downlink channel; and the spatial layer or receive port is in a one-to-one correspondence with the third matrix and the first coefficient matrix;
    determining, by the terminal device, a fourth matrix, wherein the second codeword satisfies a product of the fourth matrix and a first vector or satisfies a product of the first vector and the fourth matrix;
    wherein the fourth matrix is a dictionary matrix used by the terminal device to compress an element in the first coefficient set; and
    feeding back, by the terminal device, the first codeword and the fourth matrix to a network device.

2. The information transmission method according to claim 1, wherein the first vector comprises at least one non-zero element; and the at least one non-zero elements comprises:
    a quantity in the first vector is less than a first preset value, and a difference between the second codeword and a result of multiplying the fourth matrix by the first vector or multiplying the first vector by the fourth matrix is less than a second preset value; or the quantity of non-zero elements comprised in the first vector is less than a first preset value, and an energy ratio of first energy corresponding to a result of multiplying the fourth matrix by the first vector or multiplying the first vector by the fourth matrix to second energy corresponding to the second codeword is greater than or equal to a third preset value.

3. The information transmission method according to claim 1, wherein feeding back, by the terminal device, the fourth matrix to the network device further comprises:
    periodically feeding back, by the terminal device, the fourth matrix to the network device;
    feeding back, by the terminal device, the fourth matrix to the network device after receiving an indication from the network device; or
    feeding back, by the terminal device, the fourth matrix to the network device after determining that a preset condition is satisfied.

4. An information transmission method, comprising:
    obtaining, by a network device, a first codeword fed back by a terminal device, wherein the first codeword is obtained based on a second codeword, a quantity of elements comprised in the second codeword is greater than a quantity of elements comprised in the first codeword, the second codeword is associated with a first coefficient set corresponding to a plurality of spatial layers or ports having same domain bases of a downlink channel, and the first coefficient set comprises an element comprised in at least one row vector or column vector of a first coefficient matrix corresponding to a spatial layer or port of the plurality of spatial layer or ports, wherein a third matrix satisfies a product of a first matrix, the first coefficient matrix, and a second matrix; a third matrix satisfies a product of a first matrix and the first coefficient matrix; a third matrix is/satisfies a product of the first coefficient matrix and a second matrix; or the first coefficient matrix is determined based on a third matrix; the third matrix is a channel matrix or a precoding matrix of the downlink channel; and the spatial layer or receive port is in a one-to-one correspondence with one third matrix and the first coefficient matrix;

obtaining, by the network device, a fourth matrix, wherein the second codeword satisfies a product of the fourth matrix and a first vector or satisfies a product of the first vector and the fourth matrix;

wherein the fourth matrix is a dictionary matrix used by the network device to restore the element in the first coefficient set; and determining, by the network device, an element in the first coefficient set based on the first codeword.

5. The information transmission method according to claim 4, wherein the first vector comprises at least one non-zero element; and the at least one non-zero elements comprises:

a quantity in the first vector is less than a first preset value, and a difference between the second codeword and a result of multiplying the fourth matrix by the first vector or multiplying the first vector by the fourth matrix is less than a second preset value; or the quantity of non-zero elements comprised in the first vector is less than a first preset value, and an energy ratio of first energy corresponding to a result of multiplying the fourth matrix by the first vector or multiplying the first vector by the fourth matrix to second energy corresponding to the second codeword is greater than or equal to a third preset value.

6. The information transmission method according to claim 4, wherein obtaining, by the network device, the fourth matrix from the terminal device further comprises:

periodically obtaining, by the network device, the fourth matrix from the terminal device;

sending, by the network device, an indication to the terminal device, wherein the indication is used to indicate the terminal device to indicate the fourth matrix to the network device; and obtaining, by the network device, the fourth matrix from a response message corresponding to the indication; or obtaining, by the network device, the fourth matrix from the terminal device at a first moment, wherein the first moment is a moment at which the terminal device determines that a preset condition is satisfied.

7. An information transmission apparatus, comprising:

a processor, configured to generate a first codeword, wherein the first codeword is obtained based on a second codeword, a quantity of elements comprised in the second codeword is greater than a quantity of elements comprised in the first codeword, the second codeword is associated with a first coefficient corresponding to a plurality of spatial layers or ports having same domain bases set of a downlink channel, and the first coefficient set comprises an element comprised in at least one row vector or column vector of a first coefficient matrix corresponding to a spatial layer or port of the plurality of spatial layers or ports, wherein the first coefficient matrix is determined based on a first matrix, a second matrix, and a third matrix, the third matrix is a channel matrix or a precoding matrix of the downlink channel, and the third matrix satisfies a product of the first matrix, the first coefficient matrix, and the second matrix; the first coefficient matrix is determined based on a first matrix and a third matrix, the third matrix is a channel matrix or a precoding matrix of the downlink channel, and the third matrix satisfies a product of the first matrix and the first coefficient matrix; the first coefficient matrix is determined based on a second matrix and a third matrix, the third matrix is a channel matrix or a precoding matrix of the downlink channel, and the third matrix satisfies a product of the first coefficient matrix and the second matrix; or the first coefficient matrix is determined based on a third matrix, and the third matrix is a channel matrix or a precoding matrix of the downlink channel; and the spatial layer or receive port is in a one-to-one correspondence with one third matrix and the first coefficient matrix;

determining, by the processor, a fourth matrix, wherein the second codeword satisfies a product of the fourth matrix and a first vector or satisfies a product of the first vector and the fourth matrix;

wherein the fourth matrix is a dictionary matrix used by a terminal device to compress an element in the first coefficient set; and a transceiver, configured to feed back the first codeword and the fourth matrix to a network device.

8. The information transmission apparatus according to claim 7, wherein the first vector comprises at least one non-zero element; and the at least one non-zero elements comprises:

a quantity in the first vector is less than a first preset value, and a difference between the second codeword and a result of multiplying the fourth matrix by the first vector or multiplying the first vector by the fourth matrix is less than a second preset value; or the quantity of non-zero elements comprised in the first vector is less than a first preset value, and an energy ratio of first energy corresponding to a result of multiplying the fourth matrix by the first vector or multiplying the first vector by the fourth matrix to second energy corresponding to the second codeword is greater than or equal to a third preset value.

9. The information transmission apparatus according to claim 7, wherein the transceiver is further configured to:

periodically feed back the fourth matrix to the network device;

feed back the fourth matrix to the network device after receiving an indication from the network device; or feed back the fourth matrix to the network device after it is determined that a preset condition is satisfied.

10. An information transmission apparatus, comprising:

a transceiver, configured to obtain a first codeword fed back by a terminal device, wherein the first codeword is obtained based on a second codeword, a quantity of elements comprised in the second codeword is greater than a quantity of elements comprised in the first codeword, the second codeword is associated with a first coefficient set corresponding to a plurality of spatial layers or ports having same domain bases of a downlink channel, and the first coefficient set comprises an element comprised in at least one row vector or column vector of a first coefficient matrix corresponding to a spatial layer or port of the plurality of spatial layer or ports, wherein a third matrix satisfies a product of a first matrix, the first coefficient matrix, and a second matrix; a third matrix satisfies a product of a first matrix and the first coefficient matrix; a third matrix is/satisfies a product of the first coefficient matrix and a second matrix; or the first coefficient matrix is determined based on a third matrix; the third matrix is a channel matrix or a precoding matrix of the downlink channel; and the spatial layer or receive port is in a one-to-one correspondence with one third matrix and the first coefficient matrix;

obtain a fourth matrix from the terminal device, wherein the second codeword satisfies a product of the fourth matrix and a first vector or satisfies a product of the first vector and the fourth matrix;

wherein the fourth matrix is a dictionary matrix used by a network device to restore the element in the first coefficient set; and a processor, configured to determine an element in the first coefficient set based on the first codeword.

11. The information transmission apparatus according to claim 10, wherein the first vector comprises at least one non-zero element; and the at least one non-zero elements comprises:

a quantity in the first vector is less than a first preset value, and a difference between the second codeword and a result of multiplying the fourth matrix by the first vector or multiplying the first vector by the fourth matrix is less than a second preset value; or the quantity of non-zero elements comprised in the first vector is less than a first preset value, and an energy ratio of first energy corresponding to a result of multiplying the fourth matrix by the first vector or multiplying the first vector by the fourth matrix to second energy corresponding to the second codeword is greater than or equal to a third preset value.

12. The information transmission apparatus according to claim 10, wherein the transceiver is further configured to:

periodically obtain the fourth matrix from the terminal device;

send an indication to the terminal device, wherein the indication is used to indicate the terminal device to indicate the fourth matrix to the network device; and obtain the fourth matrix from a response message corresponding to the indication; or obtain the fourth matrix from the terminal device at a first moment, wherein the first moment is a moment at which the terminal device determines that a preset condition is satisfied.

* * * * *